United States Patent
Li et al.

(10) Patent No.: US 11,611,972 B2
(45) Date of Patent: Mar. 21, 2023

(54) METHOD AND APPARATUS OF HANDLING MULTIPLE DEVICE-TO-DEVICE TRANSMISSIONS IN A WIRELESS COMMUNICATION SYSTEM

(71) Applicant: ASUSTek Computer Inc., Taipei (TW)

(72) Inventors: Ming-Che Li, Taipei (TW); Li-Te Pan, Taipei (TW); Li-Chih Tseng, Taipei (TW); Wei-Yu Chen, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 349 days.

(21) Appl. No.: 16/533,072

(22) Filed: Aug. 6, 2019

(65) Prior Publication Data
US 2020/0045715 A1   Feb. 6, 2020

Related U.S. Application Data

(60) Provisional application No. 62/714,982, filed on Aug. 6, 2018, provisional application No. 62/715,000, filed on Aug. 6, 2018.

(51) Int. Cl.
| | |
|---|---|
| *H04W 72/12* | (2009.01) |
| *H04W 72/04* | (2009.01) |
| *H04W 72/14* | (2009.01) |
| *H04W 72/121* | (2023.01) |
| *H04W 72/1263* | (2023.01) |
| *H04W 72/0453* | (2023.01) |
| *H04W 72/0446* | (2023.01) |

(52) U.S. Cl.
CPC ..... *H04W 72/121* (2013.01); *H04W 72/0446* (2013.01); *H04W 72/0453* (2013.01); *H04W 72/1263* (2013.01); *H04W 72/14* (2013.01)

(58) Field of Classification Search
CPC .............. H04W 72/14; H04W 72/121; H04W 72/0446; H04W 72/0453; H04W 72/1263
See application file for complete search history.

(56) References Cited

U.S. PATENT DOCUMENTS 6,021,329 A * 2/2000 Kornestedt ........... H04W 24/08
                                                                    455/448
10,873,946 B2 * 12/2020 Seo ........................ H04L 5/0055
(Continued)

FOREIGN PATENT DOCUMENTS

| CN | 107889237 A | 4/2018 |
|---|---|---|
| WO | 2018012887 A1 | 1/2018 |

OTHER PUBLICATIONS

ZTE, "Overview of NR initial access" ,3GPP TSG RAN WG1 Meeting #87 ,R1-1611272 Reno, USA, Nov. 14-18, 2016.
(Continued)

*Primary Examiner* — James P Duffy
(74) *Attorney, Agent, or Firm* — Cooper Legal Group LLC

(57) ABSTRACT

A method and apparatus are disclosed. In an example from the perspective of a device, a grant is received on a first interface. The grant is associated with transmission on a second interface. A first resource and/or a second resource are derived based upon the grant. A first transmission for delivering a transport block is performed on the first resource on a first transmission beam. The first transmission is on the second interface. A second transmission for delivering the transport block is performed on the second resource on a second transmission beam. The second transmission is on the second interface.

20 Claims, 32 Drawing Sheets

(56) References Cited

U.S. PATENT DOCUMENTS

| | | | |
|---|---|---|---|
| 2013/0095874 A1* | 4/2013 | Moshfeghi | H04L 5/0032 |
| | | | 455/509 |
| 2017/0230996 A1 | 8/2017 | Li et al. | |
| 2017/0325255 A1* | 11/2017 | Xu | H04L 43/00 |
| 2017/0347281 A1* | 11/2017 | Liu | H04W 24/08 |
| 2018/0013521 A1* | 1/2018 | Lee | H04L 1/1851 |
| 2018/0206140 A1* | 7/2018 | Panteleev | H04W 72/044 |
| 2018/0263026 A1 | 9/2018 | Loehr et al. | |
| 2020/0059962 A1* | 2/2020 | Tejedor | H04W 16/14 |
| 2020/0145079 A1* | 5/2020 | Marinier | H04B 7/0456 |
| 2020/0169896 A1* | 5/2020 | Li | H04B 7/0408 |
| 2021/0160916 A1* | 5/2021 | Zhang | H04L 1/1816 |

OTHER PUBLICATIONS

Corresponding Korean patent application No. 10-2019-0095612, Office Action dated Dec. 14, 2020. English Translation.

ZTE, "Consideration on Forward Compatibility for New Radio Interface", 3GPP TSG RAN WG1 Meeting #84bis, R1-1633952, Busan, Korea, Apr. 11-15, 2016.

CATT, "Resource Selection based on Sensing", 3GPP TSG RAN WG2 Meeting #95, R2-164747, Gothenburg, Sweden, Aug. 22-26, 2016.

* cited by examiner

Fully connected Hybrid beamforming

Sub-array Hybrid beamforming

T: transmission

T: derive a directional result from weighting the sensing results of multiple directions.
And then, select resource based on directional result.

1875

T: receive/sensing

METHOD AND APPARATUS OF HANDLING MULTIPLE DEVICE-TO-DEVICE TRANSMISSIONS IN A WIRELESS COMMUNICATION SYSTEM

CROSS-REFERENCE TO RELATED APPLICATIONS

The present Application claims the benefit of U.S. Provisional Patent Application Ser. No. 62/714,982 filed on Aug. 6, 2018, the entire disclosure of which is incorporated herein in its entirety by reference. The present Application also claims the benefit of U.S. Provisional Patent Application Ser. No. 62/715,000 filed on Aug. 6, 2018, the entire disclosure of which is incorporated herein in its entirety by reference.

FIELD

This disclosure generally relates to wireless communication networks, and more particularly, to a method and apparatus for handling multiple device-to-device transmissions in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a device, a grant is received on a first interface. The grant is associated with transmission on a second interface. A first resource and/or a second resource are derived based upon the grant. A first transmission for delivering a transport block is performed on the first resource on a first transmission beam. The first transmission is on the second interface. A second transmission for delivering the transport block is performed on the second resource on a second transmission beam. The second transmission is on the second interface.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: R2-162366, "Beam Forming Impacts", Nokia, Alcatel-Lucent; R2-163716, "Discussion on terminology of beamforming based high frequency NR", Samsung; R2-162709, "Beam support in NR", Intel; R2-162762, "Active Mode Mobility in NR: SINR drops in higher frequencies", Ericsson; R3-160947, TR 38.801 V0.1.0, "Study on New Radio Access Technology", "Radio Access Architecture and Interfaces"; R2-164306, "Summary of email discussion [93bis#23][NR] Deployment scenarios", NTT DOCOMO; 3GPP RAN2#94 meeting minute; R2-162251, "RAN2 aspects of high frequency New RAT", Samsung; 3GPP TS 36.213 V15.1.0 (2018-03), "E-UTRA; Physical layer procedures (Release 15)"; 3GPP TS 36.212 V15.1.0 (2018-03), "E-UTRA; Physical layer; Multiplexing and channel coding (Release 15)"; 3GPP TS 36.214 V15.1.0 (2018-03), "E-UTRA; Physical layer; Measurements (Release 15)". The standards and documents listed above are hereby expressly incorporated by reference in their entirety.

Figure 1:
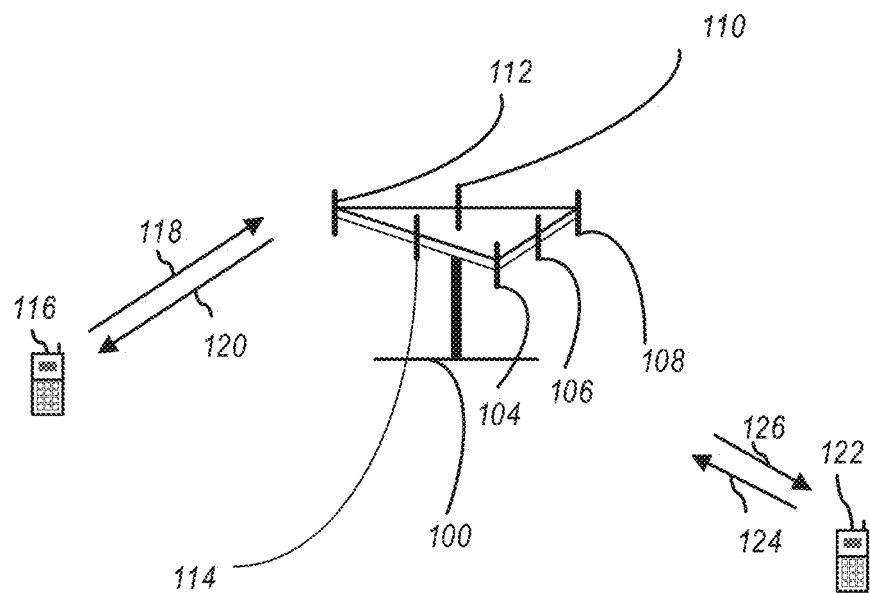
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a wireless communication device, terminal, access terminal or some other terminology.

Figure 2:
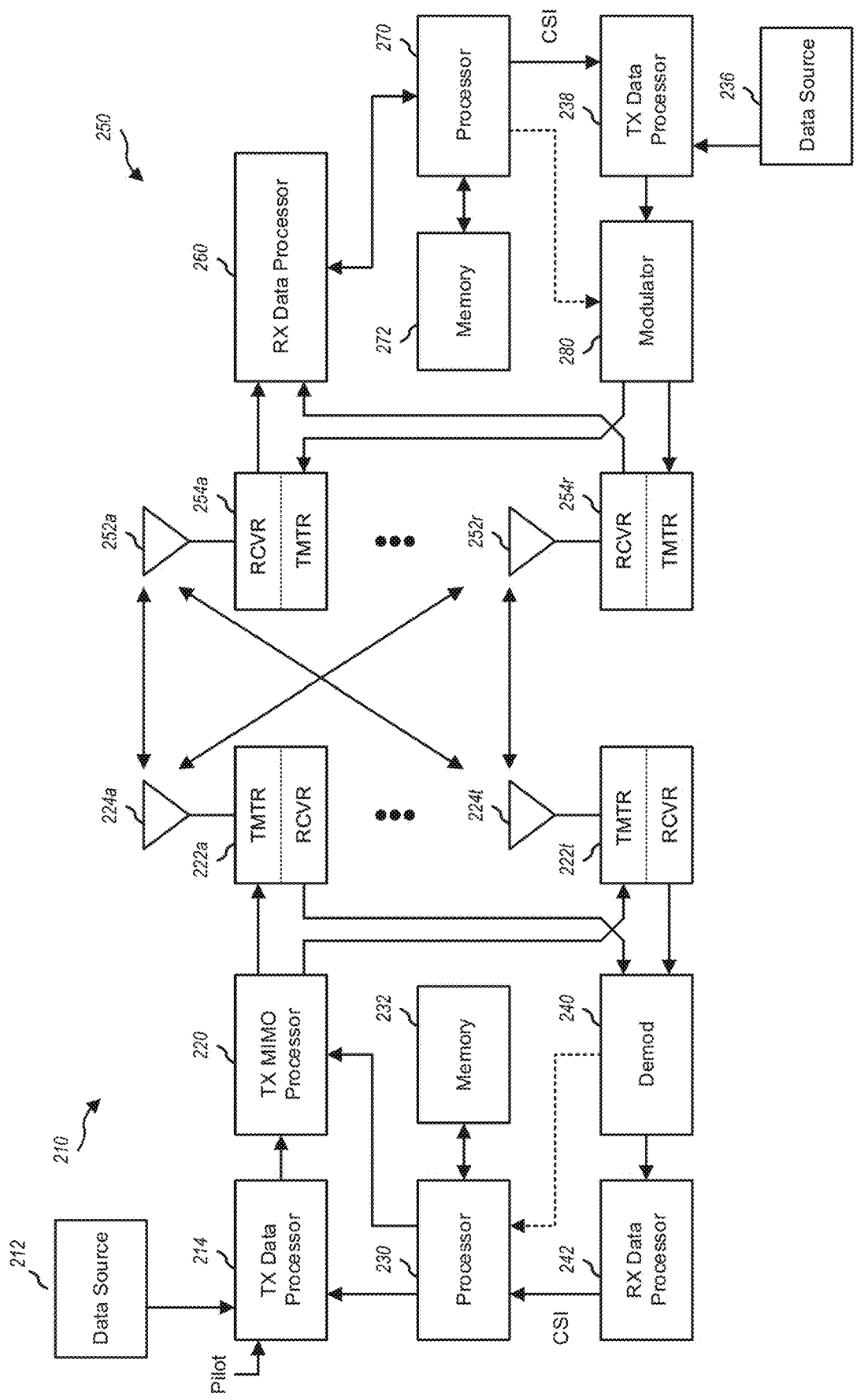
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further processes the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
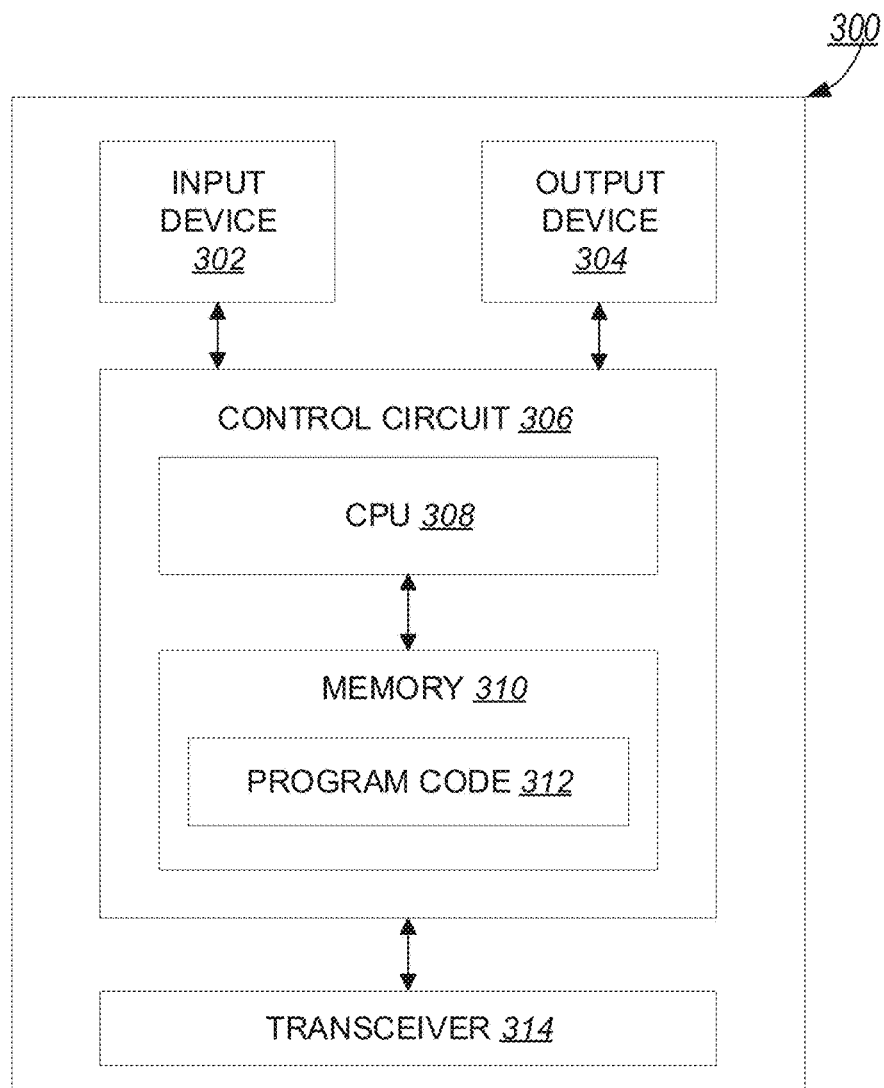
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
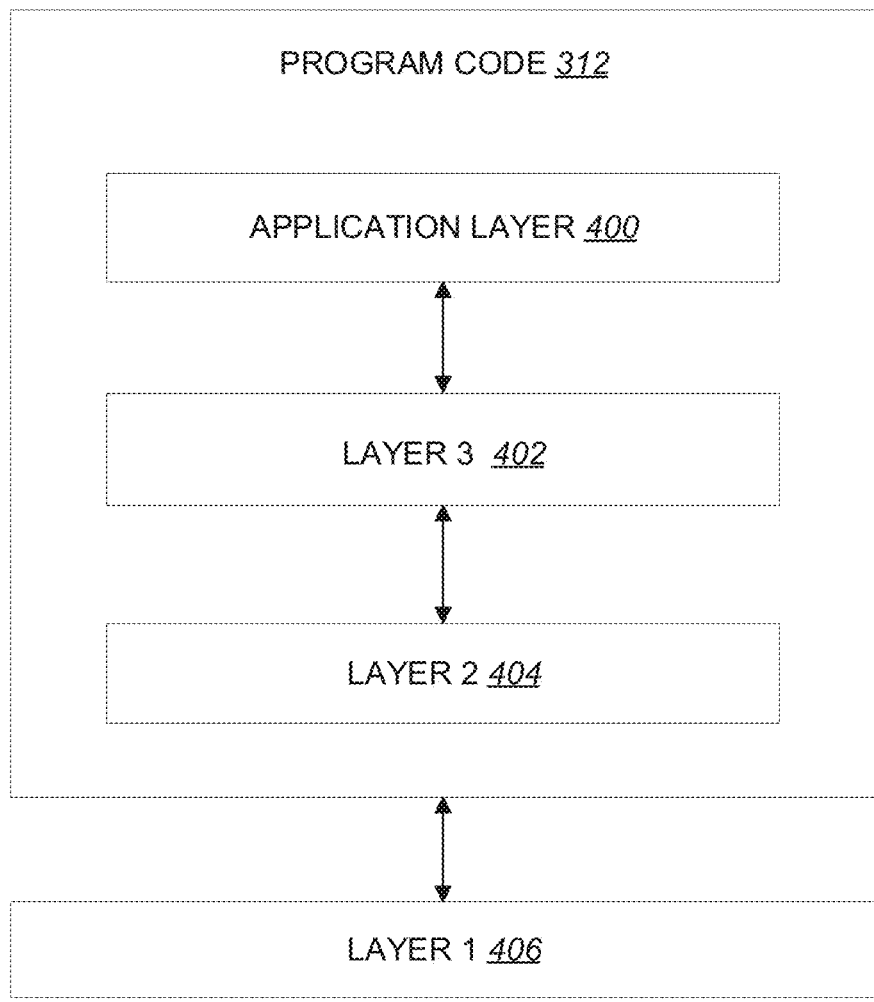
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

3GPP standardization activities on next generation (i.e. 5G) access technology have been launched since March 2015. The next generation access technology aims to support the following three families of usage scenarios for satisfying both the urgent market needs and the more long-term requirements set forth by the ITU-R IMT-2020: mMTC (massive Machine Type Communications), eMBB (enhanced Mobile Broadband), and URLLC (Ultra-Reliable and Low Latency Communications).

An objective of the 5G study item on new radio access technology is to identify and develop technology components needed for new radio systems which should be able to use any spectrum band ranging at least up to 100 GHz. Supporting carrier frequencies up to 100 GHz brings a number of challenges in the area of radio propagation. As the carrier frequency increases, the path loss also increases.

As described in R2-162366, in lower frequency bands (e.g. current LTE bands <6 GHz) the required cell coverage may be provided by forming a wide sector beam for transmitting downlink common channels. However, utilizing wide sector beam on higher frequencies (>>6 GHz) the cell coverage is reduced with same antenna gain. Thus, in order to provide required cell coverage on higher frequency bands, higher antenna gain is needed to compensate the increased path loss. To increase the antenna gain over a wide sector beam, larger antenna arrays (number of antenna elements ranging from tens to hundreds) are used to form high gain beams.

As a consequence the high gain beams are narrow compared to a wide sector beam so multiple beams for transmitting downlink common channels are needed to cover the required cell area. The number of concurrent high gain beams that access point is able to form may be limited by the cost and complexity of the utilized transceiver architecture. In practice, on higher frequencies, the number of concurrent high gain beams is much less than the total number of beams required to cover the cell area. In other words, the access point is able to cover part of the cell area by using a subset of beams at any given time.

As described in R2-163716, beamforming is a signal processing technique used in antenna arrays for directional signal transmission/reception. With beamforming, a beam can be formed by combining elements in a phased array of antennas in such a way that signals at particular angles experience constructive interference while others experience destructive interference. Different beams can be utilized simultaneously using multiple arrays of antennas.

Figure 5A:
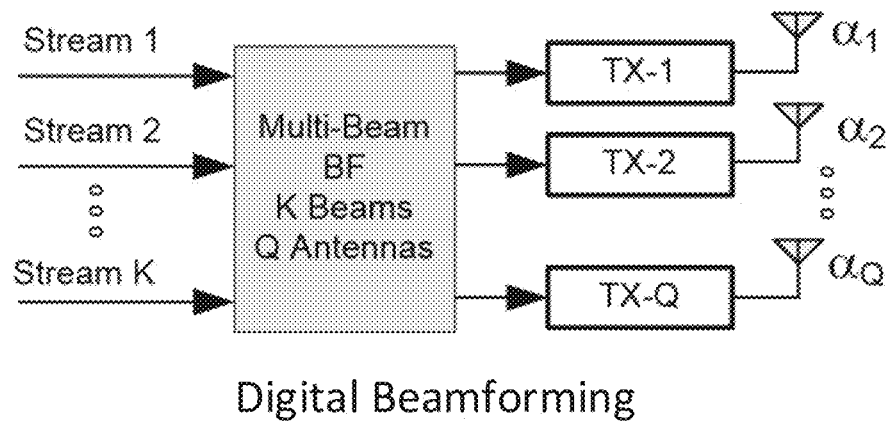
FIG. 5A illustrates an exemplary digital beamforming system.
Figure 5B:
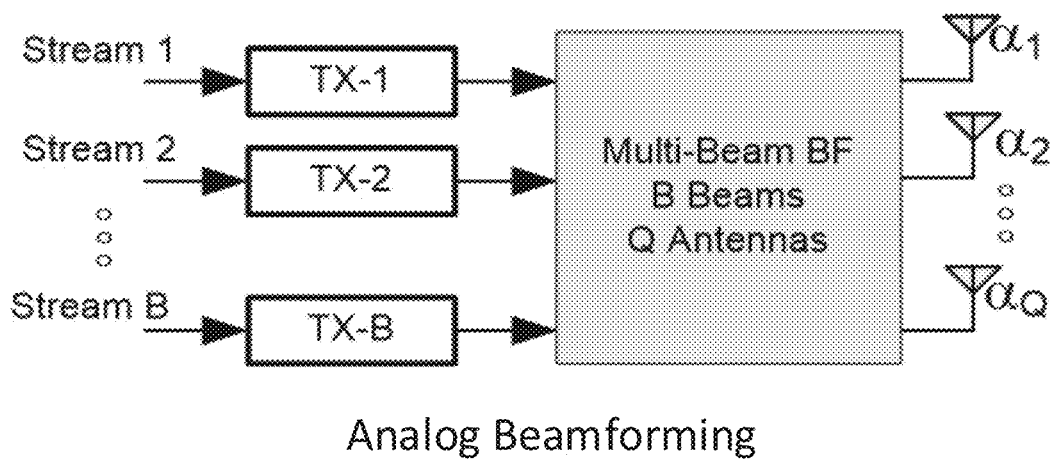
FIG. 5B illustrates an exemplary analog beamforming system.
Figure 5C:
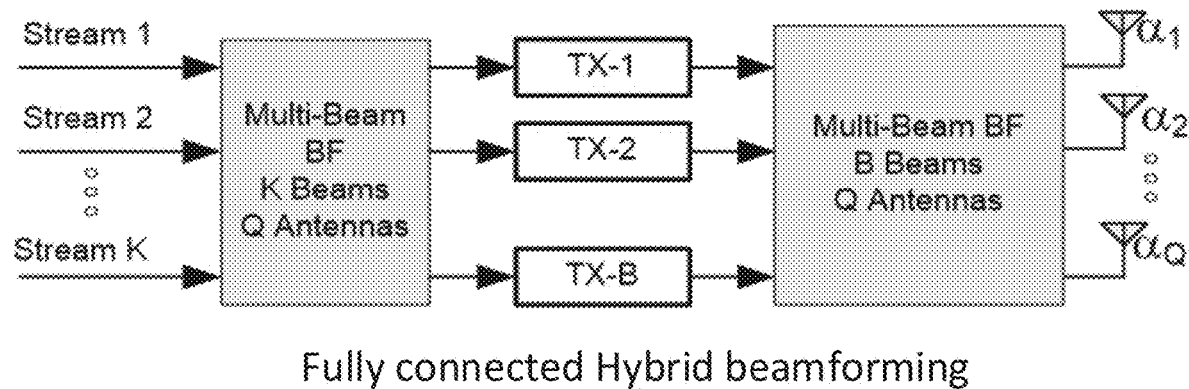
FIG. 5C illustrates an exemplary fully connected hybrid beamforming system.
Figure 5D:
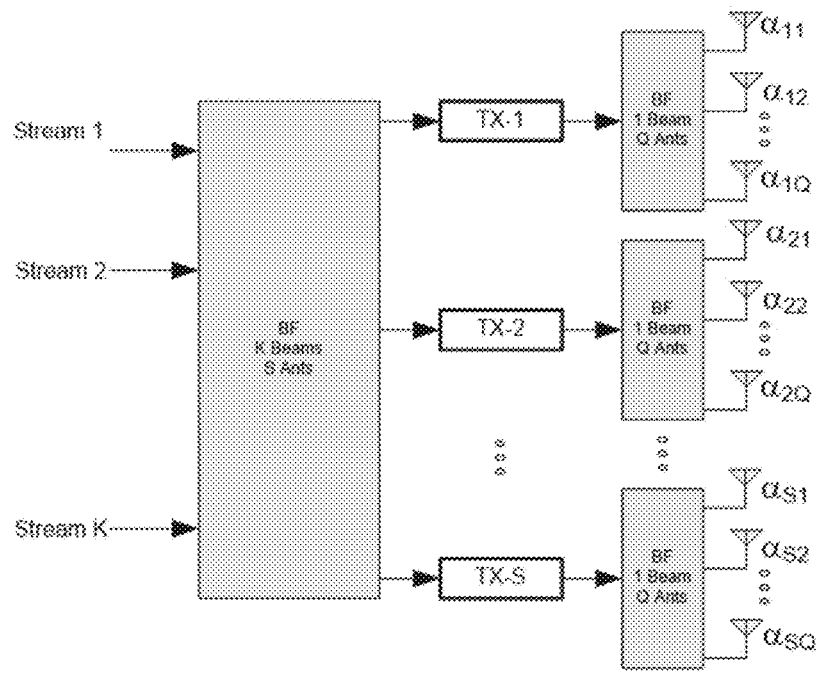
FIG. 5D illustrates an exemplary sub-array hybrid beamforming system.

Beamforming can be categorized into three types of implementation: digital beamforming, hybrid beamforming, and analog beamforming. For digital beamforming, the beam is generated on the digital domain, i.e. the weighting of each antenna element can be controlled by baseband (e.g. connected to a TXRU). Therefore it is very easy to tune the beam direction of each subband differently across the system bandwidth. Also, to change beam direction from time to time does not require any switching time between OFDM symbols. Some and/or all beams whose directions cover the whole coverage can be generated simultaneously. However, this structure requires (almost) one-to-one mapping between TXRU (transceiver/RF chain) and antenna element and is quite complicated as the number of antenna element increases and system bandwidth increases (also heat problem exists). For Analog beamforming, the beam is generated on the analog domain, i.e. the weighting of each antenna element can be controlled by an amplitude/phase shifter in the RF circuit. Since the weighing is purely controlled by the circuit, the same beam direction would apply on the whole system bandwidth. Also, if beam direction is to be changed, switching time is required. The number of beam generated simultaneous by an analog beamforming depends on the number of TXRU. Note that for a given size of array, the increase of TXRU may decrease the antenna element of each beam, such that wider beam would be generated. In short, analog beamforming could avoid the complexity and heat problem of digital beamforming, while is more restricted in operation. Hybrid beamforming can be considered as a compromise between analog and digital beamforming, where the beam can come from both analog and digital domain. The three types of beamforming are shown in FIGS. 5A-5D. FIG. 5A illustrates an exemplary digital beamforming system. FIG. 5B illustrates an exemplary analog beamforming system. FIG. 5C illustrates an exemplary fully connected hybrid beamforming system. FIG. 5D illustrates an exemplary sub-array hybrid beamforming system.

Figure 6:
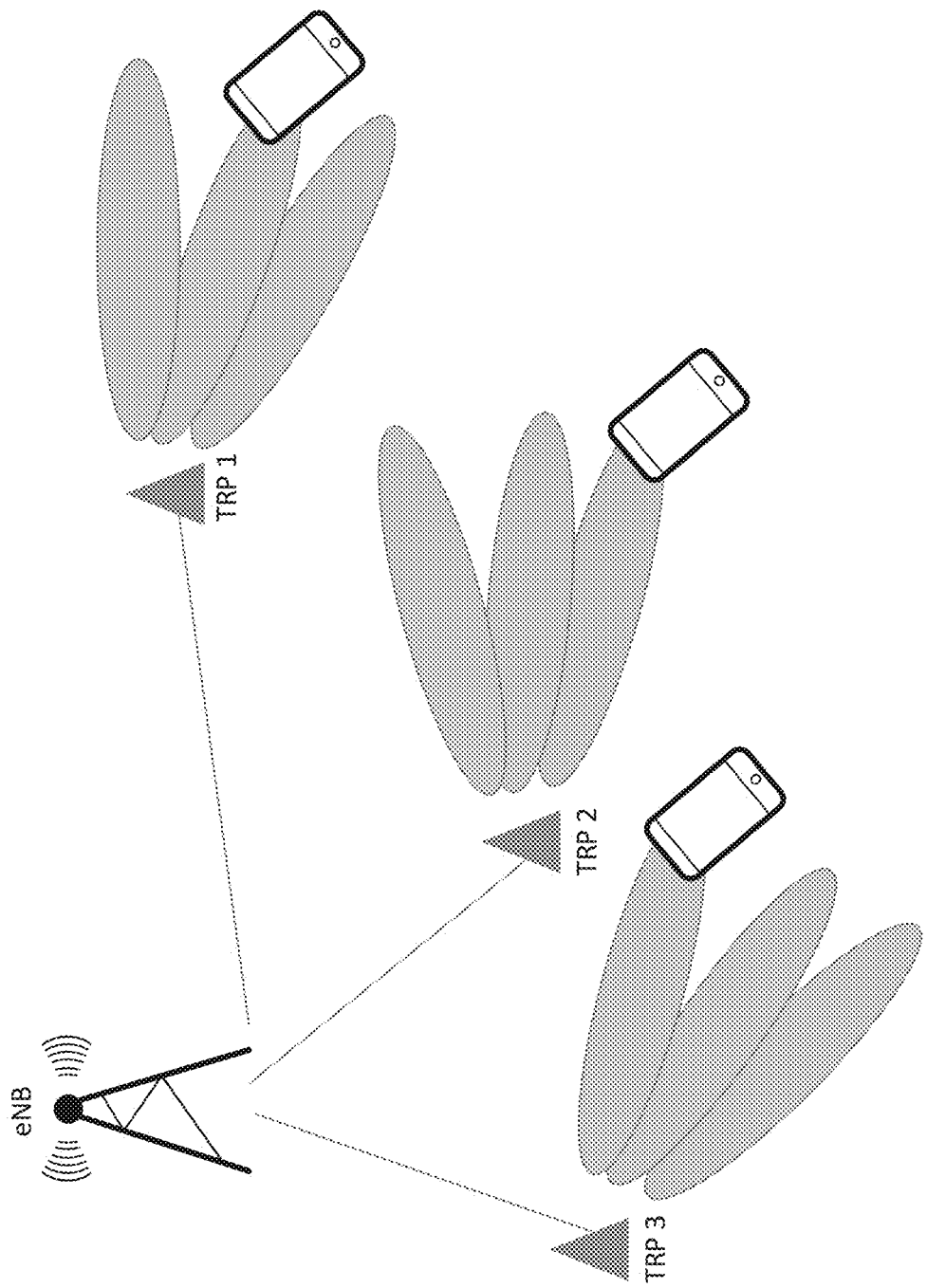
FIG. 6 illustrates an exemplary system comprising an eNB with Transmission and Reception Points (TRPs).

As provided in R2-162709 and as shown in FIG. 6, an eNB may have multiple TRPs (either centralized or distributed). Notably, FIG. 6 is a reproduction of FIG. 1, entitled "Beam concept in 5G", in R2-162709. Each TRP can form multiple beams. The number of beams and the number of simultaneous beams in the time/frequency domain depend on the number of antenna array elements and the RF at the TRP.

Potential mobility type for NR can be listed: Intra-TRP mobility, Inter-TRP mobility, and Inter-NR eNB mobility.

As provided in R2-162762, reliability of a system purely relying on beamforming and operating in higher frequencies might be challenging, since the coverage might be more sensitive to both time and space variations. As a consequence of that the SINR of that narrow link can drop much quicker than in the case of LTE.

Using antenna arrays at access nodes with the number of elements in the hundreds, fairly regular grid-of-beams coverage patterns with tens or hundreds of candidate beams per node may be created. The coverage area of an individual beam from such array may be small, down to the order of some tens of meters in width. As a consequence, channel quality degradation outside the current serving beam area is quicker than in the case of wide area coverage, as provided by LTE.

Figure 7:
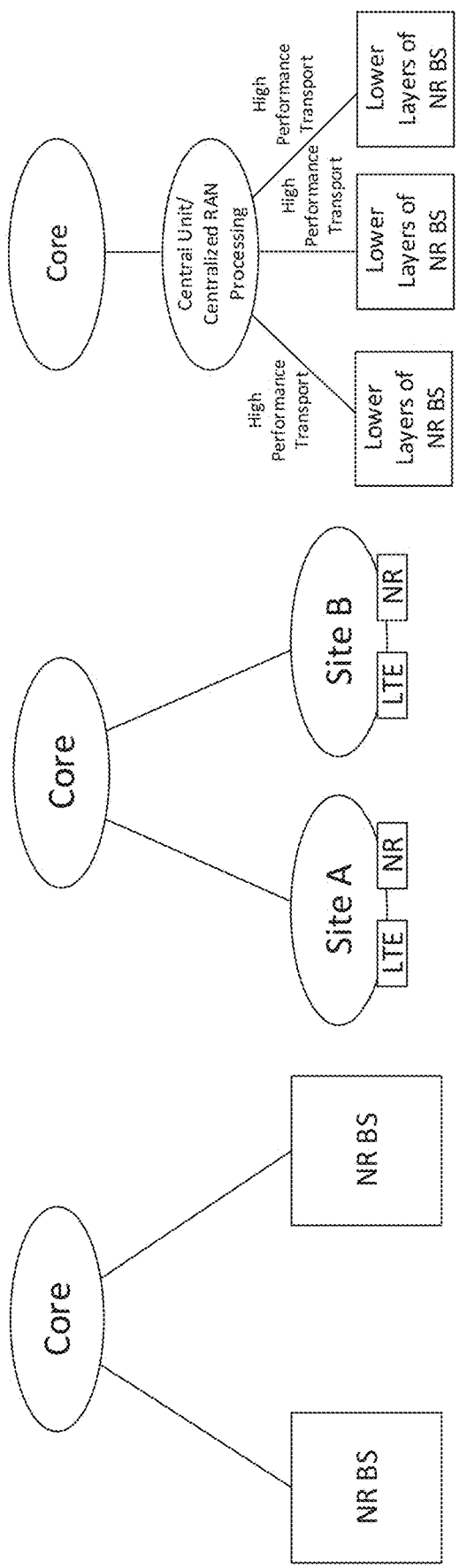
FIG. 7 illustrates exemplary deployment scenarios associated with New Radio Access Technology (NR) radio network architecture.
Figure 8:
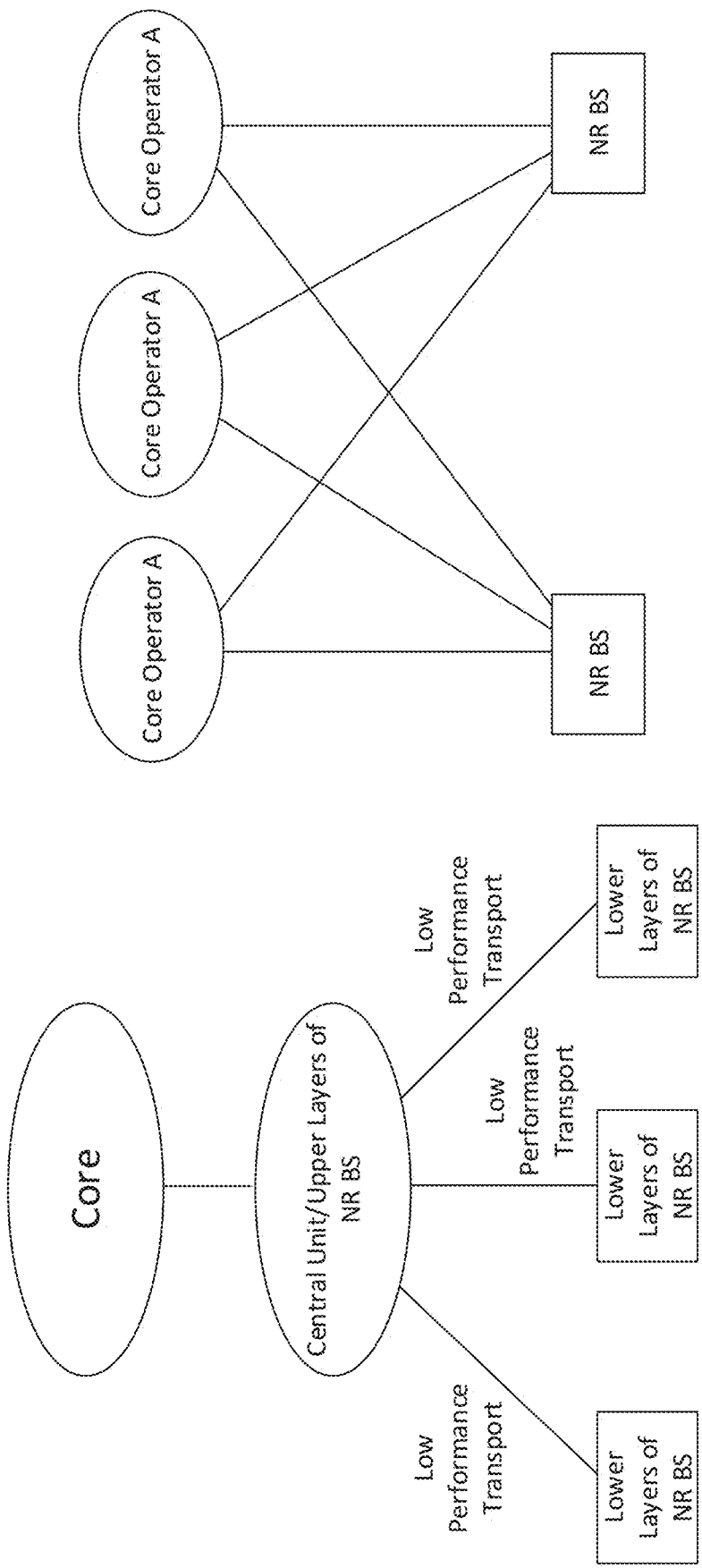
FIG. 8 illustrates exemplary deployment scenarios associated with NR radio network architecture.

As provided in R3-160947, scenarios illustrated in FIGS. 7-8 should be considered for support by the NR radio network architecture. FIGS. 7-8 illustrate exemplary deployment scenarios associated with NR radio network architecture. Notably, FIG. 7 is a reproduction of FIG. 5.1-1 entitled "Stand-alone deployment", FIG. 5.2-1 entitled "Co-sited deployment with LTE" and FIG. 5.3-1 entitled "Centralized baseband deployments (high performance transport)" in R3-160947. FIG. 8 is a reproduction of FIG. 5.4-1 entitled "Centralized deployment with low performance transport" and FIG. 5.5-1 entitled "Shared RAN deployment" in R3-160947.

As provided in R2-164306, the following scenarios in terms of cell layout for standalone NR are captured to be studied: Macro cell only deployment, Heterogeneous deployment, and Small cell only deployment.

Based on 3GPP RAN2#94 meeting minute, 1 NR eNB (e.g. called gNB) corresponds to one or more than one TRPs. Two levels of network controlled mobility:
RRC driven at 'cell' level and Zero/Minimum RRC involvement (e.g. at MAC/PHY)

Figure 9:
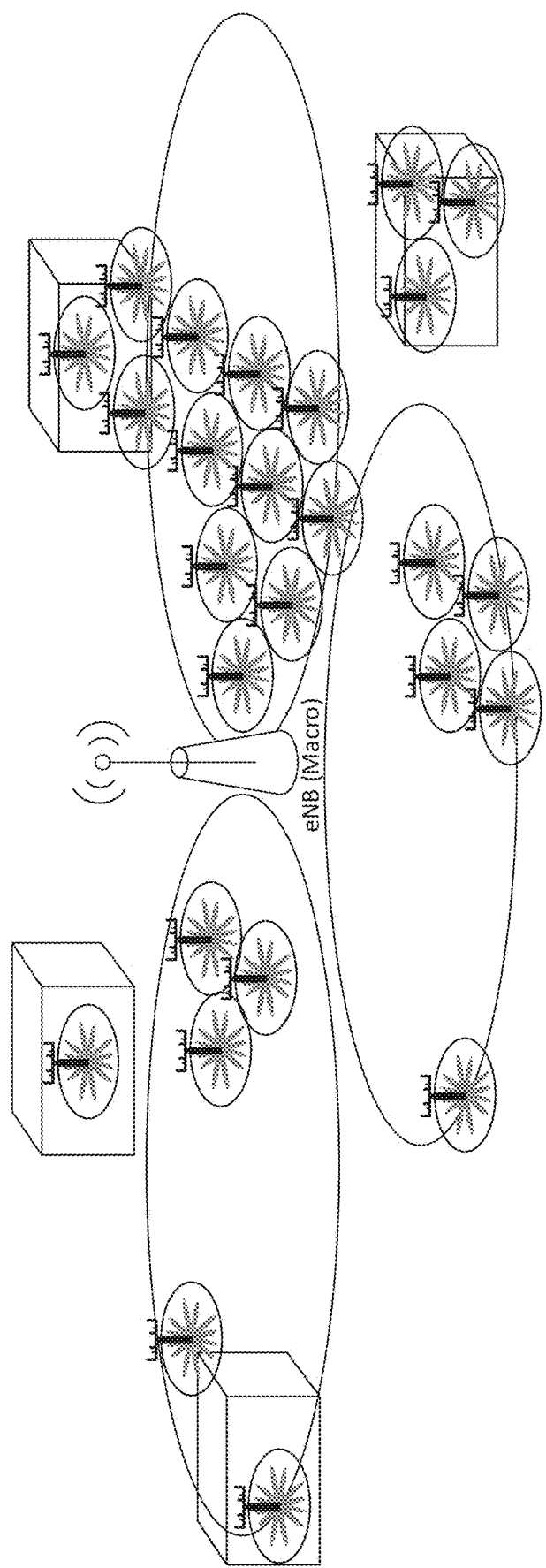
FIG. 9 illustrates an exemplary deployment scenario with a single TRP cell.
Figure 10:
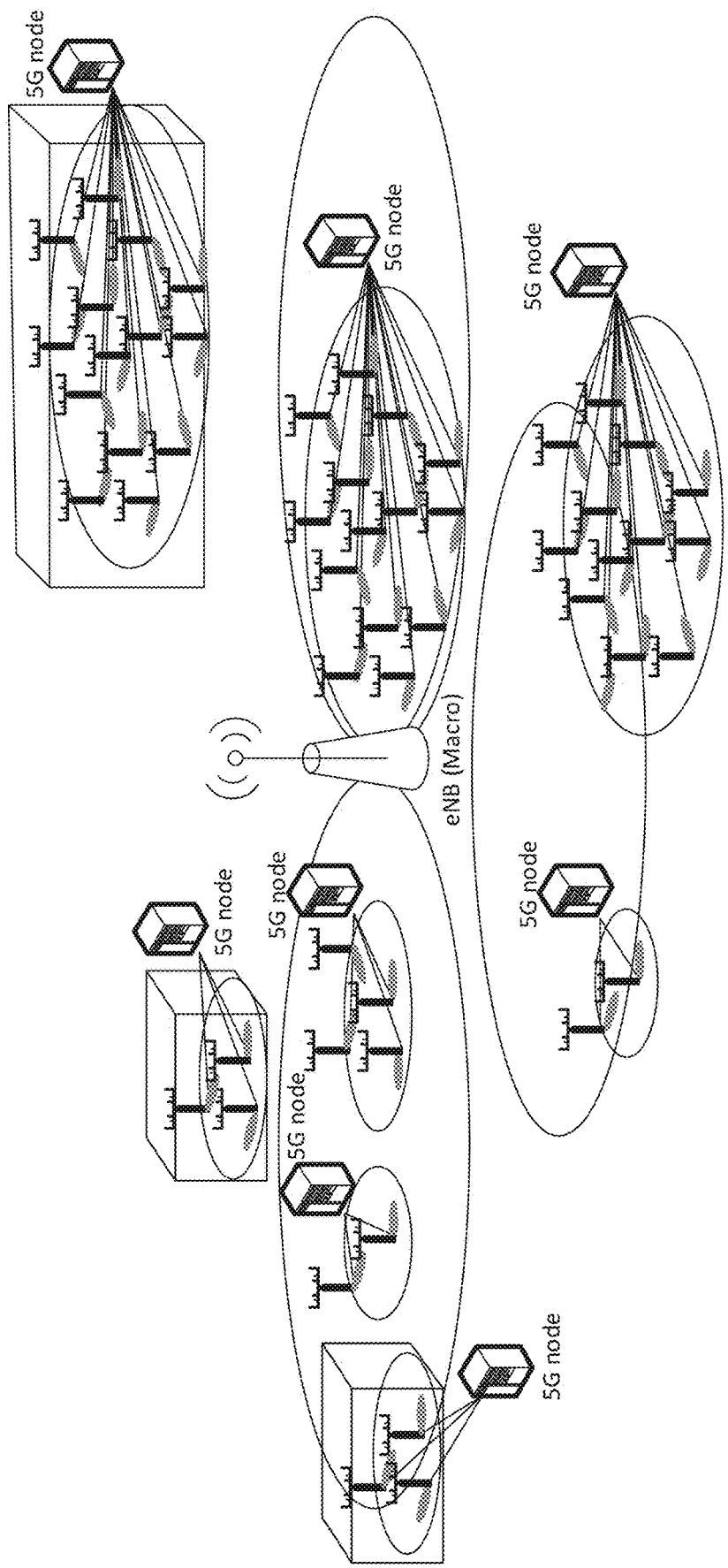
FIG. 10 illustrates an exemplary deployment scenario with multiple TRP cells.
Figure 11A:
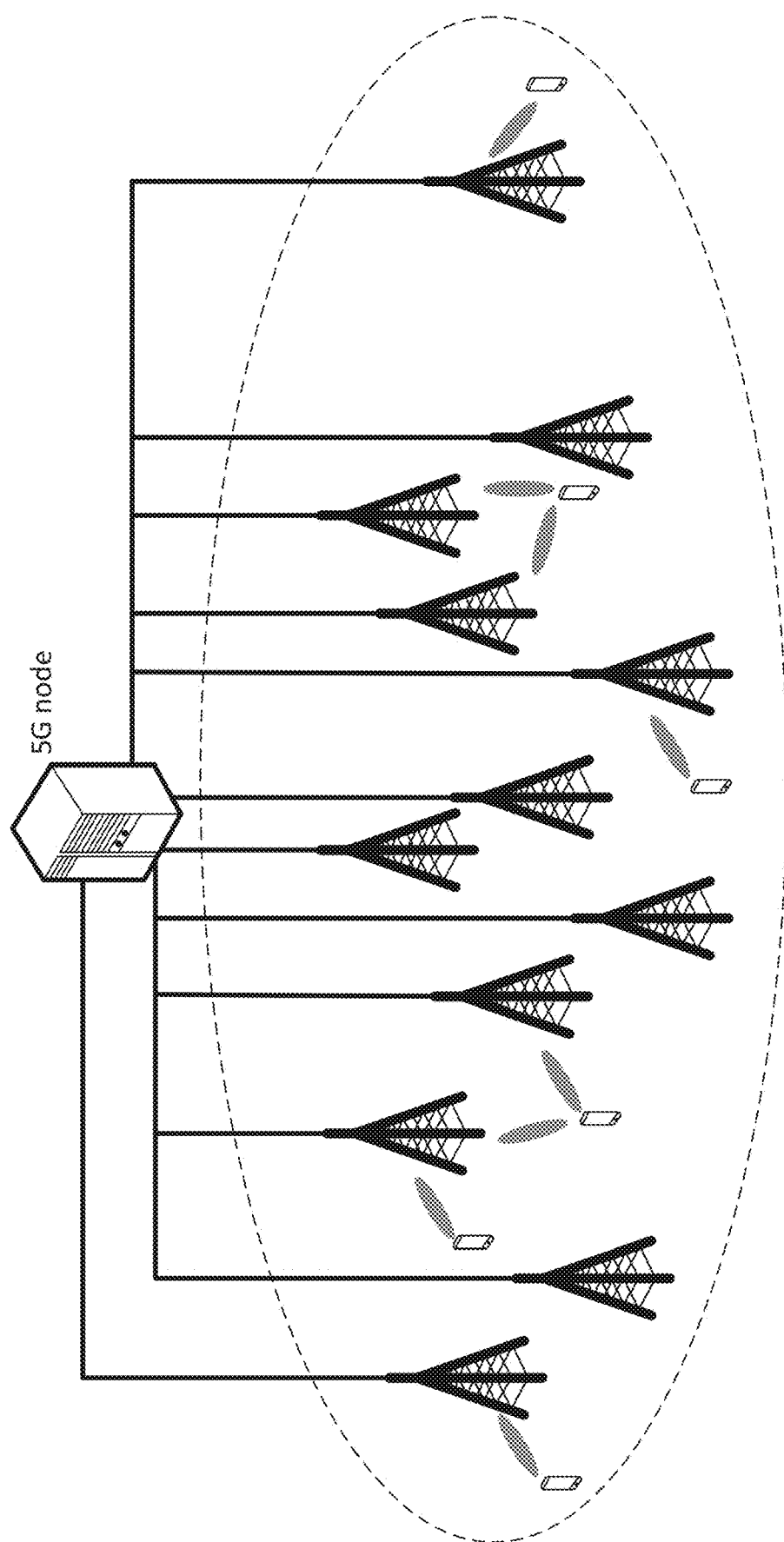
FIG. 11A illustrates a 5G cell comprising a 5G node with multiple TRPs.
Figure 11B:
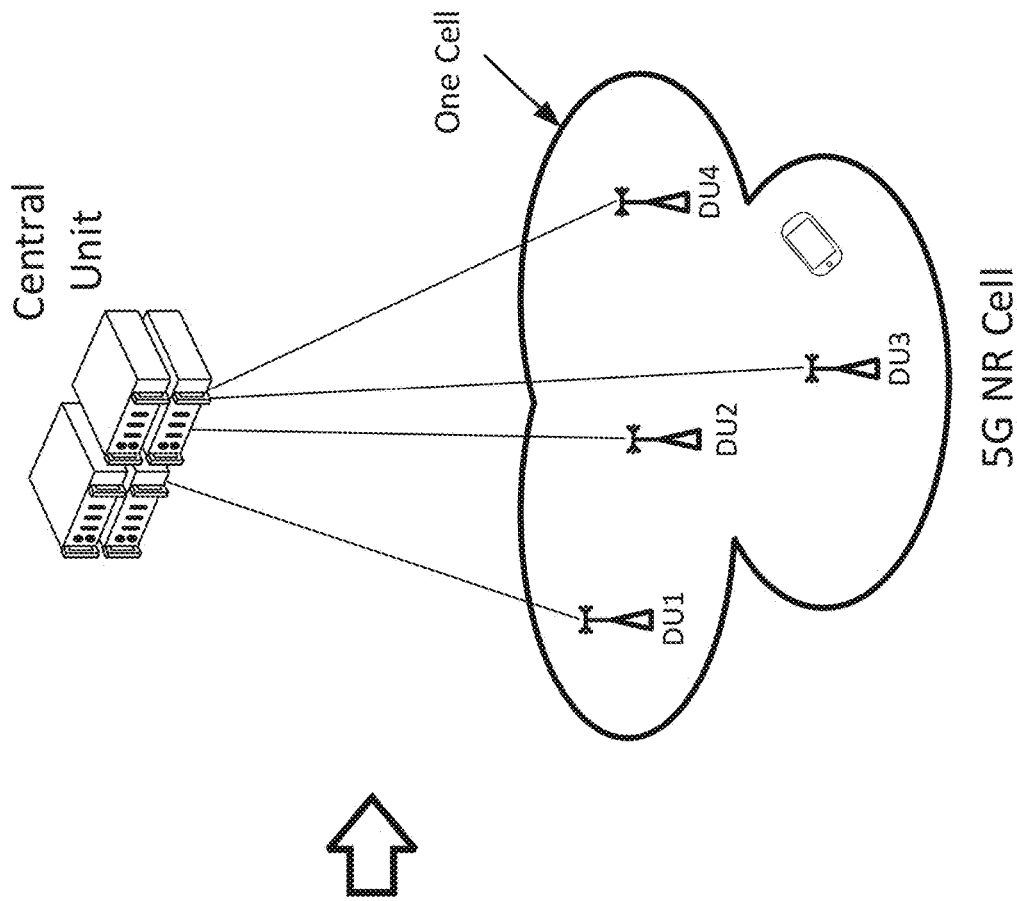
FIG. 11B illustrates a Long Term Evolution (LTE) cell and an NR cell.
Figure 11B:
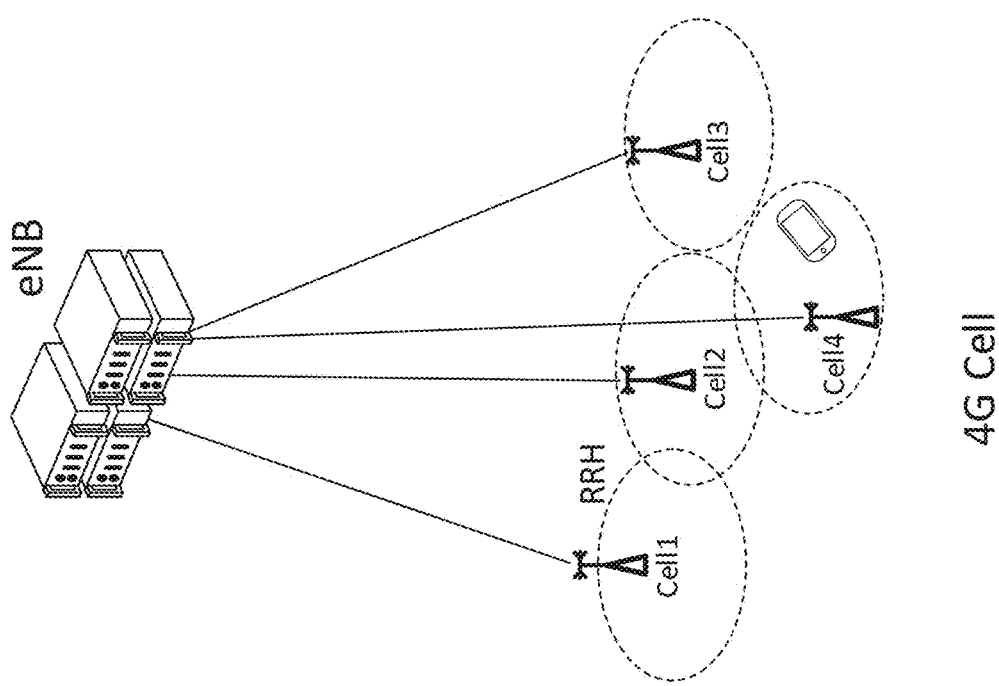

FIGS. 9-10 and FIGS. 11A-11B show some examples of the concept of a cell in 5G NR. FIG. 9, entitled "Different deployment scenarios with single TRP cell", shows a deployment with a single TRP cell. FIG. 10, entitled "Different deployment scenarios with multiple TRPs Cell", shows a deployment with multiple TRP cells. FIG. 11A, entitled "One 5G Cell", shows one 5G cell comprising a 5G node with multiple TRPs. FIG. 11B, entitled "LTE cell and NR cell", shows a comparison between a LTE cell and a NR cell.

3GPP TS 36.213 V15.1.0 specifies the UE procedure for sidelink transmission mode 3, which is V2X transmission scheduled from network node, which is stated:
14.1 Physical Sidelink Shared Channel Related Procedures
14.1.1 UE Procedure for Transmitting the PSSCH
[ ... ]
If the UE transmits SCI format 1 on PSCCH according to a PSCCH resource configuration in subframe n, then for the corresponding PSSCH transmissions of one TB
    for sidelink transmission mode 3,
        the set of subframes and the set of resource blocks are determined using the subframe pool indicated by the PSSCH resource configuration (described in Subclause 14.1.5) and using "Retransmission index and Time gap between initial transmission and retransmission" field and "Frequency resource location of the initial transmission and retransmission" field in the SCI format 1 as described in Subclause 14.1.1.4A.
14.1.1.4A UE Procedure for Determining Subframes and Resource Blocks for Transmitting PSSCH for Sidelink Transmission Mode 3
If the UE has a configured sidelink grant (described in [8]) in subframe $t_n^{SL}$ with the corresponding PSCCH resource m (described in Subclause 14.2.4), the resource blocks and subframes of the corresponding PSSCH transmissions are determined according to 14.1.1.4C.
If the UE has a configured sidelink grant (described in [8]) for an SL SPS configuration activated by Subclause 14.2.1 and if a set of sub-channels in subframe $t_m^{SL}$ is determined as the time and frequency resource for PSSCH transmission corresponding to the configured sidelink grant (described in [8]) of the SL SPS configuration, the same set of sub-channels in subframes $t_{m+j\times P'_{SPS}}^{SL}$ are also determined for PSSCH transmissions corresponding to the same sidelink grant where j=1, 2, . . . , $P'_{SPS}=P_{step}\times P_{SPS}/100$, and ($t_0^{SL}$, $t_1^{SL}$, $T_2^{SL}$, ... ) is determined by Subclause 14.1.5. Here, $P_{SPS}$ is the sidelink SPS interval of the corresponding SL SPS configuration.
[ ... ]
14.1.1.4C UE Procedure for Determining Subframes and Resource Blocks for PSSCH Transmission Associated with an SCI Format 1
The set of subframes and resource blocks for PSSCH transmission is determined by the resource used for the PSCCH transmission containing the associated SCI format 1, and "Frequency resource location of the initial transmission and retransmission" field, "Retransmission index" field, "Time gap between initial transmission and retransmission" field of the associated SCI format 1 as described below.
"Frequency resource location of the initial transmission and retransmission" field in the SCI format 1 is equal to resource indication value (RIV) corresponding to a starting sub-channel index ($n_{subCH}^{start}$) and a length in terms of contiguously allocated sub-channels ($L_{subCH} \geq 1$). The resource indication value is defined by if ($L_{subCH} -1$) ≤ $\lfloor N_{subCH} / 2 \rfloor$ then
    RIV = $N_{subCH} (L_{subCH} -1) + n_{subCH}^{start}$
else
    RIV = $N_{subCH} (N_{subCH} - L_{subCH} +1) + (n_{subCH} -1 - n_{subCH}^{start})$ where $N_{subCH}$ is the total number of sub-channels in the pool determined by higher layer parameter numSubchannel.

For the SCI format 1 transmitted on the PSCCH resource m (described in subclause 14.2.4) in subframe $t_n^{SL}$, the set of subframes and sub-channels for the corresponding PSSCH are determined as follows:

if $SF_{gap}$ is zero, the time and frequency resources for the corresponding PSSCH is given by sub-channel(s) m, m+1, . . . , m+$L_{subCH}$−1 in subframe $t_n^{SL}$.

else if "Retransmission index" in the SCI format 1 is zero, the time and frequency resources for the corresponding PSSCH is given by sub-channel(s) m, m+1, . . . , m+$L_{subCH}$−1 in subframe $t_n^{SL}$, and sub-channels $n_{subCH}^{start}$, $n_{subCH}^{start}$+1, . . . , $n_{subCH}^{start}$+$L_{subCH}$−1 subframe $t_{n+SF_{gap}}^{SL}$.

else if "Retransmission index" in the SCI format 1 is one, the time and frequency resources for the corresponding PSSCH is given by sub-channels $n_{subCH}^{start}$, $n_{subCH}^{start}$+1, . . . , $n_{subCH}^{start}$+$L_{subCH}$−1 in subframe $t_{n-SF_{gap}}^{SL}$, and sub-channels m, m+1, . . . , m+$L_{subCH}$−1 in subframe $t_n^{SL}$.

where $SF_{gap}$ is the value indicated by "Time gap between initial transmission and retransmission" field the SCI format 1 and ($t_0^{SL}$, $t_1^{SL}$, $t_2^{SL}$, . . . ) is determined by Subclause 14.1.5.

When sub-channel(s) m, m+1, . . . , m+$L_{subCH}$−1 are determined in a subframe for the transmission of PSSCH, the set of resource blocks determined for the PSSCH transmission is given by $N_{PSSCH}^{RB}$ contiguous resource blocks with the physical resource block number $n_{PRB}$=$n_{subCHRBstart}$+m*$n_{subCHsize}$+j+β for j=0, . . . , $N_{PSSCH}^{RB}$−1. Here, $n_{subCHRBstart}$ and $n_{subCHsize}$ are given by higher layer parameters startRBSubchannel and sizeSubchannel, respectively. The parameters $N_{PSSCH}^{RB}$ and β are given as follows:

if a pool is (pre)configured such that a UE always transmits PSCCH and the corresponding PSSCH in adjacent resource blocks in a subframe, β=2 and $N_{PSSCH}^{RB}$ is the largest integer that fulfills $$N_{PSSCH}^{RB}=2^{\alpha_2} \cdot 3^{\alpha_3} \cdot 5^{\alpha_5} \leq L_{subCH} * n_{subCHsize} - 2$$

where $\alpha_2, \alpha_3, \alpha_5$ is a set of non-negative integers if a pool is (pre)configured such that a UE may transmit PSCCH and the corresponding PSSCH in non-adjacent resource blocks in a subframe, β=0 and $N_{PSSCH}^{RB}$ is the largest integer that fulfills $$N_{PSSCH}^{RB}=2^{\alpha_2} \cdot 3^{\alpha_3} \cdot 5^{\alpha_5} \leq L_{subCH} * n_{subCHsize}$$

where $\alpha_2, \alpha_3, \alpha_5$ is a set of non-negative integers.

[ . . . ]

14.1.1.6 UE Procedure for Determining the Subset of Resources to be Reported to Higher Layers in PSSCH Resource Selection in Sidelink Transmission Mode 4

When requested by higher layers in subframe n, the UE shall determine the set of resources to be reported to higher layers for PSSCH transmission according to the following steps. Parameters $L_{subCH}$ the number of sub-channels to be used for the PSSCH transmission in a subframe, $P_{rsvp\_TX}$ the resource reservation interval, and $prio_{TX}$ the priority to be transmitted in the associated SCI format 1 by the UE are all provided by higher layers. $C_{resel}$ is determined according to Subclause 14.1.1.4B.

If partial sensing is not configured by higher layers then the following steps are used:

1) A candidate single-subframe resource for PSSCH transmission $R_{x,y}$ is defined as a set of $L_{subCH}$ contiguous sub-channels with sub-channel x+j in subframe $t_y^{SL}$ where j=0, . . . , $L_{subCH}$−1. The UE shall assume that any set of $L_{subCH}$ contiguous sub-channels included in the corresponding PSSCH resource pool (described in 14.1.5) within the time interval [n+$T_1$, n+$T_2$] corresponds to one candidate single-subframe resource, where selections of $T_1$ and $T_2$ are up to UE implementations under $T_1 \leq 4$ and $20 \leq T_2 \leq 100$. UE selection of $T_2$ shall fulfill the latency requirement. The total number of the candidate single-subframe resources is denoted by $M_{total}$.

2) The UE shall monitor subframes $t_{n'-10 \times P_{step}}^{SL}$, $t_{n'-10 \times P_{step}+1}^{SL}$, . . . , $t_{n'-1}^{SL}$ except for those in which its transmissions occur, where $t_{n'}^{SL}$=n if subframe n belongs to the set ($t_0^{SL}$, $t_1^{SL}$, . . . , $t_{T_{max}}^{SL}$), otherwise subframe $t_{n'}^{SL}$ is the first subframe after subframe n belonging to the set ($t_0^{SL}$, $t_1^{SL}$, . . . , $t_{T_{max}}^{SL}$). The UE shall perform the behaviour in the following steps based on PSCCH decoded and S-RSSI measured in these subframes.

3) The parameter $Th_{a,b}$ is set to the value indicated by the i-th SL-ThresPSSCH-RSRP field in SL-ThresPSSCH-RSRP-List where i=a*8+b+1.

4) The set $S_A$ is initialized to the union of all the candidate single-subframe resources. The set $S_B$ is initialized to an empty set.

5) The UE shall exclude any candidate single-subframe resource $R_{x,y}$ from the set $S_A$ if it meets all the following conditions:

the UE has not monitored subframe $t_z^{SL}$ in Step 2.

there is an integer j which meets y+j×$P'_{rsvp\_TX}$=z+$P_{step}$×k×q where j=0, 1, . . . , $C_{reset}$−1, $P'_{rsvp\_TX}$=$P_{step}$×$P_{rsvp\_TX}$/100, k is any value allowed by the higher layer parameter restrictResourceReservationPeriod and q=1,2, . . . , Q. Here, $$Q = \frac{1}{k}$$

if k<1 and n'−z≤$P_{step}$×k, where $t_n^{SL}$=n if subframe n belongs to the set $t_0^{SL}$, $t_1^{SL}$, . . . , $t_{T_{max}}^{SL}$, otherwise subframe $t_{n'}^{SL}$ is the first subframe belonging to the set $t_0^{SL}$, $t_1^{SL}$, . . . , $t_{T_{max}}^{SL}$ after subframe n; and Q=1 otherwise.

6) The UE shall exclude any candidate single-subframe resource $R_{x,y}$ from the set $S_A$ if it meets all the following conditions:

the UE receives an SCI format 1 in subframe $t_m^{SL}$, and "Resource reservation" field and "Priority" field in the received SCI format 1 indicate the values $P_{rsvp\_RX}$ and $prio_{RX}$, respectively according to Subclause 14.2.1.

PSSCH-RSRP measurement according to the received SCI format 1 is higher than $Th_{prio_{TX},prio_{RX}}$.

the SCI format received in subframe $t_m^{SL}$ or the same SCI format 1 which is assumed to be received in subframes $$t_{m+q \times P_{step} \times P_{rsvp\_RX}}^{SL}$$

determines according to 14.1.1.4C the set of resource blocks and subframes which overlaps with $$R_{x,y+j \times P'_{rsvp\_TX}}$$

for q=1, 2, . . . , Q and J=0, 1, . . . , $C_{reset}$−1. Here $$Q = \frac{1}{P_{rsvp\_RX}}$$

$P_{rsvp\_RX}$<1 and n'−m≤$P_{step}$×$P_{rsvp\_RX}$, where $t_{n'}^{SL}$=n if subframe n belongs to the set $(t_0^{SL}, t_1^{SL}, \ldots, t_{T_{max}}^{SL})$, otherwise subframe $t_{n'}^{SL}$ is the first subframe after subframe n belonging to the set $(t_0^{SL}, t_1^{SL}, \ldots, t_{T_{max}}^{SL})$; otherwise Q=1.

7) If the number of candidate single-subframe resources remaining in the set $S_A$ is smaller than 0.2·$M_{total}$, then Step 4 is repeated with $Th_{a,b}$ increased by 3 dB.

8) For a candidate single-subframe resource $R_{x,y}$ remaining in the set $S_A$, the metric $E_{x,y}$ is defined as the linear average of S-RSSI measured in sub-channels x+k for k=0, . . . , $L_{subCH}$−1 in the monitored subframes in Step 2 that can be expressed by $t_{y-P_{step}*j}^{SL}$ for a non-negative integer j if $P_{rsvp\_TX}$≥100, and $$t_{y-P'_{rsvp\_TX}*j}^{SL}$$

for a non-negative integer j otherwise.

9) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to 0.2·$M_{total}$.

The UE shall report set $S_B$ to higher layers.

If partial sensing is configured by higher layers then the following steps are used:

1) A candidate single-subframe resource for PSSCH transmission $R_{x,y}$ is defined as a set of $L_{subCH}$ contiguous sub-channels with sub-channel x+j in subframe $t_y^{SL}$ where j=0, . . . , $L_{subCH}$−1. The UE shall determine by its implementation a set of subframes which consists of at least Y subframes within the time interval [n+$T_1$, n+$T_2$] where selections of $T_1$ and $T_2$ are up to UE implementations under $T_1$≤4 and 20≤$T_2$≤100. UE selection of $T_2$ shall fulfill the latency requirement and Y shall be greater than or equal to the high layer parameter minNumCandidateSF. The UE shall assume that any set of $L_{subCH}$ contiguous sub-channels included in the corresponding PSSCH resource pool (described in 14.1.5) within the determined set of subframes correspond to one candidate single-subframe resource. The total number of the candidate single-subframe resources is denoted by $M_{total}$.

2) If a subframe $t_y^{SL}$ is included in the set of subframes in Step 1, the UE shall monitor any subframe $t_{y-k \times P_{step}}^{SL}$ if k-th bit of the high layer parameter gapCandidateSensing is set to 1. The UE shall perform the behaviour in the following steps based on PSCCH decoded and S-RSSI measured in these subframes.

3) The parameter $Th_{a,b}$ is set to the value indicated by the i-th SL-ThresPSSCH-RSRP field in SL-ThresPSSCH-RSRP-List where i=a*8+b+1.

4) The set $S_A$ is initialized to the union of all the candidate single-subframe resources. The set $S_B$ is initialized to an empty set.

5) The UE shall exclude any candidate single-subframe resource $R_{x,y}$ from the set $S_A$ if it meets all the following conditions:
   the UE receives an SCI format 1 in subframe $t_m^{SL}$, and "Resource reservation" field and "Priority" field in the received SCI format 1 indicate the values $P_{rsvp\_RX}$ and $prio_{RX}$, respectively according to Subclause 14.2.1.
   PSSCH-RSRP measurement according to the received SCI format 1 is higher than $Th_{prio_{TX},prio_{RX}}$.
   the SCI format received in subframe $t_m^{SL}$ or the same SCI format 1 which is assumed to be received in subframe(s)

$$t_{m+q \times P_{step} \times P_{rsvp\_RX}}^{SL}$$

determines according to 14.1.1.4C the set of resource blocks and subframes which overlaps with $$R_{x,y+j \times P'_{rsvp\_TX}}$$

for q=1, 2, . . . , Q and j=0, 1, . . . , $C_{reset}$−1. Here $$Q = \frac{1}{P_{rsvp\_RX}}$$

if $P_{rsvp\_RX}$<1 and y'−m≤$P_{step}$×$P_{rsvp\_RX}$+$P_{step}$, where $t_{y'}^{SL}$ is the last subframe of the Y subframes, and Q=1 otherwise.

6) If the number of candidate single-subframe resources remaining in the set $S_A$ is smaller than 0.2·$M_{total}$, then Step 4 is repeated with $Th_{a,b}$ increased by 3 dB.

7) For a candidate single-subframe resource $R_{x,y}$ remaining in the set $S_A$, the metric $E_{x,y}$ is defined as the linear average of S-RSSI measured in sub-channels x+k for k=0, . . . , $L_{subCH}$−1 in the monitored subframes in Step 2 that can be expressed by $t_{y-P_{step}*j}^{SL}$ for a non-negative integer j.

8) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to 0.2·$M_{total}$.

The UE shall report set $S_B$ to higher layers.

[ . . . ]

14.1.5 UE Procedure for Determining Resource Block Pool and Subframe Pool for Sidelink Transmission Mode 3 and 4

The set of subframes that may belong to a PSSCH resource pool for sidelink transmission mode 3 or 4 is denoted by $(t_0^{SL}, t_1^{SL}, \ldots, t_{T_{max}}^{SL})$ where
   0≤$t_i^{SL}$<10240,
   the subframe index is relative to subframe #0 of the radio frame corresponding to SFN 0 of the serving cell or DFN 0 (described in [11]),
   the set includes all the subframes except the following subframes,
      subframes in which SLSS resource is configured,
      downlink subframes and special subframes if the sidelink transmission occurs in a TDD cell, reserved subframes which are determined by the following steps:
1) the remaining subframes excluding $N_{slss}$ and $N_{dssf}$ subframes from the set of all the subframes are denoted by $(l_0, l_1, \ldots, l_{(10240-N_{slss}-N_{dssf}-1)})$ arranged in increasing order of subframe index, where $N_{slss}$ is the number of subframes in which SLSS resource is configured within 10240 subframes and $N_{dssf}$ is the number of downlink subframes and special subframes within 10240 subframes if the sidelink transmission occurs in a TDD cell.
2) a subframe $l_r (0 \leq r < (10240-N_{slss}-N_{dssf}))$ belongs to the reserved subframes if $$r = \left\lfloor \frac{m \cdot (10240 - N_{slss} - N_{dssf})}{N_{reserved}} \right\rfloor$$

where $m=0, \ldots, N_{reserved}-1$ and $N_{reserved}=(10240-N_{slss}-N_{dssf}) \bmod L_{bitmap}$. Here, $L_{bitmap}$ the length of the bitmap is configured by higher layers.

the subframes are arranged in increasing order of subframe index.

The UE determines the set of subframes assigned to a PSSCH resource pool as follows:
A bitmap $(b_0, b_1, \ldots, b_{L_{bitmap}})$ associated with the resource pool is used where $L_{bitmap}$ the length of the bitmap is configured by higher layers.
A subframe $t_k^{SL} (0 \leq k < (10240-N_{slss}-N_{dssf}-N_{reserved}))$ belongs to the subframe pool if $b_{k'}=1$ where $k'=k \bmod L_{bitmap}$.

The UE determines the set of resource blocks assigned to a PSSCH resource pool as follows:
The resource block pool consists of $N_{subCH}$ sub-channels where $N_{subCH}$ is given by higher layer parameter numSubchannel.
The sub channel m for $m=0, 1, \ldots, N_{subCH}-1$ consists of a set of $n_{subCHsize}$ contiguous resource blocks with the physical resource block number $n_{PRB}=n_{subCHRBstart}+m*n_{subCHsize}+j$ for $j=0, 1, \ldots, n_{subCHsize}-1$ where $n_{subCHRBstart}$ and $n_{subCHsize}$ are given by higher layer parameters startRBSubchannel and sizeSubchannel, respectively

[ . . . ]

14.2 Physical Sidelink Control Channel Related Procedures

[ . . . ]

For sidelink transmission mode 3, if a UE is configured by higher layers to receive DCI format 5A with the CRC scrambled by the SL-V-RNTI or SL-SPS-V-RNTI, the UE shall decode the PDCCH/EPDCCH according to the combination defined in Table 14.2-2. A UE is not expected to receive DCI format 5A with size larger than DCI format 0 in the same search space that DCI format 0 is defined on.

TABLE 14.2-2

| PDCCH/EPDCCH configured by SL-V-RNTI or SL-SPS-V-RNTI | |
|---|---|
| DCI format | Search Space |
| DCI format 5A | For PDCCH: Common and UE specific by C-RNTI |
| | For EPDCCH: UE specific by C-RNTI |

The carrier indicator field value in DCI format 5A corresponds to v2x-InterFreqInfo.

[ . . . ]

14.2.1 UE Procedure for Transmitting the PSCCH

[ . . . ]

For sidelink transmission mode 3,
The UE shall determine the subframes and resource blocks for transmitting SCI format 1 as follows:
SCI format 1 is transmitted in two physical resource blocks per slot in each subframe where the corresponding PSSCH is transmitted.
If the UE receives in subframe n DCI format 5A with the CRC scrambled by the SL-V-RNTI, one transmission of PSCCH is in the PSCCH resource $L_{Init}$ (described in Subclause 14.2.4) in the first subframe that is included in $(t_0^{SL}, t_1^{SL}, t_2^{SL}, \ldots)$ and that starts not earlier than $$T_{DL} - \frac{N_{TA}}{2} \times T_S + (4+m) \times 10^{-3}.$$

$L_{Init}$ is the value indicated by "Lowest index of the sub-channel allocation to the initial transmission" associated with the configured sidelink grant (described in [8]), $(t_0^{SL}, t_1^{SL}, t_2^{SL}, \ldots)$ is determined by Subclause 14.1.5, the value m indicated by 'SL index' field in the corresponding DCI format 5A according to Table 14.2.1-1 if this field is present and $m=0$ otherwise, $T_{DL}$ is the start of the downlink subframe carrying the DCI, and $N_{TA}$ and $T_S$ are described in [3].
If "Time gap between initial transmission and retransmission" in the configured sidelink grant (described in [8]) is not equal to zero, another transmission of PSCCH is in the PSCCH resource $L_{ReTX}$ in subframe $t_{q+SF_{gap}}^{SL}$, where $SF_{gap}$ is the value indicated by "Time gap between initial transmission and retransmission" field in the configured sidelink grant, subframe $t_q^{SL}$ corresponds to the subframe $n+k_{init}$. $L_{ReTX}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.
If the UE receives in subframe n DCI format 5A with the CRC scrambled by the SL-SPS-V-RNTI, the UE shall consider the received DCI information as a valid sidelink semi-persistent activation or release only for the SPS configuration indicated by the SL SPS configuration index field. If the received DCI activates an SL SPS configuration, one transmission of PSCCH is in the PSCCH resource $L_{init}$ (described in Subclause 14.2.4) in the first subframe that is included in $(t_0^{SL}, t_1^{SL}, t_2^{SL}, \ldots)$ and that starts not earlier than $$T_{DL} - \frac{N_{TA}}{2} \times T_S + (4+m) \times 10^{-3}.$$

$L_{Init}$ is the value indicated by "Lowest index of the sub-channel allocation to the initial transmission" associated with the configured sidelink grant (described in [8]), $(t_0^{SL}, t_1^{SL}, t_2^{SL}, \ldots)$ is determined by Subclause 14.1.5, the value m is indicated by 'SL index' field in the corresponding DCI format 5A according to Table 14.2.1-1 if this field is present and m=0 otherwise, $T_{DL}$ is the start of the downlink subframe carrying the DCI, and $N_{TA}$ and $T_S$ are described in [3].

If "Time gap between initial transmission and retransmission" in the configured sidelink grant (described in [8]) is not equal to zero, another transmission of PSCCH is in the PSCCH resource $L_{ReTX}$ in subframe $t_{q+SF_{gap}}^{SL}$, where $SF_{gap}$ is the value indicated by "Time gap between initial transmission and retransmission" field in the configured sidelink grant, subframe $t_q^{SL}$ corresponds to the subframe $n+k_{init}$. $L_{ReTX}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.

The UE shall set the contents of the SCI format 1 as follows:
- the UE shall set the Modulation and coding scheme as indicated by higher layers.
- the UE shall set the "Priority" field according to the highest priority among those priority(s) indicated by higher layers corresponding to the transport block.
- the UE shall set the Time gap between initial transmission and retransmission field, the Frequency resource location of the initial transmission and retransmission field, and the Retransmission index field such that the set of time and frequency resources determined for PSSCH according to Subclause 14.1.1.4C is in accordance with the PSSCH resource allocation indicated by the configured sidelink grant.
- the UE shall set the Resource reservation to zero.
- Each transmission of SCI format 1 is transmitted in one subframe and two physical resource blocks per slot of the subframe.

The UE shall randomly select the cyclic shift $n_{cs,\lambda}$ among $\{0, 3, 6, 9\}$ in each PSCCH transmission.

3GPP TS 36.212 V15.1.0 (2018-03) specifies DCI format 5A from network node for scheduling PSCCH transmission on PC5 interface, and SCI format 1 from UE for scheduling PSSCH transmission on PC5 interface. 3GPP TS 36.212 V15.1.0 is states:

5.3.3.1.9A Format 5A

DCI format 5A is used for the scheduling of PSCCH, and also contains several SCI format 1 fields used for the scheduling of PSSCH.

The following information is transmitted by means of the DCI format 5A:

Carrier indicator—3 bits. This field is present according to the definitions in [3].

Lowest index of the subchannel allocation to the initial transmission—$\lceil \log_2(N_{subchannel}^{SL}) \rceil$ bits as defined in section 14.1.1.4C of [3].

SCI format 1 fields according to 5.4.3.1.2:
  Frequency resource location of initial transmission and retransmission.
  Time gap between initial transmission and retransmission.

SL index—2 bits as defined in section 14.2.1 of [3] (this field is present only for cases with TDD operation with uplink-downlink configuration 0-6).

When the format 5A CRC is scrambled with SL-SPS-V-RNTI, the following fields are present:
  SL SPS configuration index—3 bits as defined in section 14.2.1 of [3].
  Activation/release indication—1 bit as defined in section 14.2.1 of [3].

If the number of information bits in format 5A mapped onto a given search space is less than the payload size of format 0 mapped onto the same search space, zeros shall be appended to format 5A until the payload size equals that of format 0 including any padding bits appended to format 0. If the format 5A CRC is scrambled by SL-V-RNTI and if the number of information bits in format 5A mapped onto a given search space is less than the payload size of format 5A with CRC scrambled by SL-SPS-V-RNTI mapped onto the same search space and format 0 is not defined on the same search space, zeros shall be appended to format 5A until the payload size equals that of format 5A with CRC scrambled by SL-SPS-V-RNTI.

[ . . . ]

5.4.3.1.2 SCI Format 1

SCI format 1 is used for the scheduling of PSSCH.

The following information is transmitted by means of the SCI format 1:

Priority—3 bits as defined in section 4.4.5.1 of [7].

Resource reservation—4 bits as defined in section 14.2.1 of [3].

Frequency resource location of initial transmission and retransmission—$\lceil \log_2(N_{subchannel}^{SL}(N_{subchannel}^{SL}+1)/2) \rceil$ bits as defined in section 14.1.1.4C of [3].

Time gap between initial transmission and retransmission—4 bits as defined in section 14.1.1.4C of [3].

Modulation and coding scheme—5 bits as defined in section 14.2.1 of [3].

Retransmission index—1 bit as defined in section 14.2.1 of [3].

Reserved information bits are added until the size of SCI format 1 is equal to 32 bits. The reserved bits are set to zero.

3GPP TS 36.214 V15.1.0 (2018-03) specifies some measurements for sidelink transmission. 3GPP TS 36.214 V15.1.0 is states:

5.1.28 Sidelink Received Signal Strength Indicator (S-RSSI)

| | |
|---|---|
| Definition | Sidelink RSSI (S-RSSI) is defined as the linear average of the total received power (in [W]) per SC-FDMA symbol observed by the UE only in the configured sub-channel in SC-FDMA symbols 1, 2, . . . , 6 of the first slot and SC-FDMA symbols 0, 1, . . . , 5 of the second slot of a subframe The reference point for the S-RSSI shall be the antenna connector of the UE. If receiver diversity is in use by the UE, the reported value shall not be lower than the corresponding S-RSSI of any of the individual diversity branches |
| Applicable for | RRC_IDLE intra-frequency, RRC_IDLE inter-frequency, RRC_CONNECTED intra-frequency, RRC_CONNECTED inter-frequency |

5.1.29 PSSCH Reference Signal Received Power (PSSCH-RSRP)

| | |
|---|---|
| Definition | PSSCH Reference Signal Received Power (PSSCH-RSRP) is defined as the linear average over the power contributions (in [W]) of the resource elements that carry demodulation reference signals |

| | |
|---|---|
| | associated with PSSCH, within the PRBs indicated by the associated PSCCH.<br>The reference point for the PSSCH-RSRP shall be the antenna connector of the UE.<br>If receiver diversity is in use by the UE, the reported value shall not be lower than the corresponding PSSCH-RSRP of any of the individual diversity branches |
| Applicable for | RRC_IDLE intra-frequency,<br>RRC_IDLE inter-frequency,<br>RRC_CONNECTED intra-frequency,<br>RRC_CONNECTED inter-frequency |

NOTE: The power per resource element is determined from the energy received during the useful part of the symbol, excluding the CP.

Some or all of the following terminology and assumption may be used hereafter.

- BS: a network central unit or a network node in New Radio Access Technology (NR) which is used to control one or more TRPs which are associated with one or more cells. Communication between BS and TRP(s) is via fronthaul. BS may be referred to as central unit (CU), eNB, gNB, or NodeB.
- Transmission and Reception Point (TRP): a TRP provides network coverage and directly communicates with UEs. TRP may be referred to as distributed unit (DU) or network node.
- Cell: a cell is composed of one or more associated TRPs, i.e. coverage of the cell is composed of coverage of some and/or all associated TRP(s). One cell is controlled by one BS. Cell may be referred to as TRP group (TRPG).
- Beam sweeping: in order to cover one, some and/or all possible directions for transmission and/or reception, a number of beams may be used. Since may not be possible to generate all these beams concurrently, beam sweeping means to generate a subset of these beams in one time interval and change generated beam(s) in other time interval(s), i.e. changing beam in time domain. So, all possible directions can be covered after several time intervals.
- Beam sweeping number: necessary number of time interval(s) to sweep beams in one, some and/or all possible directions once for transmission and/or reception. In other words, a signaling applying beam sweeping would be transmitted "beam sweeping number" of times within one time period, e.g. the signaling is transmitted in (at least partially) different beam(s) in different times of the time period.
- Serving beam: serving beam for a UE is a beam generated by a network node, e.g. TRP, which is currently used to communicate with the UE, e.g. for transmission and/or reception.
- Candidate beam: candidate beam for a UE is a candidate of a serving beam. Serving beam may or may not be candidate beam.
- Qualified beam: qualified beam is a beam with radio quality, based on measuring signal on the beam, better than a threshold.
- The best serving beam: The serving beam with the best quality (e.g. the highest beam reference signal received power (BRSRP) value).
- The worst serving beam: The serving beam with the worst quality (e.g. the worst BRSRP value).
- NR-Physical Downlink Control Channel (PDCCH): A channel carries downlink control signal which is used to control communication between a UE and a network side. A network transmits NR-PDCCH on a configured control resource set (CORESET) to the UE.
- Uplink-control signal (UL-control signal): A UL-control signal may be one or more of scheduling request (SR), Channel State Information (CSI), Hybrid Automatic Repeat reQuest (HARQ)-Acknowledgement (HARQ-ACK) and/or HARQ-Negative Acknowledgement (HARQ-NACK) for downlink transmission, etc.
- Slot: a scheduling unit in NR. Slot duration is 14 OFDM symbols.
- Mini-slot: a scheduling unit with duration less than 14 OFDM symbols.
- Slot format information (SFI): Information of slot format of symbols in a slot. A symbol in a slot may belong to one or more of the following types: downlink, uplink, unknown or other. The slot format of a slot may at least convey transmission direction of symbols in the slot.
- DL common signal: data channel carrying common information that targets for multiple UEs in a cell or some and/or all UEs in a cell. Example of DL common signal may be one or more of system information, paging, Random Access Response (RAR), etc.
- DL (Downlink) Ultra-Reliable and Low Latency Communications (URLLC): A type of DL transmission which may require very high reliability and very low latency. To fulfill the latency requirement, an example is to transmit DL URLLC in a mini-slot, e.g. the data duration could be less than 1 slot such as 1~4 OFDM symbol(s) and there may be one or more monitoring occasions for DL URLLC control in a slot. In this example, a UE is configured with a CORESET to monitor for DL URLLC control indicating DL URLLC transmission. The CORESET can be configured on middle symbol of a slot. The DL URLLC transmission may be transmitted on the following few symbols of the CORESET.

Figure 12:
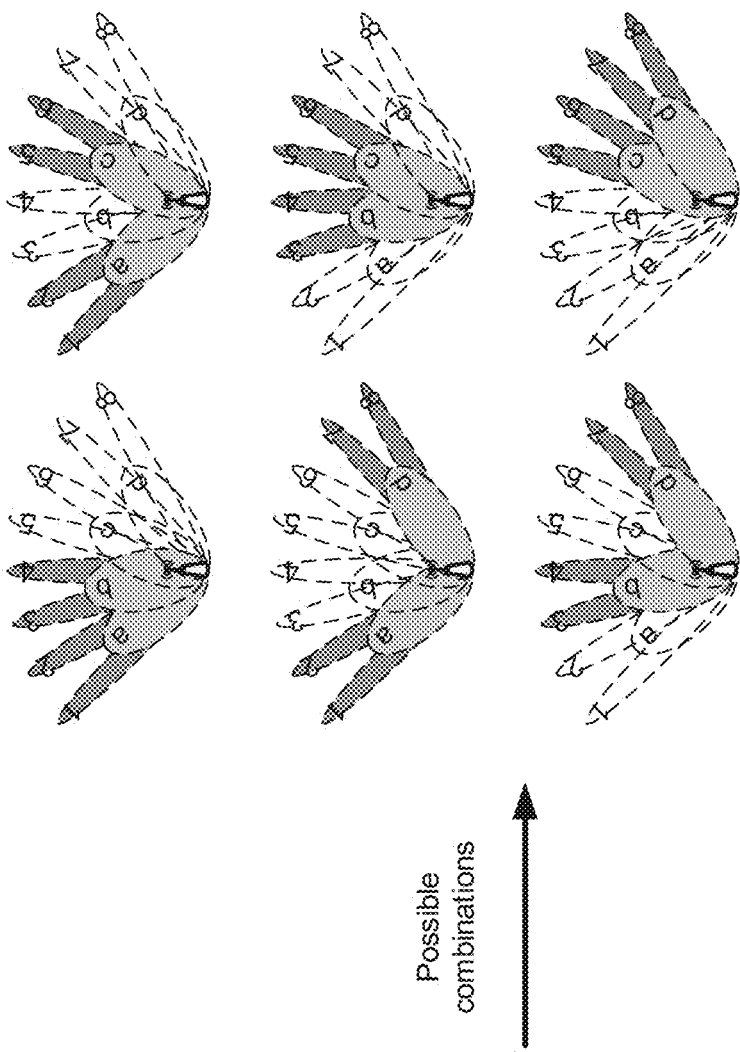
FIG. 12 illustrates exemplary beamforming combinations.
Figure 12:
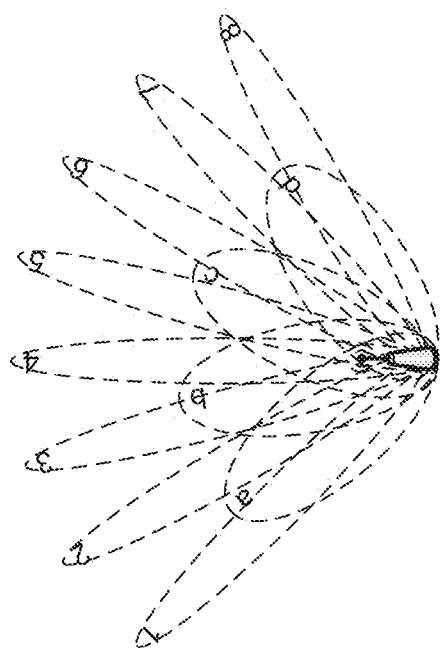

For network side:
- NR using beamforming could be standalone, i.e. UE can directly camp on or connect to NR.
  - NR using beamforming and NR not using beamforming could coexist, e.g. in different cells.
- TRP would apply beamforming to both data and control signaling transmissions and receptions, if possible and beneficial.
  - Number of beams generated concurrently by TRP depends on TRP capability, e.g. maximum number of beams generated concurrently by different TRPs may be different.
  - Beam sweeping is necessary for some cases, e.g. for the control signaling to be provided in multiple directions (and/or every possible direction).
  - (For hybrid beamforming) TRP may not support all beam combinations, e.g. some beams could not be generated concurrently. FIG. 12 illustrates exemplary beamforming combinations (e.g., a UE, a TRP, a network node, etc.) and/or combination limitations of beam generation.
- Downlink timing of TRPs in the same cell are synchronized.
- Radio Resource Control (RRC) layer of network side is in BS.
- TRP should support both UEs with UE beamforming and UEs without UE beamforming, e.g. due to different UE capabilities or UE releases.

For UE side:

UE may perform beamforming for reception and/or transmission, if possible and beneficial.

Number of beams generated concurrently by UE depends on UE capability, e.g. generating more than one beam is possible.

Beam(s) generated by UE are wider than beam(s) generated by TRP, gNB and/or eNB.

Beam sweeping for transmission and/or reception is generally not necessary for user data but may be necessary for other signaling, e.g. to perform measurement.

(For hybrid beamforming) UE may not support all beam combinations, e.g. some beams could not be generated concurrently (as shown in FIG. 12).

Not every UE supports UE beamforming, e.g. due to UE capability or UE beamforming is not supported in NR first (few) release(s).

A UE is possible to generate multiple UE beams concurrently and to be served by multiple serving beams from one or more TRPs of the same cell.

Same or different (DL or UL (Uplink)) data could be transmitted on the same radio resource via different beams for diversity or throughput gain.

There are at least two UE RRC states: connected state (or called active state) and non-connected state (or called inactive state or idle state). Inactive state may be an additional state or belong to connected state or non-connected state.

Figure 13:
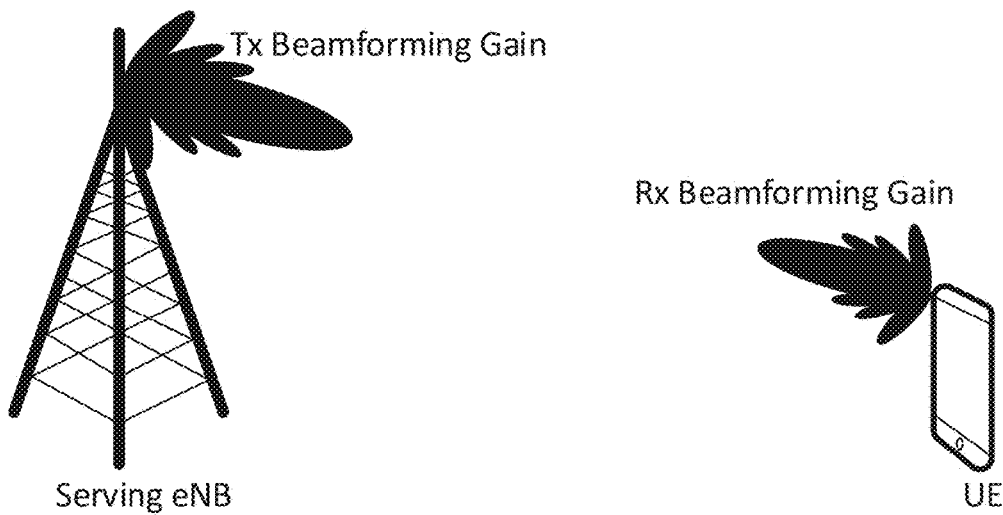
FIG. 13 illustrates beamforming and/or antenna gain.

In accordance with information provided by R2-162251, to use beamforming in both eNB and UE sides, practically, antenna gain by beamforming in eNB is considered about 15 to 30 dBi and the antenna gain of UE is considered about 3 to 20 dBi. FIG. 13 illustrates gain compensation by beamforming. Notably, FIG. 13 is a reproduction of FIG. 3, entitled "Gain compensation by beamforming in HF-NR system", in R2-162251.

Figure 14:
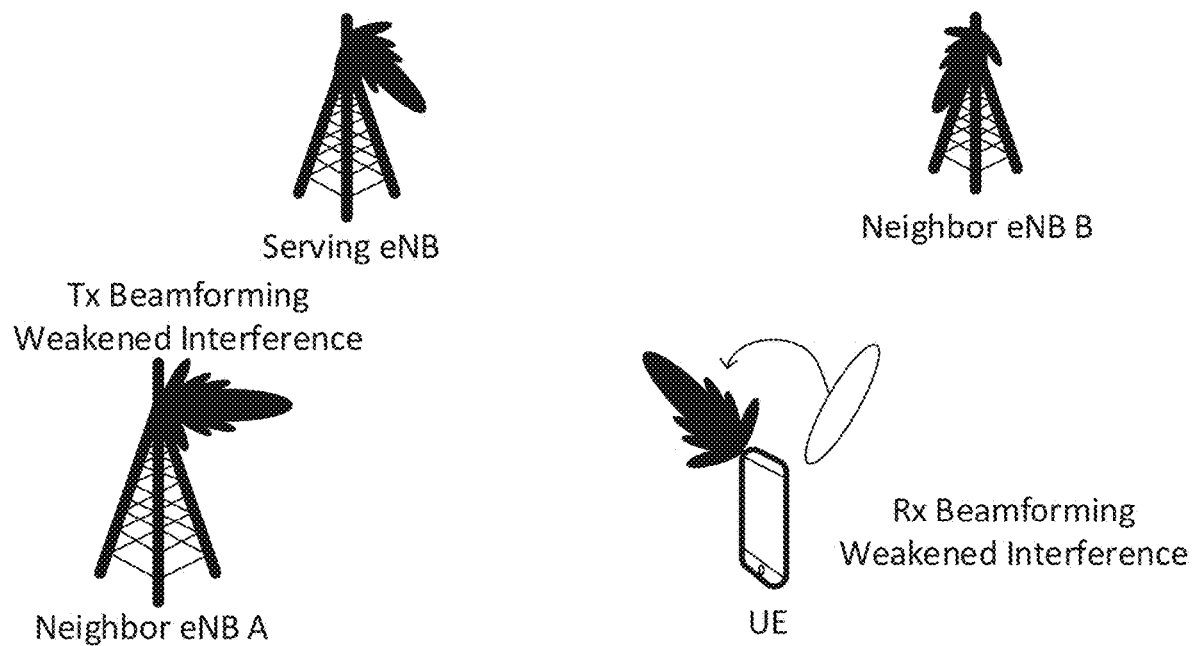
FIG. 14 illustrates beamforming and/or signal interference.

In SINR perspective, sharp beamforming reduces interference power from neighbor interferers, i.e. neighbor eNBs in downlink case or other UEs connected to neighbor eNBs. In TX beamforming case, interference from other TXs whose current beam points the same direction to the RX may be the "effective" interference. The "effective" interference means that the interference power is higher than the effective noise power. In RX beamforming case, interference from other TXs whose beam direction is the same to the UE's current RX beam direction will be the effective interference. FIG. 14 illustrates weakened interference by beamforming. Notably, FIG. 14 is a reproduction of FIG. 4, entitled "Weakened interference by beamforming in HF-NR system", in R2-162251.

For LTE and/or LTE Advanced (LTE-A) Vehicle to everything (V2X) and/or Pedestrian-to-Everything (P2X) transmission, there are at least two transmission modes: one is scheduled via network, such as sidelink transmission mode 3 as shown in 3GPP TS 36.213 V15.1.0 (2018-03); another one is sensing-based transmission, such as sidelink transmission mode 4, as shown in 3GPP TS 36.213 V15.1.0 (2018-03). Since the sensing-based transmission is not scheduled via network, the UE may perform sensing before selecting a resource for transmission, in order to avoid resource collision and interference from or in other UEs.

For sidelink transmission mode 3, the network node may transmit a sidelink grant (SL grant), e.g. DCI format 5A in LTE/LTE-A, on Uu interface for scheduling Physical Sidelink Control Channel (PSCCH) and/or Physical Sidelink Shared Channel (PSSCH). The V2X UE may perform PSCCH and PSSCH on PC5 interface, in response to the receive DCI format 5A. The Uu interface means the wireless interface for communication between network and UE. The PC5 interface means the wireless interface for communication between UEs.

A DCI format 5A may schedule one transmission occasion of PSCCH and/or PSSCH, wherein the DCI format 5A is with CRC scrambled via sidelink V2X Radio Network Temporary Identifier (SL-V-RNTI). Alternatively and/or additionally, the DCI format 5A may schedule semi-persistent periodic transmission occasions of PSCCH and/or PSSCH, wherein the DCI format 5A is with Cyclic Redundancy Checksum (CRC) scrambled via Semi-Persistent Scheduling (SPS) V2X Radio Network Temporary Identifier (RNTI) (SL-SPS-V-RNTI). In some examples, the DCI format 5A with CRC scrambled via SL-SPS-V-RNTI may activated/release semi-persistent periodic transmission occasions of PSCCH and/or PSSCH. The periodicity may be configured in RRC with one of 20, 50, 100, 200, . . . , 1000 ms.

For one transmission occasion, the UE performs a PSSCH (new) transmission and/or a PSSCH retransmission for a transport block. For n transmission occasions, the UE performs n PSSCH (new) transmissions and/or n PSSCH retransmissions for n transport blocks.

In 5G NR, in order to provide a large traffic rate for variable types of requirement and service in the future, wider and higher frequency bandwidths are used to achieve the goal. However, the higher bands in which the transmission is performed, the more severe the propagation loss is. Hence, in NR, beamforming technology has been considered and accepted as a method to alleviate the problem and improve the coverage.

In NR, there may be one or more beam pair links between UE and network to perform communication. Some mechanisms are for network to trace beam quality of beam pair links between network node and UE. For example, network configures one or more than one RS for UE to measure, e.g. Synchronization Signal (SS) Physical Broadcast Channel (PBCH) blocks (SS/PBCH blocks), CSI-RS for beam measurement or L1-Reference Signal Received Power (L1-RSRP) computation. Network can configure one or more than one resource set/setting, wherein UE knows the one or more than one resource set/setting is for beam measurement or L1-RSRP computation. Network can also configure report configuration for UE to report measured beam quality or L1-RSRP value. Alternatively and/or additionally, the network may configure one or more than one Sounding Reference Signals (SRSs) for UE to transmit. Network can measure the SRS transmitted from UE to get the beam quality of beam pair links.

As shown in FIG. 13, there is a beam pair link between network node and UE, wherein the network beam is directional to the UE, and the UE beam is directional to the network. The network node and the UE may perform communication via the beam pair link. It means that the network can perform DL transmission to the UE via the beam pair link. Alternatively and/or additionally, the UE may perform reception via the beam pair link. In some examples, it means that the UE can perform UL transmission to the network node via the beam pair link. Alternatively and/or additionally, the network node may perform reception via the beam pair link. For the same network node, the UE may perform beamforming to generate the same direction beam for UE transmission and UE reception. In some examples, for the same network node, the UE transmission beam and the UE reception beam may be generated with/ toward the same direction (for the same beam pair link). In some examples, the UE transmission beam may be quasi-co-located (QCLed) with the UE reception beam.

As for NR V2X, V2X and/or P2X transmission may be performed in higher frequency band. Beamforming technology may be considered for V2X and/or P2X transmission. In some V2X scenarios, a V2X UE may transmit data/packet(s) to neighboring UEs on different directions, e.g. broadcast-like transmission or group transmission. However, the beam-based transmission may be limited on one or some directions/beams at one time, and the NR does not support a UE transmission on multiple directions/beams for the same data/packet. Thus, how to achieve this kind of V2X transmission may be considered.

In a first solution direction, the network node may provide multiple SL grants, e.g. multiple DCI format 5A, to a UE. The multiple SL grants are for transmitting a same transport block of the UE. The multiple SL grants may indicate a same transport block transmission. In one embodiment, the multiple SL grants may indicate for multiple transmissions on multiple directions/beams for a same transport block. SL grant indicates whether the UE transmits a new transport block or retransmit a transport block on the resource(s) scheduled via the SL grant.

For example, a field in a SL grant indicates whether the UE transmits a new transport block or retransmits a transport block on the resource(s) scheduled via the SL grant. If the field value in current SL grant is the same as the field value in previous SL grant, the UE retransmits the transport block on the resource(s) scheduled via the current SL grant, wherein the transport block is transmitted on the resource(s) scheduled via the previous SL grant. If the field value in current SL grant is toggled comparing to the field value in previous SL grant, the UE transmits a new transport block on the resource(s) scheduled via the current SL grant, wherein the new transport block is not transmitted on the resource(s) scheduled via the previous SL grant. The new transport block transmitted on the resource(s) scheduled via the current SL grant is different from the transport block transmitted on the resource(s) scheduled via the previous SL grant.

In one embodiment, if a current SL grant is for the same transport block as previous SL grant, the UE may switch/change the transmission direction/beam for transmission of the same transport block on the resource(s) scheduled via the current SL grant. The UE does not use the same transmission direction/beam for transmission of the same transport block on the resource(s) scheduled via the current SL grant.

In one embodiment, if a current SL grant is for the same transport block as previous SL grant, the UE may perform transmission for the same transport block on the resource(s) scheduled via the current SL grant on a direction/beam, which is different from transmission direction/beam of the previous transmission for the same transport block on the resource(s) scheduled via the previous SL grant.

In one embodiment, the redundancy version of the transmission for the same transport block on the resource(s) scheduled via the current SL grant is the same as the redundancy version of the transmission for the same transport block on the resource(s) scheduled via the previous SL grant.

In one embodiment, if a current SL grant is for a new transport block, the UE may use the same transmission direction/beam for transmission of the new transport block on the resource(s) scheduled via the current SL grant. The UE may not switch/change transmission direction/beam for transmission of the new transport block on the resource(s) scheduled via the current SL grant.

In one embodiment, if a current SL grant is for a new transport block different from previous SL grant, the UE may perform transmission for the new transport block on the resource(s) scheduled via the current SL grant on a direction/beam, which may be the same as transmission direction/beam of the previous transmission on the resource(s) scheduled via the previous SL grant.

In one embodiment, the redundancy version of the transmission for the new transport block on the resource(s) scheduled via the current SL grant is the same as the redundancy version of the transmission for the previous transport block on the resource(s) scheduled via the previous SL grant.

Figure 15:
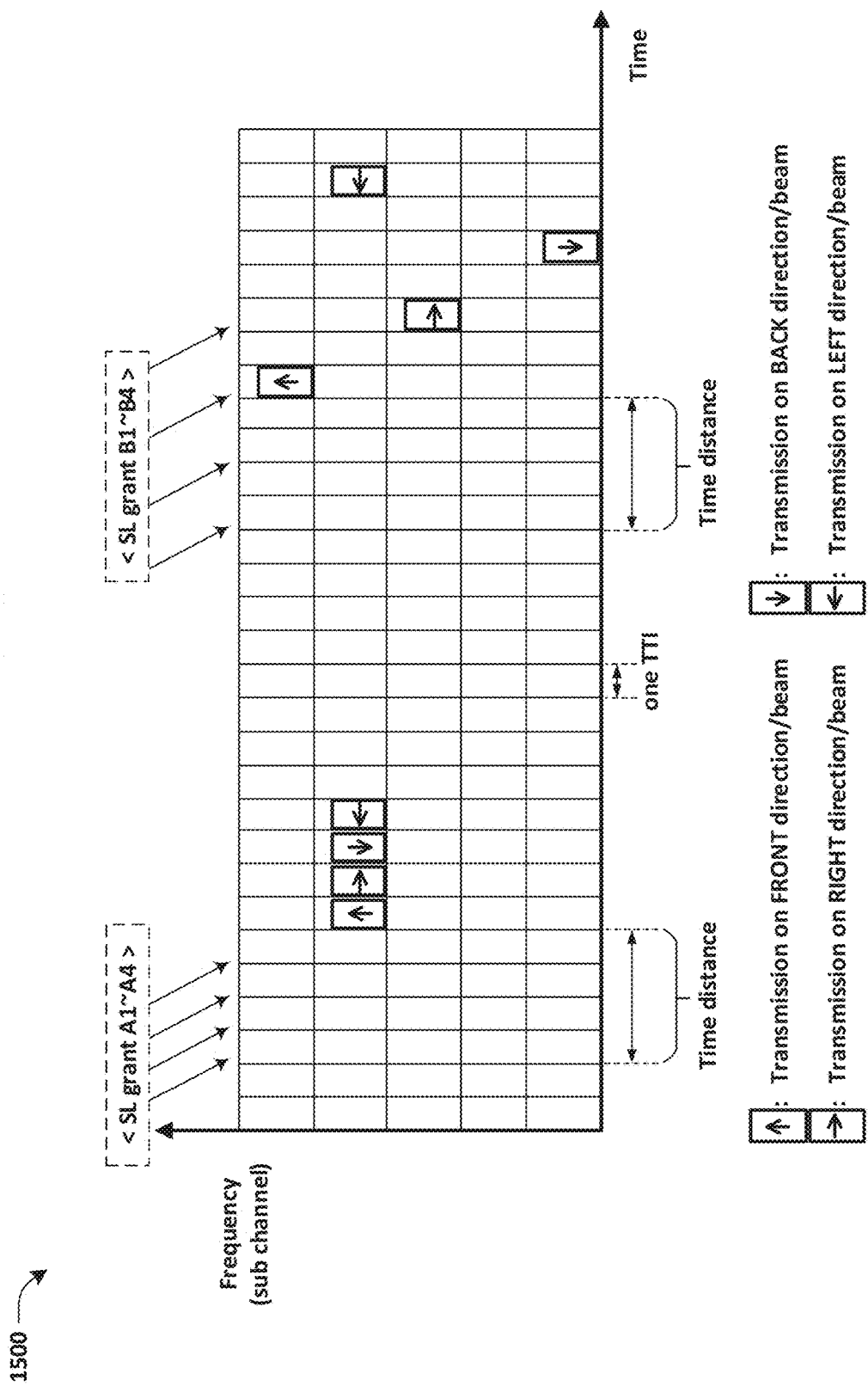
FIG. 15 illustrates an exemplary scenario associated with a network node providing sidelink grants (SL grants) to a UE.

FIG. 15 illustrates an exemplary scenario 1500 associated with the network node providing SL grants to a UE. As shown in FIG. 15, the network node may provide multiple SL grants A1~A4 to the UE, wherein the SL grants A1~A4 indicate a same transport block transmission. In response to the received SL grants, the UE may perform 4 transmissions for the same transport block on the resources indicated by each SL grant. In one embodiment, if the SL grants A1~A4 are for the same transport block, the UE may perform the 4 transmissions on different transmission directions/beams. As shown in FIG. 15, the UE may perform transmission on the resource indicated by SL grant A1 on FRONT direction/beam. The UE may perform transmission on the resource indicated by SL grant A2 on RIGHT direction/beam. The UE may perform transmission on the resource indicated by SL grant A3 on BACK direction/beam. The UE may perform transmission on the resource indicated by SL grant A4 on LEFT direction/beam.

As shown in FIG. 15, the network node may provide multiple SL grants B1~B4 to a UE, wherein the SL grants B1~B4 indicate a same transport block transmission. It means that the resources indicated by the SL grant B1~B4 may be on different frequency resources. In one embodiment, it means that the resources indicated by the SL grant B1~B4 may be on different frequency locations. In one embodiment, it means that the resources indicated by the SL grant B1~B4 may be with the same frequency resource size. In one embodiment, it means that the resources indicated by the SL grant B1~B4 may be in non-adjacent TTIs. In response to the received SL grants, the UE may perform 4 transmissions for the same transport block on the resources indicated by each SL grant. In one embodiment, if the SL grants B1~B4 are for the same transport block, the UE may perform the 4 transmissions on different transmission directions/beams as shown in FIG. 15.

In a second solution direction, the network node may provide one SL grant, e.g. one DCI format 5A, to a UE. The one SL grant may comprise/schedule multiple resource(s) for transmitting a same transport block of the UE. It may reduce signaling overhead between network node and the UE, comparing to the first solution direction.

In one embodiment, the multiple resource(s) for transmitting a same transport block scheduled by one SL grant is considered as one transmission occasion. In one embodiment, the UE transmits one transport block for one transmission occasion. In one embodiment, the multiple resource(s) for transmitting a same transport block scheduled by one SL grant does not mean SPS transmission resources. In one embodiment, SPS transmission resources are for transmitting different transport blocks and for multiple/periodic transmission occasions.

In one embodiment, in response to the received SL grant, the UE may perform multiple transmissions on the multiple resource(s) for the same transport block, wherein the multiple transmissions are transmitted on multiple transmission directions/beams.

In one embodiment, the UE may perform separate transmissions on each one of the multiple resource(s) for the same transport block, wherein the separate transmissions are transmitted on separate transmission directions/beams respectively.

In one embodiment, the UE may perform separate transmissions on each one of part of the multiple resource(s) for the same transport block, wherein the separate transmissions are transmitted on separate transmission directions/beams respectively.

In one embodiment, the separate transmissions may be transmitted on different transmission directions/beams.

In one embodiment, part of the separate transmissions may be transmitted on different transmission directions/beams. In one embodiment, the UE may perform one transmission on one of the multiple resource(s) on one transmission direction/beam, and perform another one transmission on another one of the multiple resource(s) on another one transmission direction/beam, wherein the one transmission and the another one transmission are for the same transport block. In one embodiment, the UE may perform beam sweeping for transmission of the same transport block on the multiple resource(s).

In one embodiment, the redundancy version of the multiple transmissions on multiple transmission directions/beams for the same transport block may be the same. In one embodiment, the multiple transmissions for the same transport block may be broadcast transmission. In one embodiment, the multiple transmissions for the same transport block may be group transmission. In one embodiment, the multiple transmissions for the same transport block may be for a group of UEs. In one embodiment, the multiple transmissions for the same transport block may be for multiple UEs.

In one embodiment, in response to the received SL grant, the UE may perform multiple transmissions on the multiple resource(s) for the same transport block, wherein the multiple transmissions are transmitted on the same transmission direction(s)/beam(s). In one embodiment, the UE may perform one transmission on one of the multiple resource(s) on one transmission direction/beam, and perform another one transmission on another one of the multiple resource(s) on the one transmission direction/beam, wherein the one transmission and the another one transmission are for the same transport block.

In one embodiment, the redundancy version of the multiple transmissions on the same transmission directions/beams for the same transport block may be the same. In one embodiment, the redundancy version of the multiple transmissions on the same transmission directions/beams for the same transport block may be different. In one embodiment, the multiple transmissions for the same transport block may be unicast transmission. In one embodiment, the multiple transmissions for the same transport block may be for one UE. In one embodiment, the multiple transmissions for the same transport block may be group transmission. In one embodiment, the multiple transmissions for the same transport block may be for a group of UEs. In one embodiment, the multiple transmissions for the same transport block may be for multiple UEs.

In one embodiment, the SL grant may indicate a resource number and a (frequency) resource to schedule multiple resources for transmitting a same transport block.

In one embodiment, the resource number indicated by the SL grant may mean the number of multiple resource(s) scheduled for transmissions.

In one embodiment, the frequency resources of the multiple resources scheduled for transmissions are derived base on the indicated (frequency) resource (indicated) by the SL grant. In one embodiment, the multiple resources scheduled for transmissions are with the same frequency resource as the indicated (frequency) resource (indicated) by the SL grant. In one embodiment, the frequency resource size of the multiple resources scheduled for transmissions are the same as the frequency resource size of the indicated (frequency) resource (indicated) by the SL grant. The frequency resource size may mean the number of Physical Resource Blocks (PRBs) or subcarriers. In one embodiment, the frequency resources of the multiple resources scheduled for transmissions are derived based on frequency hopping pattern and the indicated (frequency) resource (indicated) by the SL grant. In one embodiment, the frequency resource locations of the multiple resources scheduled for transmissions are derived based on frequency hopping pattern and frequency resource location of the indicated (frequency) resource (indicated) by the SL grant.

In one embodiment, the multiple resources scheduled for transmitting a same transport block may be separated with a time offset. In one embodiment, each two adjacent resources of the multiple resources scheduled for transmitting a same transport block may be separated with a time offset. In one embodiment, the time offset may be indicated in the SL grant. In one embodiment, the time offset may be configured in higher layer. In one embodiment, the time offset may be different from SPS periodicity. In one embodiment, the time offset may be one slot. In one embodiment, the time offset may be one or more symbols. In one embodiment, the time offset may be 0 symbol/slot. In one embodiment, the multiple resources scheduled for transmitting a same transport block may be located in consecutive Transmission Time Intervals (TTIs). In one embodiment, the multiple resources scheduled for transmitting a same transport block may be located in consecutive TTIs.

Figure 16:
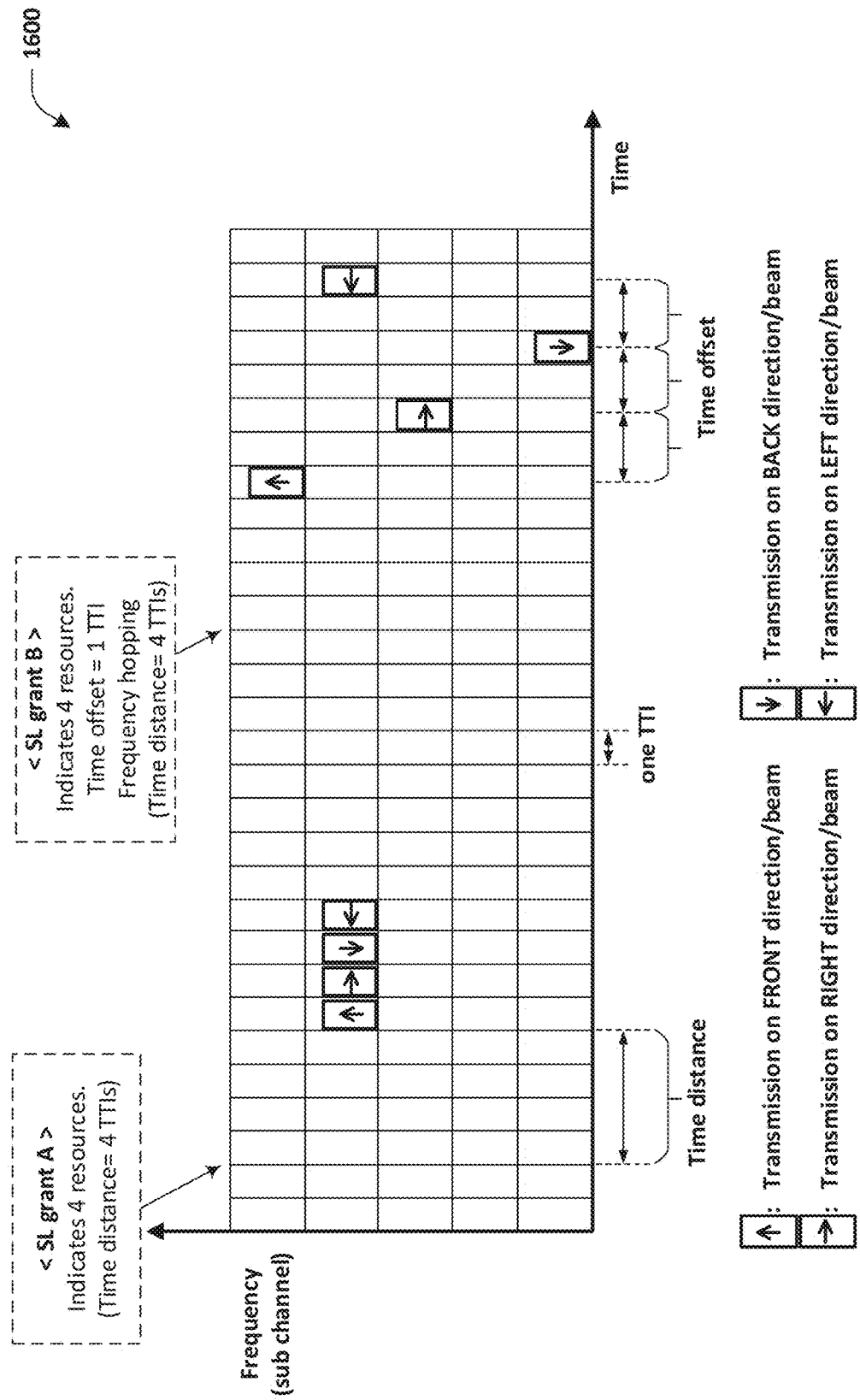
FIG. 16 illustrates an exemplary scenario associated with a network node providing SL grants to a UE.

FIG. 16 illustrates an exemplary scenario 1600 associated with the network node providing SL grants to a UE. As shown in FIG. 16, the network node may provide one SL grant A to a UE, wherein the SL grant A comprises/indicates 4 resources for a same transport block transmission. In response to the received SL grant A, the UE may perform 4 transmissions for the same transport block on the resources indicated by the SL grant A. In one embodiment, the UE may perform the 4 transmissions on different transmission directions/beams. As shown in FIG. 16, the UE may perform transmission on the first resource indicated by SL grant A on FRONT direction/beam. The UE may perform transmission on the second resource indicated by SL grant A on RIGHT direction/beam. The UE may perform transmission on the third resource indicated by SL grant A on BACK direction/beam. The UE may perform transmission on the fourth resource indicated by SL grant A on LEFT direction/beam.

As shown in FIG. 16, the network node may provide one SL grant B to a UE, wherein the SL grant B comprises/indicates 4 resources for a same transport block transmission. The 4 resources may be with 1 TTI time offset. The 4 resources may be applied with frequency hopping. The frequency resource location of the 4 resources may be derived based on frequency hopping pattern and frequency resource location of a indicated (frequency) resource (indicated) by the SL grant. In one embodiment, the indicated (frequency) resource (indicated) by the SL grant B may be the (frequency) resource of the first one resource. In one embodiment, the second, third, and the fourth resources are derived based on frequency hopping pattern and the (frequency) resource of the first one resource. In response to the received SL grant B, the UE may perform 4 transmissions for the same transport block on the resources indicated by the SL grant B. In one embodiment, the UE may perform the 4 transmissions on different transmission directions/beams as shown in the FIG. 16.

In third solution direction, the network node may provide one SL grant, e.g. one DCI format 5A, to a UE. The one SL grant may comprise/schedule multiple resource(s) for the UE. The UE may transmit multiple transport blocks on the scheduled multiple resources. In one embodiment, the multiple resource(s) scheduled by one SL grant does not mean SPS transmission resources.

In one embodiment, in response to the received SL grant, the UE may perform multiple transmissions on the multiple resource(s) for different transport blocks, wherein the multiple transmissions are transmitted on the same transmission direction(s)/beam(s). In one embodiment, the UE may perform one transmission on one of the multiple resource(s) on one transmission direction/beam, and perform another one transmission on another one of the multiple resource(s) on the one transmission direction/beam, wherein the one transmission and the another one transmission are for different transport blocks.

In one embodiment, the redundancy version of the multiple transmissions on the same transmission directions/beams for different transport blocks may be the same.

In one embodiment, the multiple transmissions for different transport blocks may be unicast transmission. In one embodiment, the multiple transmissions for different transport blocks may be for one UE. In one embodiment, the multiple transmissions for different transport blocks may be group transmission. In one embodiment, the multiple transmissions for different transport blocks may be for a group of UEs. In one embodiment, the multiple transmissions for different transport blocks may be for multiple UEs.

In one embodiment, in response to the received SL grant, the UE may perform multiple transmissions on the multiple resource(s) for different transport blocks, wherein the multiple transmissions are transmitted on multiple transmission directions/beams. In one embodiment, the UE may perform separate transmissions on each one of the multiple resource(s) for different transport blocks, wherein the separate transmissions are transmitted on separate transmission directions/beams respectively. In one embodiment, the UE may perform separate transmissions on each one of part of the multiple resource(s) for the same transport block, wherein the separate transmissions are transmitted on separate transmission directions/beams respectively. In one embodiment, the separate transmissions may be transmitted on different transmission directions/beams. In one embodiment, part of the separate transmissions may be transmitted on different transmission directions/beams.

In one embodiment, the UE may perform one transmission on one of the multiple resource(s) on one transmission direction/beam, and perform another one transmission on another one of the multiple resource(s) on another one transmission direction/beam, wherein the one transmission and the another one transmission are for different transport blocks. In one embodiment, the UE may perform beam sweeping for transmission of different transport blocks on the multiple resource(s). In one embodiment, the redundancy version of the multiple transmissions on multiple transmission directions/beams for different transport blocks may be the same. In one embodiment, the multiple transmissions for different transport blocks may be broadcast transmission. In one embodiment, the multiple transmissions for different transport blocks may be group transmission. In one embodiment, the multiple transmissions for the different transport block may be for a group of UEs. In one embodiment, the multiple transmissions for the different transport block may be for multiple UEs.

In one embodiment, the SL grant may indicate a resource number and a (frequency) resource to schedule multiple resources.

In one embodiment, the resource number indicated by the SL grant may mean the number of multiple resource(s) scheduled for transmissions.

In one embodiment, the frequency resources of the multiple resources scheduled for transmissions are derived base on the indicated (frequency) resource (indicated) by the SL grant. In one embodiment, the multiple resources scheduled for transmissions are with the same frequency resource as the indicated (frequency) resource (indicated) by the SL grant. In one embodiment, the frequency resource size of the multiple resources scheduled for transmissions are the same as the frequency resource size of the indicated (frequency) resource (indicated) by the SL grant. The frequency resource size may mean the number of PRBs or subcarriers. In one embodiment, the frequency resources of the multiple resources scheduled for transmissions are derived based on frequency hopping pattern and the indicated (frequency) resource (indicated) by the SL grant. In one embodiment, the frequency resource location of the multiple resources scheduled for transmissions are derived based on frequency hopping pattern and frequency resource location of the indicated (frequency) resource (indicated) by the SL grant.

In one embodiment, the multiple resources scheduled for transmitting a same transport block may be separated with a time offset. In one embodiment, each two adjacent resources of the multiple resources scheduled for transmitting a same transport block may be separated with a time offset. In one embodiment, the time offset may be indicated in the SL grant. In one embodiment, the time offset may be configured in higher layer. In one embodiment, the time offset may be different from SPS periodicity. In one embodiment, the time offset may be one slot. In one embodiment, the time offset may be one or more symbols. In one embodiment, the time offset may be 0 symbol/slot. In one embodiment, the multiple resources scheduled for transmitting different transport blocks may be located in consecutive TTIs. In one embodiment, the multiple resources scheduled for transmitting different transport blocks may be located in consecutive TTIs.

Alternatives are described for the solution directions above.

In one alternative, the UE may receive a grant on a first interface, wherein the grant indicates multiple resources for transmission used on a second interface. The UE may perform multiple transmissions on the multiple resources on the second interface, wherein the multiple transmissions are for a same data/packet and the multiple transmissions are performed on different transmission directions/beams.

In one embodiment, the UE may perform transmission direction/beam sweeping for the multiple transmissions on the multiple resources. In one embodiment, some of the multiple transmissions may be performed on different transmission direction/beams. In one embodiment, some of the transmission directions/beams of the multiple transmissions may be different from each other. In one embodiment, each of the multiple transmissions may be performed on different transmission direction/beam. In one embodiment, the transmission directions/beams of the multiple transmissions may be different from each other.

In one embodiment, the multiple transmissions may be for broadcast transmission. In one embodiment, the multiple transmissions may be for group transmission. In one embodiment, the multiple transmissions may be for multiple UEs. In one embodiment, the multiple transmissions may be for a group of UEs. In one embodiment, redundancy version of the multiple transmissions for the same transport block may be the same.

In another alternative, the UE may receive a grant on a first interface for transmission used on a second interface. The UE may derive at least a first resource and a second resource based on the grant. In one embodiment, the UE may perform a first transmission on the first resource on a first transmission direction/beam and a second transmission on the second resource on a second transmission direction/beam, wherein the first transmission and the second transmission are on the second interface and are for a same data/packet.

In one embodiment, the first resource is in a first TTI. In one embodiment, the second resource is in a second TTI.

In one embodiment, the first transmission direction/beam may be different from the second transmission direction/beam. In one embodiment, the first transmission and the second transmission may be for broadcast transmission. In one embodiment, the first transmission and the second transmission may be for group transmission. In one embodiment, the first transmission and the second transmission may be for multiple UEs. In one embodiment, the first transmission and the second transmission may be for a group of UEs. In one embodiment, redundancy version of the first transmission and the second transmission for the same transport block may be the same.

In another alternative, the UE may receive a grant on a first interface, wherein the grant indicates multiple resources for transmission used on a second interface. The UE may perform multiple transmissions on the multiple resources on one transmission direction/beam on the second interface, wherein the multiple transmissions are for a same data/packet.

In one embodiment, the UE may perform the multiple transmissions on part of the multiple resources on the one transmission direction/beam. In one embodiment, the UE may not perform transmission on remaining part of the multiple resources. In one embodiment, the multiple transmissions may be for unicast transmission. In one embodiment, the multiple transmissions may be for a UE. In one embodiment, the multiple transmissions may be for group transmission. In one embodiment, the multiple transmissions may be for multiple UEs. In one embodiment, the multiple transmissions may be for a group of UEs.

In one embodiment, redundancy version of the multiple transmissions for the same transport block may be the same. In one embodiment, redundancy version of the multiple transmissions for the same transport block may be different.

In another alternative, the UE may receive a grant on a first interface for transmission used on a second interface. The UE may derive at least a first resource and a second resource based on the grant. In one embodiment, the UE may perform a first transmission on the first resource on one transmission direction/beam and a second transmission on the second resource on the one transmission direction/beam, wherein the first transmission and the second transmission are on the second interface and are for a same data/packet.

In one embodiment, the first resource may be in a first TTI. In one embodiment, the second resource may be in a second TTI.

In one embodiment, the first transmission and the second transmission may be for unicast transmission. In one embodiment, the first transmission and the second transmission may be for a UE. In one embodiment, the first transmission and the second transmission may be for group transmission. In one embodiment, the first transmission and the second transmission may be for multiple UEs. In one embodiment, the first transmission and the second transmission may be for a group of UEs.

In one embodiment, redundancy version of the first transmission and the second transmission for the same transport block may be the same. In one embodiment, redundancy version of the first transmission and the second transmission for the same transport block may be different.

Further embodiments are described for the alternatives and solution directions above.

In one embodiment, for one transmission of the multiple transmissions, the UE may transmit scheduling information on the second interface for indicating the one transmission, wherein the scheduling information indicates the resource of the one transmission. In one embodiment, the scheduling information for indicating the one transmission may indicate the resource of the one transmission and does not indicate resources of other transmissions of the multiple transmissions.

In one embodiment, for a subset of the multiple transmissions on one transmission direction/beam, the UE may transmit scheduling information on the second interface for indicating the subset of multiple transmissions, wherein the scheduling information indicates the resources of the subset of multiple transmissions. In one embodiment, the scheduling information for indicating the subset of multiple transmissions on one transmission direction/beam may indicate the resources of the subset of multiple transmissions and does not indicate resources of other transmissions of the multiple transmissions on other transmission directions/beams.

In one embodiment, the UE may transmit first scheduling information on the second interface for indicating the first transmission, wherein the first scheduling information indicates the first resource of the first transmission. In one embodiment, the first scheduling information for indicating the first transmission may indicate the first resource and does not indicate the second resource of the second transmission.

In one embodiment, the UE may transmit second scheduling information on the second interface for indicating the second transmission, wherein the second scheduling information indicates the second resource of the second transmission. In one embodiment, the second scheduling information for indicating the second transmission may indicate the second resource and does not indicate the first resource of the first transmission.

In one embodiment, the UE may perform the multiple transmissions on the second interface starting from a first timing, wherein the first timing is with a timing distance after the timing of receiving the grant.

In one embodiment, the UE may perform the first transmission on the second interface starting from a first timing, wherein the first timing is with a timing distance after the timing of receiving the grant.

In one embodiment, the first TTI may be with a timing distance after the timing of receiving the grant.

In one embodiment, the timing distance may be specified or configured in higher layer. In one embodiment, the timing distance may be indicated in the grant.

In one embodiment, one resource may occupy one TTI. In one embodiment, one resource may occupy one or more than one subchannel in one TTI. In one embodiment, one resource may occupy one set of subchannels in one TTI. In one embodiment, for a transmission on one resource, the UE may perform a PSSCH transmission on the one set of subchannels in the one TTI. In one embodiment, the scheduling information may be PSCCH. In one embodiment, for a transmission on one resource, the UE may perform a PSCCH for scheduling a PSSCH transmission.

Alternatively and/or additionally, one resource may occupy N TTIs. In one embodiment, one resource may occupy N sets of subchannels in N different TTIs. In one embodiment, for a transmission on one resource, the UE may perform N PSSCH transmissions on the N sets of subchannels in the N different TTIs. In one embodiment, the UE may perform a PSSCH transmission on one set of subchannels in one TTI. In one embodiment, the N PSSCH transmissions may be for the same data/packet. In one embodiment, the N PSSCH transmissions may be with different redundancy version for the same data/packet.

In one embodiment, for a transmission on one resource, the first PSSCH transmission in the first set of subchannels may be new transmission for the same data/packet. In one embodiment, for a transmission on one resource, the PSSCH transmission(s) other than the first PSSCH transmission may be PSSCH retransmission(s) of the first PSSCH transmission for the same data/packet. In one embodiment, the N PSSCH transmissions may be not SPS/periodic PSSCH transmissions. In one embodiment, N may be 2.

In one embodiment, redundancy version of the multiple transmissions are the same may mean that redundancy version of the n-th PSSCH transmission in the n-th set of subchannels of the multiple transmissions are the same, wherein $1 \leq n \leq N$. In one embodiment, redundancy version of the multiple transmissions are different may mean that redundancy version of the n-th PSSCH transmission in the n-th set of subchannels of the multiple transmissions are different, wherein $1 \leq n \leq N$. In one embodiment, redundancy version of the first transmission and the second transmission are the same may mean that redundancy version of the n-th PSSCH transmission in the n-th set of subchannels of the first transmission and the second transmission are the same, wherein $1 \leq n \leq N$. In one embodiment, redundancy version of the first transmission and the second transmission are different may mean that redundancy version of the n-th PSSCH transmission in the n-th set of subchannels of the first transmission and the second transmission are different, wherein $1 \leq n \leq N$.

In one embodiment, the scheduling information may be PSCCH. In one embodiment, for a transmission on one resource, the UE may perform N PSCCH for scheduling N PSSCH transmissions on the N sets of subchannels in the N different TTI.

In one embodiment, the grant may be transmitted from network node. In one embodiment, the grant is SL grant.

In one embodiment, the grant may indicate a frequency resource and indicate a first TTI and a second TTI. In one embodiment, the first resource may be with the same frequency resource as the indicated frequency resource and in the first TTI. The second resource may be with the same frequency resource as the indicated frequency resource and in the second TTI.

In one embodiment, the grant may indicate a resource number. In one embodiment, the grant may indicate an (frequency) resource. In one embodiment, the UE may derive the multiple resources based on the resource number and the indicated (frequency) resource. In one embodiment, the UE may derive the first resource and the second resource based on the resource number and the indicated (frequency) resource.

In one embodiment, the resource number indicated by the grant may mean the number of multiple resources. In one embodiment, the resource number indicated by the grant may be larger than one.

In one embodiment, the multiple resources may be the same in the frequency domain. In one embodiment, the multiple resources may be with the same frequency resource size. In one embodiment, the frequency resource size of the multiple resources may be the same as an indicated (frequency) resource (indicated) by the grant. In one embodiment, frequency resource size may mean the number of PRBs or subcarriers.

In one embodiment, the multiple resources may be in the same frequency resource location. In one embodiment, the frequency resource location of the multiple resources may be the same as an indicated (frequency) resource (indicated) by the grant.

Alternatively and/or additionally, the multiple resources may be in different frequency resource locations. In one embodiment, the frequency resources of the multiple resources may be derived based on frequency hopping pattern and an indicated (frequency) resource (indicated) by the grant. In one embodiment, the frequency resource locations of the multiple resources may be derived based on frequency hopping pattern and an indicated (frequency) resource (indicated) by the grant.

In one embodiment, the first resource and the second resource may be the same in the frequency domain. In one embodiment, the first resource and the second resource may be with the same frequency resource size. In one embodiment, the frequency resource size of the first resource and the second resource may be the same as an indicated (frequency) resource (indicated) by the grant. In one embodiment, frequency resource size may mean the number of PRBs or subcarriers.

In one embodiment, the first resource and the second resource may be in the same frequency resource location. In one embodiment, the frequency resource location of the first resource and the second resource may be the same as an indicated (frequency) resource (indicated) by the grant.

Alternatively and/or additionally, the first resource and the second resource may be in different frequency resource locations. In one embodiment, the frequency resources of the first resource and the second resource may be derived based on frequency hopping pattern and an indicated (frequency) resource (indicated) by the grant. In one embodiment, the frequency resource locations of the first resource and the second resource may be derived based on frequency hopping pattern and an indicated (frequency) resource (indicated) by the grant.

In one embodiment, the multiple resources may be associated with different TTIs. In one embodiment, the multiple resources may be associated with different TTIs within one transmission occasion. In one embodiment, the multiple resources may be different in time domain. In one embodiment, the multiple resources may be in different TTIs in time domain. In one embodiment, the multiple resources may be separated with a time offset. In one embodiment, each two adjacent resources of the multiple resources may be separated with a time offset.

In one embodiment, the first TTI may be different from the second TTI. In one embodiment, the first resource and the second resource may be associated with different TTIs within one transmission occasion. In one embodiment, the first resource and the second resource may be different in time domain. In one embodiment, the first resource and the second resource may be separated with a time offset.

In one embodiment, the time offset may be indicate in the grant. In one embodiment, the time offset may be configured by higher layer. In one embodiment, the time offset may be different from SPS periodicity.

In one embodiment, the time offset may be in unit of TTI. In one embodiment, the time offset may be in unit of slot. In one embodiment, the time offset may be one slot. In one embodiment, the time offset may be in unit of symbol. In one embodiment, the time offset may be one or more symbols. In one embodiment, the time offset may be 0 symbol/slot. In one embodiment, the multiple resources may be in consecutive TTIs.

In one embodiment, the multiple resource(s) indicated by the grant may be considered as one transmission occasion. In one embodiment, the multiple resource(s) for a same data/packet indicated by the grant may be considered as one transmission occasion.

In one embodiment, the first resource and the second resource indicated by the grant may be considered as one transmission occasion. In one embodiment, the first resource and the second resource for a same data/packet indicated by the grant may be considered as one transmission occasion.

In one embodiment, the UE may transmit one data/packet for one transmission occasion. In one embodiment, SPS resources may be for transmitting different data/packets and are for multiple/periodic transmission occasions.

In one embodiment, one transmission occasion may comprise one TTI. In one embodiment, one transmission occasion may comprise multiple TTIs. In one embodiment, one transmission occasion may comprise multiple consecutive TTIs In one embodiment, the transmission may be device-to-device transmission. In one embodiment, the transmission may be V2X transmission. In one embodiment, the transmission may be P2X transmission. In one embodiment, the transmission may be on PC5 interface. In one embodiment, the transmission may be sidelink transmission.

In one embodiment, the first interface may be Uu interface. In one embodiment, the first interface may be wireless interface for communication between network node and UE.

In one embodiment, the second interface may be PC5 interface. In one embodiment, the second interface may be wireless interface for communication between UEs. In one embodiment, the second interface may be wireless interface for communication between devices. In one embodiment, the second interface may be wireless interface for V2X or P2X communication.

In one embodiment, the frequency resource may comprise one or more subchannels. In one embodiment, the frequency resource may comprise one or more (physical) resource blocks.

In one embodiment, the TTI may mean slot. In one embodiment, the TTI may mean mini-slot. In one embodiment, the TTI may mean subframe. In one embodiment, the TTI may mean symbol. In one embodiment, the TTI may mean a set of symbols. In one embodiment, the TTI may mean milliseconds.

In one embodiment, the data/packet may mean a transport block. In one embodiment, the data/packet may mean a Medium Access Control (MAC) Protocol Data Unit (PDU). In one embodiment, the data/packet may mean a data packet.

In one embodiment, the UE may perform the multiple transmissions on the multiple transmission directions/beams means that the UE may perform the multiple transmissions with Quasi Co-Location (QCL) associated to different reference signals for transmission. In one embodiment, the multiple transmission directions/beams for the multiple transmissions may be (automatously) selected/determined/controlled by the UE.

In one embodiment, the UE may perform the first transmission on the first transmission direction/beam means that the UE may perform the first transmission with QCL associated to a first reference signal for transmission. In one embodiment, the UE may transmit the first scheduling information on the first transmission direction/beam means that the UE may transmit the first scheduling information with QCL associated to a first reference signal for transmission.

In one embodiment, the UE may perform the second transmission on the second transmission direction/beam means that the UE may perform the second transmission with QCL associated to a second reference signal for transmission. In one embodiment, the UE may transmit the second scheduling information on the second transmission direction/beam means that the UE may transmit the second scheduling information with QCL associated to a second reference signal for transmission.

In one embodiment, the UE may perform one transmission on one transmission direction/beam means that the UE may perform the one transmission with QCL associated to one reference signal for transmission. In one embodiment, the UE may transmit one scheduling information on one transmission direction/beam means that the UE may transmit the one scheduling information with QCL associated to one reference signal for transmission.

In one embodiment, the first direction/beam and the second direction/beam may be (automatously) selected/determined/controlled by the UE. In one embodiment, the reference signal may be one or more of demodulation signal, CSI-RS, discovery signal, and/or synchronization signal.

In one embodiment, the grant may be delivered in PDCCH. In one embodiment, the grant may be delivered in PDCCH with CRC scrambled via SL-V-RNTI.

Figure 17:
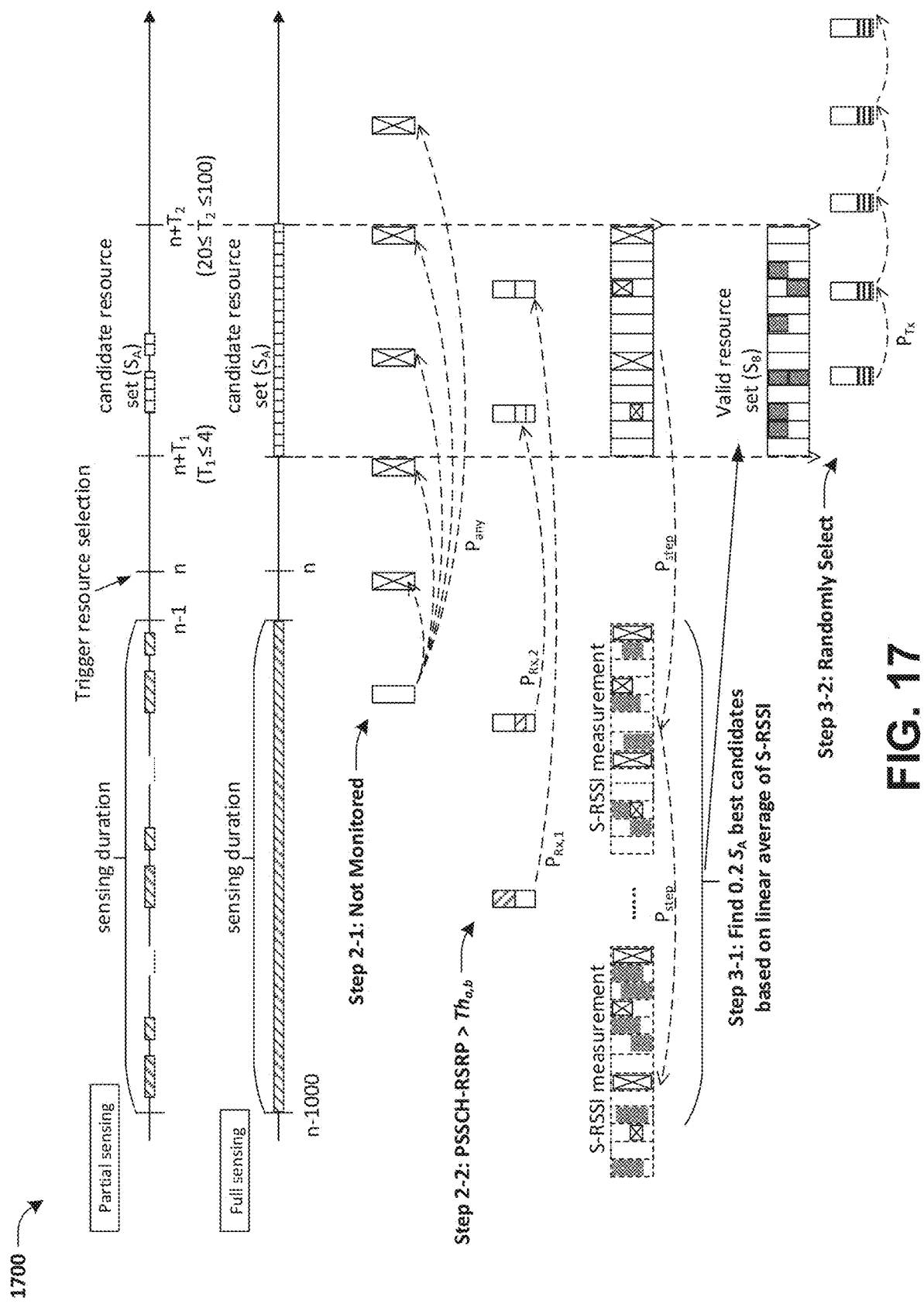
FIG. 17 illustrates an exemplary scenario associated with sensing-based resource selection.

FIG. 17 illustrates an exemplary scenario 1700 associated with sensing-based resource selection. For a sensing-based resource selection procedure, an example of which is shown in FIG. 17, the UE has a candidate resource set comprising multiple candidate resources. The available candidate resource set is restricted with time interval $[n+T_1, n+T_2]$. The restricted time interval may be different depending on whether partially sensing is configure or not. Full sensing may mean that partially sensing is not configured. In one embodiment, a candidate resource may mean one candidate single-subframe resource. One candidate resource may comprise one or more resource units. The resource unit may be a subchannel. In one embodiment, the resource unit may comprise multiple (physical) resource blocks in a TTI. The TTI may be a subframe.

Based on sensing within a sensing duration, the UE may generate a valid resource set, wherein the valid resource set is a subset of the candidate resource set. The generation of the valid resource set may be performed via excluding some candidate resources from the candidate resource set, for instance the step 2-1 and step 2-2 shown in FIG. 17. The generation of the valid resource set may be performed via selecting some valid candidate resources, for instance the step 3-1 shown in FIG. 17. And then, the UE select one or some valid resources from the valid resource set to perform transmission from the UE. The valid resource selection for transmission may be randomly selected from the valid resource set, for instance the step 3-2 shown in FIG. 17.

As shown in 3GPP TS 36.213 V15.1.0 (2018-03), the first excluding step is that if the UE does not monitor/sense a TTI z, the UE may not expect whether the candidate resources in TTI "z+$P_{any}$" are occupied or not, wherein $P_{any}$ means any possible periodicity for transmission. For instance, the first excluding step is shown as the step 2-1 in FIG. 17. For the case of $P_{any}$>=100 ms, the UE excludes the candidate resources in TTI "z+$P_{any}$" and excludes the candidates resources for which the UE may have possible transmission occurred in TTI "z+$P_{any}$". For the case of $P_{any}$<100 ms, the UE excludes the candidate resources in TTI "z+q·$P_{any}$" and excludes the candidates resources for which the UE may have possible transmission occurred in TTI "z+q·$P_{any}$", wherein q is 1, 2, . . . , 100/$P_{any}$. The parameter q means that the UE excludes multiple candidate resources with period $P_{any}$ within time interval [z, z+100]. The possible transmission may mean a transmission on a selected valid resource. The possible transmission may mean a periodic transmission of a transmission on a selected valid resource. Alternatively and/or additionally, $P_{any}$ means any possible periodicity configured by higher layer.

The second excluding step is that if the UE receives/detects a control signaling in a TTI m, the UE may exclude the candidate resources according to the received control signaling. For instance, the second excluding step is shown as the step 2-2 in FIG. 17. In some examples, if the UE receives/detects a control signaling scheduling a transmission in a TTI m and the measurement result of the scheduled transmission and/or the control signal is over a threshold, the UE may exclude the candidate resources according to the received control signaling. The measurement result may be RSRP. In some examples, the measurement result may be PSSCH-RSRP. The control signaling may indicate the resources of the scheduled transmission and/or periodicity of the scheduled transmission, $P_{RX}$. The excluded candidate resources according to the received control signaling are the resources of next one scheduled transmission based on the resources of the scheduled transmission and periodicity of the scheduled transmission, such as for the case of $P_{RX}$>=100 ms. Alternatively and/or additionally, the excluded candidate resources according to the received control signaling are the resources of next multiple scheduled transmissions based on the resources of the scheduled transmission and periodicity of the scheduled transmission, such as for the case of $P_{RS}$<100 ms. The next multiple scheduled transmissions may be with period $P_{RX}$ within time interval [m, m+100]. If the control signaling indicates that there is no next scheduled transmission or the control signaling indicates that the resource of scheduled transmission is not kept in next time or the control signaling indicates that the scheduled transmission is the last transmission from the UE transmitting the control signaling or the control signaling indicates that the periodicity of the scheduled transmission is indicated as zero, the UE may not exclude candidate resources according to the received control signaling.

After the first excluding step and the second excluding step, the UE may select some valid candidate resources from the remaining candidate resources, such as the step 3-1 shown in FIG. 17. The UE may measure resources in the sensing duration, wherein the measured resources are associated with the remaining candidate resources after the step 2-1 and step 2-2.

In some examples, for a remaining candidate resource, the associated measured resources in the sensing duration are in the occasions with multiple times of a time period from the remaining candidate resources.

For instance, if the time period is 100 TTIs, The associated measured resources in the sensing duration are in the TTI "n−j·100", j is positive integer, for a remaining candidate resource in TTI n. Alternatively and/or additionally, the associated measured resources in the sensing duration are with the same frequency resources as the remaining candidate resource. In some examples, the measurement is S-RSSI measurement. Based on the measurement, the UE can derive metric for each remaining candidate resource. The metric for a remaining candidate resource may be linear average of S-RSSI measured from its associated measured resources in the sensing duration. And then, the UE may select valid candidate resources based on the metric of each remaining candidate resource. Preferably, an action is that a remaining candidate resource with the smallest metric is selected as valid candidate resource and moved into a valid resource set. Repeating the action until the UE selects a number of remaining candidate resources as valid candidate resources and moves the number of remaining candidate resources into the valid resource set. For instance, the number is larger than or equal to 20% of total candidate resources. The number is larger than or equal to 20% of cardinality of the candidate resource set.

Based on the current (partially) sensing procedure, the UE can determine the valid resource set. The valid resource set may be reported to higher layers for transmission from the UE. The UE may select one or some valid resources from the valid resource set to perform transmission from the UE. The transmission from the UE may be PSSCH transmission.

In 5G NR, in order to provide a huge traffic rate for variable types of requirement and service in the future, wider and higher frequency bandwidths are used to achieve the goal. However, the higher bands in which the transmission is performed, the more severe the propagation loss is. Hence, in NR, beamforming technology has been considered and accepted as a method to alleviate the problem and improve the coverage. In NR, there may be one or more beam pair links between UE and network to perform communication. Some mechanisms are for network to trace beam quality of beam pair links between network node and UE. For example, network configures one or more than one RS for UE to measure, e.g. SS/PBCH blocks, CSI-RS for beam measurement or L1-RSRP computation. Network can configure one or more than one resource set/setting, wherein UE knows the one or more than one resource set/setting is for beam measurement or L1-RSRP computation. Network can also configure report configuration for UE to report measured beam quality or L1-RSRP value. Alternatively and/or additionally, the network may configure one or more than one SRS for UE to transmit. Network can measure the SRS transmitted from UE to get the beam quality of beam pair links.

As shown in FIG. 13, there is a beam pair link between network node and UE, wherein the network beam is directional to the UE, and the UE beam is directional to the network. The network node and the UE may perform communication via the beam pair link. It means that the network can perform DL transmission to the UE via the beam pair link. Alternatively and/or additionally, the UE may perform reception via the beam pair link. In one embodiment, it means that the UE can perform UL transmission to the network node via the beam pair link. Alternatively and/or additionally, the network node may perform reception via the beam pair link. For the same network node, the UE may perform beamforming to generate the same direction beam for UE transmission and UE reception. In one embodiment, for the same network node, the UE transmission beam and the UE reception beam may be generated with/toward the same direction (for the same beam pair link). In one embodiment, the UE transmission beam may be QCLed with the UE reception beam.

In NR, V2X and/or P2X transmission may be performed in higher frequency band. Beamforming technology may be considered for V2X and/or P2X transmission. For supporting sensing-based resource selection, if following the concept of 5G NR, a UE may perform beam-based sensing before selecting a resource for performing transmission via a transmission beam. In some examples, for transmission via a transmission beam, there may be one or more associated sensing beams. The UE may perform sensing via the one or more associated sensing beams. Based on the (beam-based) sensing result, the UE may select a resource for performing transmission via the transmission beam.

Figure 18A:
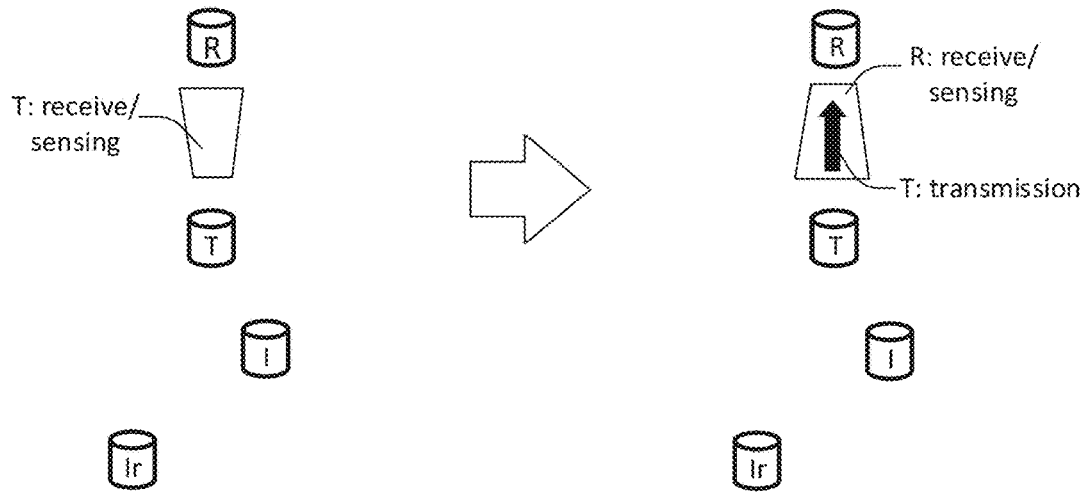
FIG. 18A illustrates an exemplary scenario where a UE may perform sensing on a sensing beam and/or transmission on a transmission beam.
Figure 18B:
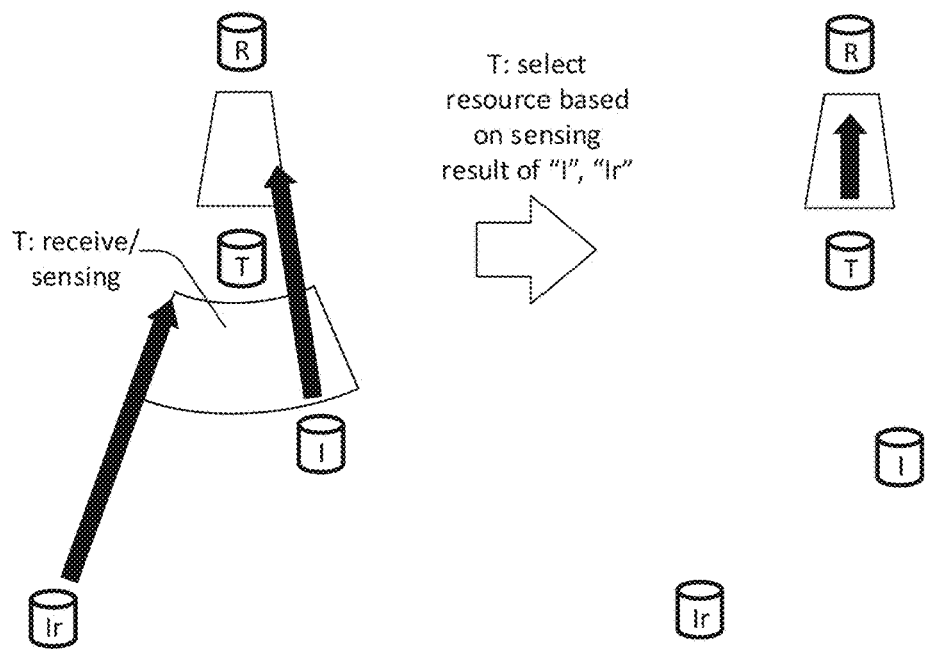
FIG. 18B illustrates an exemplary scenario where a UE may perform sensing via one or more directions and/or beams.
Figure 18C:
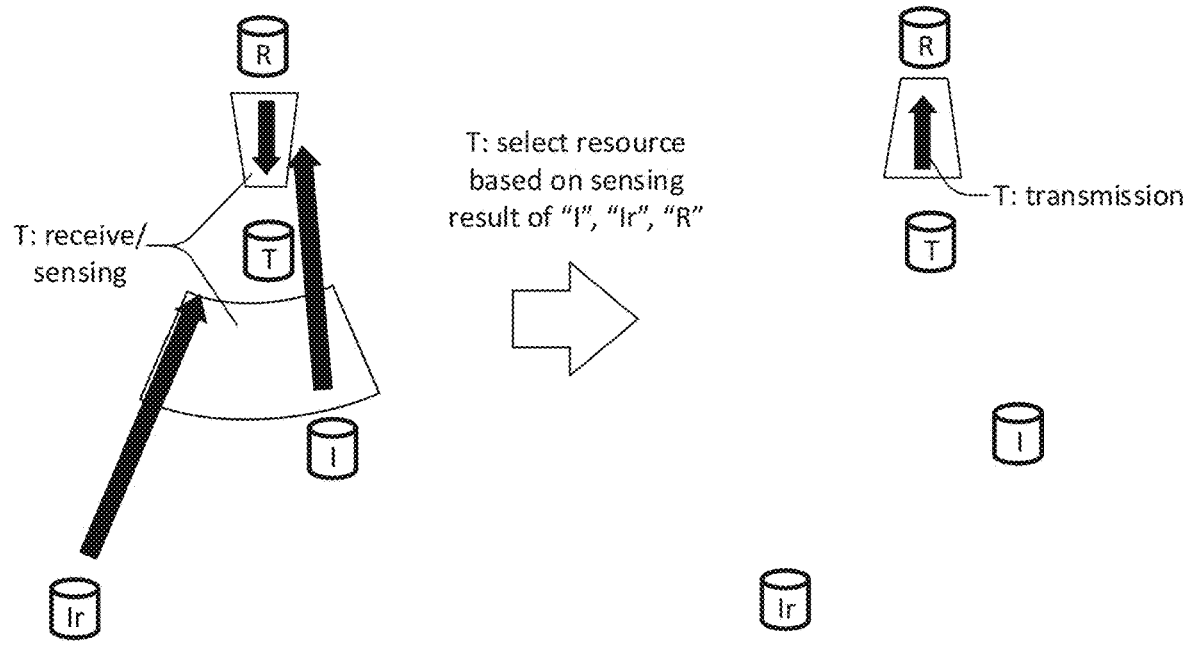
FIG. 18C illustrates an exemplary scenario where a UE may perform sensing via multiple directions and/or beams.
Figure 18D:
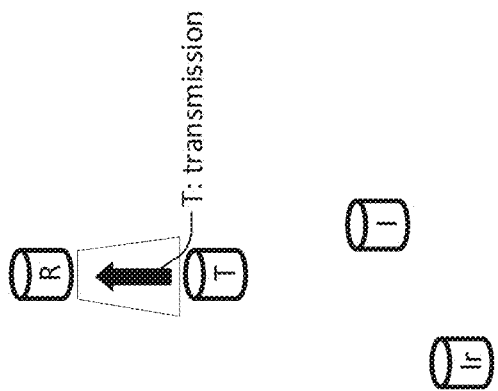
FIG. 18D illustrates an exemplary scenario where a UE may perform sensing via multiple directions and/or beams.
Figure 18D:
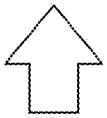
Figure 18D:
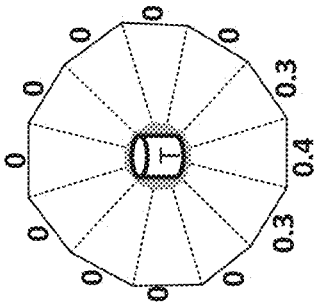

FIGS. 18A-18D show some instances between the transmission direction/beam and associated sensing direction(s)/beam(s). FIG. 18A illustrates an exemplary scenario 1800 where a UE "T" may perform sensing on a sensing beam and/or transmission on a transmission beam. FIG. 18B illustrates an exemplary scenario 1825 where the UE "T" may perform sensing via one or more directions and/or beams. FIG. 18C illustrates an exemplary scenario 1850 where the UE "T" may perform sensing via multiple directions and/or beams. FIG. 18D illustrates an exemplary scenario 1875 where the UE "T" may perform sensing via multiple directions and/or beams.

In the exemplary scenario 1800 shown in FIG. 18A, the sensing beam and the transmission beam of the UE "T" may be generated with the same direction. In one embodiment, the UE "T" may perform sensing and associated transmission on the same direction or on the same beam. Before the UE "T" performs transmission on a transmission beam, the UE "T" may perform sensing via a sensing beam, wherein the sensing beam may at least comprise (the direction of) the transmission beam. In response to the sensing result, the UE "T" may select a resource for performing transmission via the transmission beam. A UE "R" located within the sensing region of the sensing beam of the UE "T" may receive the transmission from the UE "T". A possible problem of the instance is that the sensing beam of the UE "T" may not acquire the channel condition and transmission/reception situation of the UE "Ir" since the UE "Ir" is not located within the sensing region of the sensing beam of the UE "T". Thus, the UE "R" may receive/detect the transmission from the UE "T" and the transmission from the UE "Ir" in some of the same frequency and time resource(s). The collided transmission may induce that the UE "R" may not receive successfully not only the transmission from the UE "T" but also the transmission from the UE "Ir".

As shown in exemplary scenarios of FIGS. 18B-18C, the transmission on one direction/beam may be based on the sensing result of one or more other directions/beams. In one embodiment, resource selection for transmission on one direction/beam may be based on the sensing result of resources on one or more other directions/beams.

In the exemplary scenario 1825 shown in FIG. 18B, before the UE "T" performs transmission to a direction/beam, wherein the UE "R" may be located within the transmission region, the UE may perform sensing on one or more other directions/beams which comprise at least the opposite direction of the transmission direction/beam. Then, the UE "T" may sense some transmission from the UE "I" or the UE "Ir". For the reception of the UE "R", if the UE "T" selects the same resources as the transmission from the UE "I" or the UE "Ir", the transmission from the UE "I" or the UE "Ir" may interfere with the transmission from the UE "T". Thus, the UE "T" may select a resource based on the sensing result on the one or more other directions/beams, e.g. exclude the resource which may be utilized in transmission from the UE "I" or the UE "Ir". In one embodiment, the width of sensing region may be the same or wider than the width of the transmission region. In one embodiment, the width of sensing beam may be the same or wider than the width of the transmission beam. If the width of sensing beam is the same or smaller than the width of the transmission beam, the UE "T" may not be able to sense the transmission from "Ir". It is because the coverage width becomes wider as distance from the center increases.

In the exemplary scenario 1850 shown in FIG. 18C, before the UE "T" performs transmission to a direction/beam, wherein the UE "R" may be located within the transmission region, the UE may perform sensing on one or more other directions/beams which comprise at least the opposite direction of the transmission direction/beam and the transmission direction/beam. Then, the UE "T" may sense some transmission from the UE "I" or the UE "Ir" and some transmission from the UE "R". For the reception of the UE "R", if the UE "T" selects the same resources as the transmission from the UE "I" or the UE "Ir", the transmission from the UE "I" or the UE "Ir" may interfere with the transmission from the UE "T". Thus, the UE "T" may select a resource based on the sensing result on the opposite direction of the transmission direction/beam, e.g. exclude the resource which may be utilized in transmission from the UE "I" or the UE "Ir". Alternatively and/or additionally, for the reception of the UE "R", if the UE "T" selects the same (time) resources as the UE "R" performs transmission as well, the UE "R" may not be able to receive the transmission from the UE "T" simultaneously. Thus, the UE "T" may select a resource based on the sensing result on the transmission direction/beam, e.g. exclude the (time) resource which may be utilized in transmission from the UE "R". In one embodiment, the transmission from the UE "R" means the transmission in the direction/beam forward the UE "T". In one embodiment, the width of sensing region on the opposite direction of the transmission direction/beam may be the same or wider than the width of the transmission region. In one embodiment, the width of sensing region on the transmission direction/beam may be the same or wider than the width of the transmission region. In one embodiment, the width of sensing beam on the opposite direction of the transmission direction may be the same or wider than the width of the transmission beam. In one embodiment, the width of sensing beam on the transmission direction may be the same or wider than the width of the transmission beam.

In the exemplary scenario 1875 shown in FIG. 18D, the UE may perform sensing on multiple directions/beam and acquire sensing result of each direction of the multiple directions/beams. The UE may perform transmission on a resource on one direction/beam, wherein the resource is selected based on weighted sensing results of the multiple directions/beams. In one embodiment, the resource is selected based on the weighted sum of the sensing results of the multiple directions/beams. In one embodiment, the resource is selected based on the summation of the sensing results of the multiple directions/beams with respective weighting.

Alternatively and/or additionally, the UE may derive a directional result for one direction/beam, wherein the directional result is derived from weighting the sensing results of the multiple directions/beams. In one embodiment, the directional result is derived from weighted sum of the sensing results of the multiple directions/beams. In one embodiment, the directional result is derived from the summation of the sensing results of the multiple directions/beams with respective weighting. The UE may perform transmission on a resource on the one direction/beam, wherein the resource is selected based on the directional result for the one direction/beam.

In the exemplary scenario 1875 shown in FIG. 18D, the UE "T" may perform sensing on the 12 directions/beams and acquire respective sensing result of these directions/beams. Alternatively and/or additionally, the UE "T" may perform sensing on some of the 12 directions/beams and acquire respective sensing result of these directions/beams. The UE "T" may perform weighting on the sensing results of these directions/beams (to derive a directional result). The sensing results of different directions/beams may be applied with different weighting. For the instance of weighting, the UE "T" wants to perform a transmission on a direction/beam toward FRONT, and then the sensing result of the direction/beam toward BACK is applied with weighting 0.4. The sensing results of another two directions/beams are applied with weighting 0.3. The sensing results of remaining directions/beams are applied with weighting 0. The UE may select a resource for transmission on the direction/the beam toward FRONT, wherein the resource is selected based on the directional result or based on the weighted sensing results of these directions/beams. For another instance of weighting, the UE "T" wants to perform a transmission on a direction/beam toward FRONT, and then the sensing result of the direction/the beam toward BACK and/or FRONT is applied with weighting 1. The sensing results of another two directions/beams are applied with weighting 1. The sensing results of remaining directions/beams are applied with weighting 0. The UE may select a resource for transmission on the direction/beam toward FRONT, wherein the resource is selected based on the directional result or based on the weighted sensing results of these directions/beams.

In V2X scenario, a V2X UE transmits data/packet(s) to neighboring UEs on different directions, e.g. broadcast-like transmission or group transmission. However, the beam-based transmission may be limited on one or some directions/beams at one time, and the NR does not support a UE transmission on multiple directions/beams for the same data/packet. Thus, how to achieve this kind of V2X transmission may be considered.

In one direction, the V2X UE may perform beam sweeping for transmission of the same data/packet. In one embodiment, the V2X UE may perform multiple transmissions for the same data/packet, wherein each of the multiple transmissions is performed on different transmission direction/beam. In one embodiment, the transmission for the same data/packet may be broadcast transmission for multiple neighboring UEs and/or some and/or all neighboring UEs. Alternatively and/or additionally, the transmission for the same data/packet may be group transmission for a group of UEs.

If sensing-based resource selection is applied, a resource on one transmission beam is selected based on the sensing result of sensing direction(s)/beam(s) associated with the transmission beam. Thus, considering the multiple transmissions for the same data/packet, since each transmission of the multiple transmissions may be performed on respective transmission direction/beam, the resource of the each transmission may be selected based on the sensing result of sensing direction(s)/beam(s) associated with the respective transmission direction/beam.

Figure 19:
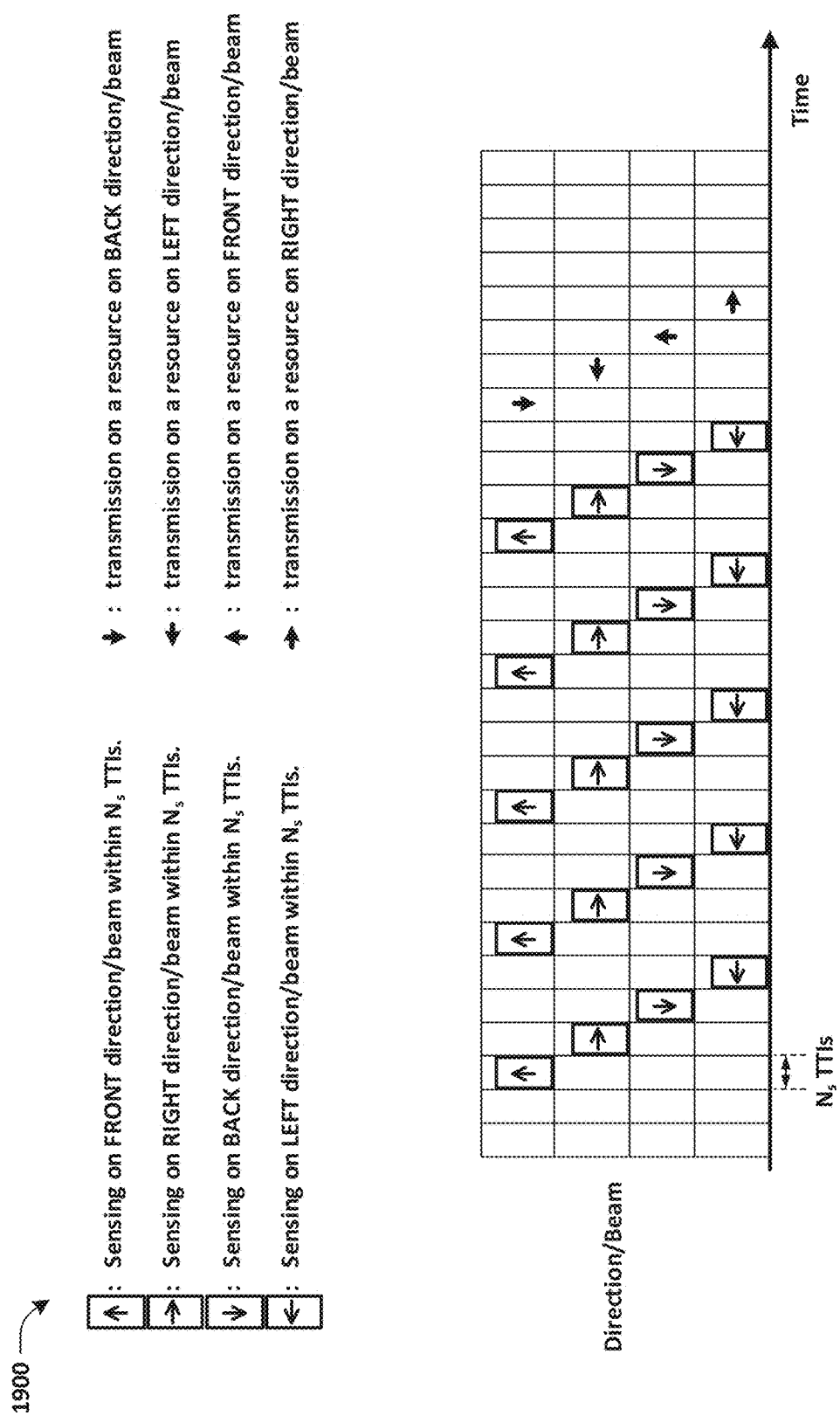
FIG. 19 illustrates an exemplary scenario where a UE performs multiple transmissions for delivering a single transport block.

FIG. 19 illustrates an exemplary scenario 1900 where a UE performs multiple transmissions for delivering a single transport block. In the exemplary scenario 1900 shown in FIG. 19, a UE may perform transmission for a data/packet on the four directions/beams FRONT, RIGHT, BACK, and LEFT. The resource for the transmission on the FRONT direction/beam may be selected based on sensing result of sensing direction(s)/beam(s) associated with the FRONT beam, wherein the associated sensing direction(s)/beam(s) is BACK direction/beam (and/or the FRONT direction/beam). The resource for the transmission on the RIGHT direction/beam may be selected based on sensing result of sensing direction(s)/beam(s) associated with the RIGHT beam, wherein the associated sensing direction(s)/beam(s) is LEFT direction/beam (and/or the RIGHT direction/beam). The resource for the transmission on the BACK direction/beam may be selected based on sensing result of sensing direction(s)/beam(s) associated with the BACK beam, wherein the associated sensing direction(s)/beam(s) is FRONT direction/beam (and/or the BACK direction/beam). The resource for the transmission on the LEFT direction/beam may be selected based on sensing result of sensing direction(s)/beam(s) associated with the LEFT beam, wherein the associated sensing direction(s)/beam(s) is RIGHT direction/beam (and/or the LEFT direction/beam).

Considering that channel quality and resource utilization situation may be different on different directions, the sensing result of different sensing direction(s)/beam(s) from a UE may be different.

Solutions are described herein for selection of a resource for transmission.

In one solution, the UE may perform multiple transmissions for a data/packet on multiple transmission directions/beams, wherein the resources for the multiple transmissions on separate transmission directions/beams may be selected based on respective sensing result of sensing direction(s)/beam(s) associated with separate transmission directions/beams. Alternatively and/or additionally, the selected resource for the multiple transmissions of the same data/packet on separate transmission directions/beams may be partly different (in the frequency domain). Alternatively and/or additionally, the selected resource for the multiple transmissions of the same data/packet on separate transmission directions/beams may be not limited as the same (in the frequency domain).

In another solution, the UE may perform multiple transmissions for a data/packet on multiple transmission directions/beams, wherein the resources for the multiple transmissions on separate transmission directions/beams may be selected based on some and/or all sensing results of sensing direction(s)/beam(s) associated with separate transmission directions/beams or based on omni-directional sensing result. Alternatively and/or additionally, the selected resource for the multiple transmissions of the same data/packet on separate transmission directions/beams may be (limited as) the same (in the frequency domain). The same resource for the same data/packet on separate transmission directions/beams may reduce some processing complexity for the transmitting UE. Alternatively and/or additionally, it may assist the decoding/processing in receiving UE as well, e.g. the receiving UE may assume the received transmissions are in the same resource from different receptions.

Alternatives are described herein for the solutions above.

In one alternative, the UE may perform sensing procedure. The UE may select a first resource on a first transmission direction/beam based on the sensing result. The UE may select a second resource on a second transmission direction/beam based on the sensing result. In one embodiment, the first resource may be different from the second resource. In one embodiment, the first resource may be different from the second resource in frequency domain. In one embodiment, the first resource may be different from the second resource in frequency and time domain. In one embodiment, the UE may perform a first transmission on the first resource on the first transmission direction/beam and perform a second transmission on the second resource on the second transmission direction/beam, wherein the first transmission and the second transmission are for a same data/packet.

In some examples, the UE may perform multiple transmissions for the same data/packet on multiple transmission directions/beams, wherein the resources for the multiple transmissions on separate transmission directions/beams may be selected based on respective sensing results of sensing direction(s)/beam(s) associated with separate transmission directions/beams In some examples, the UE may perform transmission direction/beam sweeping for multiple transmissions of the same data/packet on multiple transmission directions/beams, wherein the resources for the multiple transmissions on separate transmission directions/beams may be selected based on respective sensing results of sensing direction(s)/beam(s) associated with separate transmission directions/beams.

In one embodiment, the separate selected resources of the multiple transmissions for the same data/packet on separate transmission directions/beams may be different (in frequency domain). In one embodiment, the separate selected resources of the multiple transmissions for the same data/packet on separate transmission directions/beams may be partly different (in frequency domain). In one embodiment, the separate selected resources of the multiple transmissions for the same data/packet on separate transmission directions/beams may be not limited as the same (in frequency domain).

In another alternative, the UE may perform sensing procedure. The UE may select a first resource on a first transmission direction/beam and a second resource on a second transmission direction/beam based on the sensing result. In one embodiment, the first resource is the same as the second resource. In one embodiment, the first resource is the same as the second resource in the frequency domain. In one embodiment, the first resource is the same as the second resource in the frequency domain and the first resource may be different from the second resource in the time domain. In one embodiment, the UE may perform a first transmission on the first resource on the first transmission direction/beam and performs a second transmission on the second resource on the second direction/beam, wherein the first transmission and the second transmission are for a same data/packet.

In one embodiment, the UE may perform multiple transmissions for the same data/packet on multiple transmission directions/beams, wherein the resources on separate transmission directions/beams may be selected based on some and/or all sensing results of sensing direction(s)/beam(s) associated with separate transmission directions/beams.

In one embodiment, the UE may perform transmission direction/beam sweeping for multiple transmissions of the same data/packet on multiple transmission directions/beams, wherein the resources on separate transmission directions/beams may be selected based on some and/or all sensing results of sensing direction(s)/beam(s) associated with separate transmission directions/beams.

Alternatively and/or additionally, the UE may perform multiple transmissions for the same data/packet on multiple transmission directions/beams, wherein the resources on separate transmission directions/beams may be selected based on omni-directional sensing result.

Alternatively and/or additionally, the UE may perform transmission direction/beam sweeping for multiple transmissions of the same data/packet on multiple transmission directions/beams, wherein the resources on separate transmission directions/beams may be selected based on omni-directional sensing result.

In one embodiment, the selected resources of the multiple transmissions for the same data/packet on separate transmission directions/beams may be (limited as) the same (in frequency domain).

In one embodiment, if the UE is not able to select the same frequency resource as the first resource on a third transmission direction/beam based on sensing result of a third sensing direction/beam, the UE may not perform transmission for the same data/packet on the third transmission direction/beam.

In another alternative, the UE may perform sensing procedure. The UE may select a same frequency resource in a first TTI and in a second TTI based on the sensing result. In one embodiment, the UE may perform a first transmission on the frequency resource in the first TTI on a first transmission direction/beam and perform a second transmission on the frequency resource in the second TTI on the second direction/beam, wherein the first transmission and the second transmission are for a same data/packet.

In one embodiment, the UE may perform transmission direction/beam sweeping for multiple transmissions of the same data/packet on multiple transmission directions/beams, wherein the resources on separate transmission directions/beams may be selected based on some and/or all sensing results of sensing direction(s)/beam(s) associated with separate transmission directions/beams.

Alternatively and/or additionally, the UE may perform multiple transmissions for the same data/packet on multiple transmission directions/beams, wherein the resources on separate transmission directions/beams may be selected based on omni-directional sensing result.

Alternatively and/or additionally, the UE may perform transmission direction/beam sweeping for multiple transmissions of the same data/packet on multiple transmission directions/beams, wherein the resources on separate transmission directions/beams may be selected based on omni-directional sensing result.

In one embodiment, the selected resources of the multiple transmissions for the same data/packet on separate transmission directions/beams may be (limited as) the same (in frequency domain).

In one embodiment, if the UE is not able to select the same frequency resource as the first resource on a third transmission direction/beam based on sensing result of a third sensing direction/beam, the UE may not perform transmission for the same data/packet on the third transmission direction/beam.

Further embodiments are described for the alternatives and solutions above.

In one embodiment, the UE may perform the first transmission on the first direction/beam and the second transmission on the second direction/beam in different TTIs. In one embodiment, the UE may perform the first transmission on the first direction/beam and the second transmission on the second direction/beam in consecutive TTIs. In one embodiment, the UE may perform the first transmission on the first direction/beam and the second transmission on the second direction/beam within a number of TTIs. In one embodiment, the UE may perform the first transmission on the first direction/beam and the second transmission on the second direction/beam within one time occasion.

In one embodiment, the UE may perform the multiple transmissions for the same data/packet on separate transmission directions/beams in different TTIs. In one embodiment, the UE may perform the multiple transmissions for the same data/packet on separate transmission directions/beams in consecutive TTIs. In one embodiment, the UE may perform the multiple transmissions for the same data/packet on separate transmission directions/beams within a number of TTIs. In one embodiment, the UE may perform the multiple transmissions for the same data/packet on separate transmission directions/beams within one time occasion.

In one embodiment, the first TTI and the second TTI may be consecutive. In one embodiment, the first TTI and the second TTI may be within a number of TTIs. In one embodiment, the first TTI and the second TTI may be within one time occasion.

In one embodiment, the UE may perform transmission direction/beam sweeping once for the multiple transmissions of the same data/packet within one time occasion. In one embodiment, the UE may not transmit the multiple transmissions for the same data/packet in different time occasions.

In one embodiment, one time occasion may comprise a number of (consecutive) TTIs. In one embodiment, the number of TTIs comprised in one time occasion may be shorter than or equal to periodicity of SPS transmission. In one embodiment, the number of TTIs comprised in one time occasion may be shorter than or equal to a time period. In one embodiment, the number of TTIs comprised in one time occasion may be shorter than or equal to one or more of 20, 50, 100.

In one embodiment, the first direction/beam may be different from the second direction/beam.

In one embodiment, the multiple transmission directions/beams may be different from each other.

In one embodiment, the UE performs the first transmission on the first transmission direction may mean that the UE generates a transmission beam comprising the first direction and performs the first transmission via the transmission beam.

In one embodiment, the UE performs the second transmission on the second transmission direction may mean that the UE generates a transmission beam comprising the second direction and performs the second transmission via the transmission beam.

In one embodiment, the sensing procedure may mean that the UE performs directional/beam-based sensing to acquire directional/beam-based sensing results of multiple directions/beams.

In one embodiment, the (directional/beam-based) sensing procedure may mean that the UE generates multiple receiving beams and performs the sensing via the multiple receiving beams to acquire sensing result on each receiving beam.

In one embodiment, the (directional/beam-based) sensing procedure may mean that the UE generates multiple receiving beams toward multiple directions and performs the sensing via the multiple receiving beams to acquire sensing result on each receiving beam.

In one embodiment, the multiple receiving beams may not be generated in same TTI.

In one embodiment, the multiple receiving beams may be generated in different TTIs.

In one embodiment, the multiple receiving beams may not be generated in same symbol.

In one embodiment, the multiple receiving beams may be generated in different symbols.

In one embodiment, the (directional/beam-based) sensing procedure may mean that the UE performs omni-directional reception/sensing and then performs digital computing on the omni-directional reception/sensing result (e.g. digital beamforming) to generate sensing result on/toward different directions/beams.

In one embodiment, the (directional/beam-based) sensing procedure may comprise the UE performing sensing on a first sensing direction/beam associated with the first transmission direction/beam. In one embodiment, the (directional/beam-based) sensing procedure may comprise the UE performing sensing on a first sensing direction/beam, wherein the first transmission direction/beam is associated with the first sensing direction/beam. In one embodiment, the (directional/beam-based) sensing procedure may comprise the UE performing sensing on a first sensing direction/beam, wherein the first resource on the first transmission direction/beam is selected based on the sensing result of the first sensing direction/beam.

In one embodiment, the UE performs sensing on the first sensing direction may mean that the UE generates a receiving beam comprising the first direction and performs the sensing via the receiving beam. In one embodiment, the UE performs sensing on the first sensing direction may mean that the UE performs omni-directional reception/sensing and then performs digital computing on the omni-directional reception/sensing result (e.g. digital beamforming) to generate a sensing result on/toward the first direction. In one embodiment, the UE performs sensing on the first sensing beam may mean that the UE performs omni-directional reception/sensing and then performs digital beamforming on the omni-directional reception/sensing result to generate a sensing result on the first beam.

In one embodiment, the (directional/beam-based) sensing procedure may comprise the UE performing omni-directional reception/sensing and then performs digital beamforming on the omni-directional reception/sensing result to generate a sensing result on a first sensing direction/beam associated with the first transmission direction/beam.

In one embodiment, the (directional/beam-based) sensing procedure may comprise the UE performing omni-directional reception/sensing and then performs digital beamforming on the omni-directional reception/sensing result to generate a sensing result on a first sensing direction/beam, wherein the first transmission direction/beam is associated with the first sensing direction/beam.

In one embodiment, the (directional/beam-based) sensing procedure may comprise the UE performing omni-directional reception/sensing and then performs digital beamforming on the omni-directional reception/sensing result to generate a sensing result on a first sensing direction/beam, wherein the first resource on the first transmission direction/beam is selected based on the sensing result of the first sensing direction/beam.

In one embodiment, the (directional/beam-based) sensing procedure may comprise the UE performing sensing on a second sensing direction/beam associated with the second transmission direction/beam. In one embodiment, the (directional/beam-based) sensing procedure may comprise the UE performing sensing on a second sensing direction/beam, wherein the second transmission direction/beam is associated with the second sensing direction/beam. In one embodiment, the (directional/beam-based) sensing procedure may comprise the UE performing sensing on a second sensing direction/beam, wherein the second resource on the second transmission direction/beam is selected based on the sensing result of the second sensing direction/beam.

In one embodiment, the UE performs sensing on the second sensing direction may mean that the UE generates a receiving beam comprising the second direction and performs the sensing via the receiving beam. In one embodiment, the UE performs sensing on the second sensing direction may mean that the UE performs omni-directional reception/sensing and then performs digital computing on the omni-directional reception/sensing result (e.g. digital beamforming) to generate a sensing result on/toward the second direction. In one embodiment, the UE performs sensing on the second sensing beam may mean that the UE performs omni-directional reception/sensing and then performs digital beamforming on the omni-directional reception/sensing result to generate a sensing result on the second beam.

In one embodiment, the (directional/beam-based) sensing procedure may comprise the UE performing omni-directional reception/sensing and then performs digital beamforming on the omni-directional reception/sensing result to generate a sensing result on a second sensing direction/beam associated with the second transmission direction/beam.

In one embodiment, the (directional/beam-based) sensing procedure may comprise the UE performing omni-directional reception/sensing and then performs digital beamforming on the omni-directional reception/sensing result to generate a sensing result on a second sensing direction/beam, wherein the second transmission direction/beam is associated with the second sensing direction/beam.

In one embodiment, the (directional/beam-based) sensing procedure may comprise the UE performing omni-directional reception/sensing and then performs digital beamforming on the omni-directional reception/sensing result to generate a sensing result on a second sensing direction/beam, wherein the second resource on the second transmission direction/beam is selected based on the sensing result of the second sensing direction/beam.

In one embodiment, the first sensing direction/beam associated with the first transmission direction/beam may comprise the opposite direction of the first transmission direction/beam.

In one embodiment, the first sensing direction/beam associated with the first transmission direction/beam may not comprise the first transmission direction/beam.

In one embodiment, the first sensing direction/beam associated with the first transmission direction/beam may comprise one or more direction(s)/beam(s) other than the first transmission direction/beam.

In one embodiment, the first sensing direction/beam associated with the first transmission direction/beam may comprise the first transmission direction/beam.

In one embodiment, the first sensing direction/beam associated with the first transmission direction/beam may comprise the opposite direction of the first transmission direction/beam and the first transmission direction/beam.

In one embodiment, the second sensing direction/beam associated with the second transmission direction/beam may comprise the opposite direction of the second transmission direction/beam.

In one embodiment, the second sensing direction/beam associated with the second transmission direction/beam may not comprise the second transmission direction/beam.

In one embodiment, the second sensing direction/beam associated with the second transmission direction/beam may comprise one or more direction(s)/beam(s) other than the second transmission direction/beam.

In one embodiment, the second sensing direction/beam associated with the second transmission direction/beam may comprise the second transmission direction/beam.

In one embodiment, the second sensing direction/beam associated with the second transmission direction/beam may comprise the opposite direction of the second transmission direction/beam and the second transmission direction/beam.

In one embodiment, the (directional/beam-based) sensing result on a sensing direction/beam may correspond to some transmissions received by the UE on the sensing direction/beam. In one embodiment, the (directional/beam-based) sensing procedure may comprise the UE receiving a transmission on a sensing direction/beam, and the UE excludes the (time and frequency) candidate resources associated with the received transmission. In one embodiment, the candidate resources may be for transmission on a transmission direction/beam associated with the sensing direction/beam.

In one embodiment, the excluded candidate resources associated with the received transmission may mean that the candidate resources are expected to be utilized by a UE which transmits the received transmission. In one embodiment, the excluded (frequency) candidate resources associated with the received transmission may mean that the candidate resources are with the same frequency resources as the received transmission. In one embodiment, the excluded (time) candidate resources associated with the received transmission may mean that the candidate resources are with time difference on one or more times of a time period from the received transmission.

In one embodiment, the excluded (time and frequency) candidate resources associated with the received transmission may mean that the candidate resources are with the same frequency resources as the received transmissions and with time difference on one or more times of a time period from the received transmission.

In one embodiment, the (directional/beam-based) sensing result on a sensing direction/beam may comprise metric of resources sensed by the UE on the sensing direction/beam. In one embodiment, the (directional/beam-based) sensing result on a sensing direction/beam may comprise metric for candidate resources derived by the UE on the sensing direction/beam. In one embodiment, the (directional/beam-based) sensing result on a sensing direction/beam may comprise metric for candidate resources derived by the UE for a transmission direction/beam associated with the sensing direction/beam.

In one embodiment, the (directional/beam-based) sensing result on a sensing direction/beam may comprise the valid candidate resources for transmission on a transmission direction/beam associated with the sensing direction/beam.

In one embodiment, the (directional/beam-based) sensing procedure may comprise the UE performing energy sensing on a sensing direction/beam to derive metric for candidate resources. In one embodiment, the UE may exclude the candidate resources with larger metric. In one embodiment, the UE may select the candidate resources with smaller metric as valid candidate resources. In one embodiment, the candidate resources may be for transmission on a transmission direction/beam associated with the sensing direction/beam. In one embodiment, the candidate resources with larger metric may mean the metric of the candidate resources is larger than metric of a percentage of total candidate resources. In one embodiment, the candidate resources with smaller metric may mean the metric of the candidate resources is smaller than metric of a percentage of total candidate resources.

In one embodiment, the first resource on the first transmission direction/beam may be selected from valid candidate resources derived from the (directional/beam-based) sensing result of the first sensing direction/beam.

In one embodiment, the second resource on the second transmission direction/beam may be selected from valid candidate resources derived from the (directional/beam-based) sensing result of the second sensing direction/beam.

In one embodiment, the sensing procedure may mean that the UE performs omni-directional sensing.

In one embodiment, the (omni-directional) sensing result may comprise some transmissions received by the UE.

In one embodiment, the (omni-directional) sensing procedure may comprise the UE receiving a transmission, and the UE excludes the (time and frequency) candidate resources associated with the received transmission.

In one embodiment, the excluded candidate resources associated with the received transmission may mean that the candidate resources is expected to be utilized by a UE which transmits the received transmission. In one embodiment, the excluded (frequency) candidate resources associated with the received transmission may mean that the candidate resources is with the same frequency resources as the received transmission. In one embodiment, the excluded (time) candidate resources associated with the received transmission may mean that the candidate resources is with time difference on one or more times of a time period from the received transmission. In one embodiment, the excluded (time and frequency) candidate resources associated with the received transmission may mean that the candidate resources is with the same frequency resources as the received transmissions and with time difference on one or more times of a time period from the received transmission.

In one embodiment, the (omni-directional) sensing result may comprise metric of resources sensed by the UE. In one embodiment, the (omni-directional) sensing result may comprise metric for candidate resources derived by the UE. In one embodiment, the (omni-directional) sensing result may comprise the valid candidate resources for transmission.

In one embodiment, the (omni-directional) sensing procedure may comprise the UE performing energy sensing to derive metric for candidate resources. In one embodiment, he UE may exclude the candidate resources with larger metric. In one embodiment, the UE may select the candidate resources with smaller metric as valid candidate resources. In one embodiment, the candidate resources with larger metric may mean the metric of the candidate resources is larger than metric of a percentage of total candidate resources. In one embodiment, the candidate resources with smaller metric may mean the metric of the candidate resources is smaller than metric of a percentage of total candidate resources.

In one embodiment, the first resource on the first transmission direction/beam may be selected from valid candidate resources derived from the (omni-directional) sensing result.

In one embodiment, the second resource on the second transmission direction/beam may be selected from valid candidate resources derived from the (omni-directional) sensing result.

In one embodiment, the UE may perform (omni-directional) sensing procedure for resources within one sensing time duration.

In one embodiment, the UE may perform (directional/beam-based) sensing procedure on a sensing direction/beam for resources within a subset of one sensing time duration for the sensing direction/beam.

In one embodiment, the sensing result may mean sensing result of performing sensing procedure within the one sensing time duration.

In one embodiment, the (omni-directional) sensing result may mean sensing result of performing (omni-directional) sensing procedure within the one sensing time duration.

In one embodiment, the (directional/beam-based) sensing result on a sensing direction/beam may mean sensing result of performing (directional/beam-based) sensing procedure on the sensing direction/beam within a subset of one sensing time duration for the sensing direction/beam. In one embodiment, the (directional/beam-based) sensing result on the first sensing direction/beam may mean sensing result of performing (directional/beam-based) sensing procedure on the first sensing direction/beam within a first subset of one sensing time duration for the first sensing direction/beam. In one embodiment, the (directional/beam-based) sensing result on the second sensing direction/beam may mean sensing result of performing (directional/beam-based) sensing procedure on the second sensing direction/beam within a second subset of one sensing time duration for the first sensing direction/beam.

In one embodiment, if the UE is able to generate X different beams toward X different directions, the subset of one sensing time duration for one sensing direction/beam may comprise 1/X of the number of TTIs comprised within the one sensing time duration.

In one embodiment, if the UE performs direction/beam sweeping with X different beams toward X different directions, the subset of one sensing time duration for one sensing direction/beam may comprise 1/X of the number of TTIs comprised within the one sensing time duration.

In one embodiment, one subset of one sensing time duration for one sensing direction/beam may comprise at most 1/X of the number of TTIs comprised within the one time occasion.

In one embodiment, one subset of one sensing time duration for one sensing direction/beam may comprise at most 1/X of the number of TTIs comprised within the one sweeping periodicity.

In one embodiment, the UE may perform transmission resource selection for resources within one candidate time duration.

In one embodiment, the UE may perform transmission resource selection on a transmission direction/beam for resources within a subset of one candidate time duration for the transmission direction/beam.

In one embodiment, the first resource and the second resource may be selected from valid candidate resources within the one candidate time duration. In one embodiment, the first resource may be selected from valid candidate resources within a first subset of one candidate time duration for the first transmission direction/beam. In one embodiment, the second resource may be selected from valid candidate resources within a second subset of one candidate time duration for the second transmission direction/beam.

In one embodiment, the candidate resources may mean the resources within the one candidate time duration.

In one embodiment, if the UE is able to generate X different beams toward X different directions, the subset of one candidate time duration for one candidate direction/beam may comprise 1/X of the number of TTIs comprised within the one candidate time duration.

In one embodiment, if the UE performs direction/beam sweeping with X different beams toward X different directions, the subset of one candidate time duration for one candidate direction/beam may comprise 1/X of the number of TTIs comprised within the one candidate time duration.

In one embodiment, one subset of one candidate time duration for one transmission direction/beam may comprise at most 1/X of the number of TTIs comprised within the one time occasion.

In one embodiment, one subset of one candidate time duration for one transmission direction/beam may comprise at most 1/X of the number of TTIs comprised within the one sweeping periodicity.

In one embodiment, the subset of one sensing time duration for a sensing direction/beam may be derived from the subset of one candidate time duration for a transmission direction/beam, wherein the sensing direction/beam is associated with the transmission direction/beam.

In one embodiment, the subset of one sensing time duration for a sensing direction/beam may be with a time difference on one or more times of another time period from the subset of one candidate time duration for a transmission direction/beam, wherein the sensing direction/beam is associated with the transmission direction/beam.

In one embodiment, the first subset of one sensing time duration for the first sensing direction/beam may be derived from the first subset of one candidate time duration for the first transmission direction/beam.

In one embodiment, the first subset of one sensing time duration for the first sensing direction/beam may have a time difference on one or more times of another time period from the first subset of one candidate time duration for the first transmission direction/beam.

In one embodiment, the second subset of one sensing time duration for the second sensing direction/beam may be derived from the second subset of one candidate time duration for the first transmission direction/beam.

In one embodiment, the second subset of one sensing time duration for the second sensing direction/beam may have a time difference on one or more times of another time period from the second subset of one candidate time duration for the first transmission direction/beam.

In one embodiment, one sensing time duration may comprise up to 1000 TTIs. In one embodiment, one sensing time duration may comprise up to 1000 milliseconds.

In one embodiment, one candidate time duration may comprise up to 100 TTIs. In one embodiment, one candidate time duration may comprise up to 100 milliseconds.

In one embodiment, sweeping periodicity may mean the periodicity of performing direction/beam sweeping once. In one embodiment, sweeping periodicity may mean the periodicity of performing sensing/receiving direction/beam sweeping once. In one embodiment, sweeping periodicity may mean the periodicity of performing transmission direction/beam sweeping once.

In one embodiment, the data/packet may mean a transport block. In one embodiment, the data/packet may mean a MAC PDU.

In one embodiment, the data/packet may mean a data packet.

In one embodiment, the TTI may mean slot. In one embodiment, the TTI may mean mini-slot. In one embodiment, the TTI may mean subframe. In one embodiment, the TTI may mean symbol. In one embodiment, the TTI may mean a set of symbols. In one embodiment, the TTI may mean milliseconds.

In one embodiment, the UE performs sensing/reception on the first sensing direction/beam may mean that the UE performs sensing/reception with QCL associated to a first reference signal for sensing/receiving.

In one embodiment, the UE performs sensing/reception on the second sensing direction/beam may mean that the UE performs sensing/reception with QCL associated to a second reference signal for sensing/receiving.

In one embodiment, the UE performs transmission on the first transmission direction/beam may mean that the UE performs transmission with QCL associated to a first reference signal for transmission.

In one embodiment, the UE performs transmission on the second transmission direction/beam may mean that the UE performs transmission with QCL associated to a second reference signal for transmission.

In one embodiment, the reference signal may be one or more of demodulation signal, CSI-RS, discovery signal, and/or synchronization signal.

In one embodiment, the energy sensing may mean that the UE performs RSSI measurement.

In one embodiment, the metric means RSSI.

In one embodiment, the metric means linear average of measured RSSI.

In one embodiment, the metric for a candidate resource means linear average of RSSI measured from associated resources of the candidate resource. In one embodiment, the association means that the associated resources of the candidate resource is with same frequency resources as the candidate resource, and is with time difference on one or more times of another time period from the candidate resource. In one embodiment, the another time period is different from the time period of the first transmission. In one embodiment, the another time period is the same as the time period of the first transmission.

In one embodiment, the time period may be fixed/specified.

In one embodiment, the time period may be configured via higher layer.

In one embodiment, the time period may be indicated in a signaling which schedules the received transmission.

In one embodiment, the time period is the minimum time difference between the previous resource and the scheduled resource of the first transmission.

In one embodiment, the time period is derived according to TDD DL/UL configuration of a cell. In one embodiment, the UE performs sensing/receiving/transmission on the cell.

In one embodiment, the time period is derived according to the ratio of DL and UL of a cell. In one embodiment, the UE performs sensing/receiving/transmission on the cell.

In one embodiment, the time period is derived according to a configuration related to DL and UL TTI distribution of a cell. In one embodiment, the UE performs sensing/receiving/transmission on the cell.

In one embodiment, the time period is derived according to an indication related to DL and UL TTI distribution of a cell. In one embodiment, the UE performs sensing/receiving/transmission on the cell.

In one embodiment, the time period is in unit of slot. In one embodiment, the time period is in unit of mini-slot. In one embodiment, the time period is in unit of subframe. In one embodiment, the time period is in unit of symbol. In one embodiment, the time period is in unit of milliseconds.

In one embodiment, the resource may comprise one or more subchannels.

In one embodiment, the resource may comprise one or more (physical) resource blocks.

In one embodiment, the candidate resource may comprise one or more subchannels.

In one embodiment, the candidate resource may comprise one or more (physical) resource blocks.

In one embodiment, the transmission is device-to-device transmission.

In one embodiment, the transmission is V2X transmission.

In one embodiment, the transmission is P2X transmission.

In one embodiment, the transmission is on PC5 interface.

In one embodiment, the transmission is sidelink transmission.

In one embodiment, the transmission is unicast transmission. In one embodiment, the transmission is transmission for another one UE.

In one embodiment, the transmission is broadcast transmission. In one embodiment, the transmission is transmission for multiple UEs.

In one embodiment, the transmission is group transmission. In one embodiment, the transmission is transmission for multiple UEs. In one embodiment, the transmission is transmission for a group of UEs.

In one embodiment, the opposite direction of the first transmission direction/beam means a direction/beam with (relative) 180-degree angular difference from the first transmission direction/beam. In one embodiment, the opposite direction of the second transmission direction/beam means a direction/beam with (relative) 180-degree angular difference from the second transmission direction/beam.

In one embodiment, relative angular difference is within [0, 180] in degree. In one embodiment, relative angular difference in degree is derived as angular difference module 360. In one embodiment, relative angular difference in degree is derived as "angular difference module 360" if result of "the angular difference module 360" is smaller than or equal to 180. In one embodiment, relative angular difference in degree is derived as "360—angular difference module 360)" if "the angular difference module 360" is larger than 180.

In one embodiment, the above alternatives or solutions may be applied/used by a V2X UE.

In one embodiment, the above alternatives or solutions may be applied/used by a RSU.

In one embodiment, the above alternatives or solutions may be applied/used by a UE type RSU.

In one embodiment, the above alternatives or solutions may be applied/used by a network node type RSU.

In one embodiment, the above alternatives or solutions may be applied/used by a network node.

In one embodiment, the above alternatives or solutions may be applied/used by a base station.

In one embodiment, the above alternatives or solutions may be applied/used by a gNB.

Figure 20:
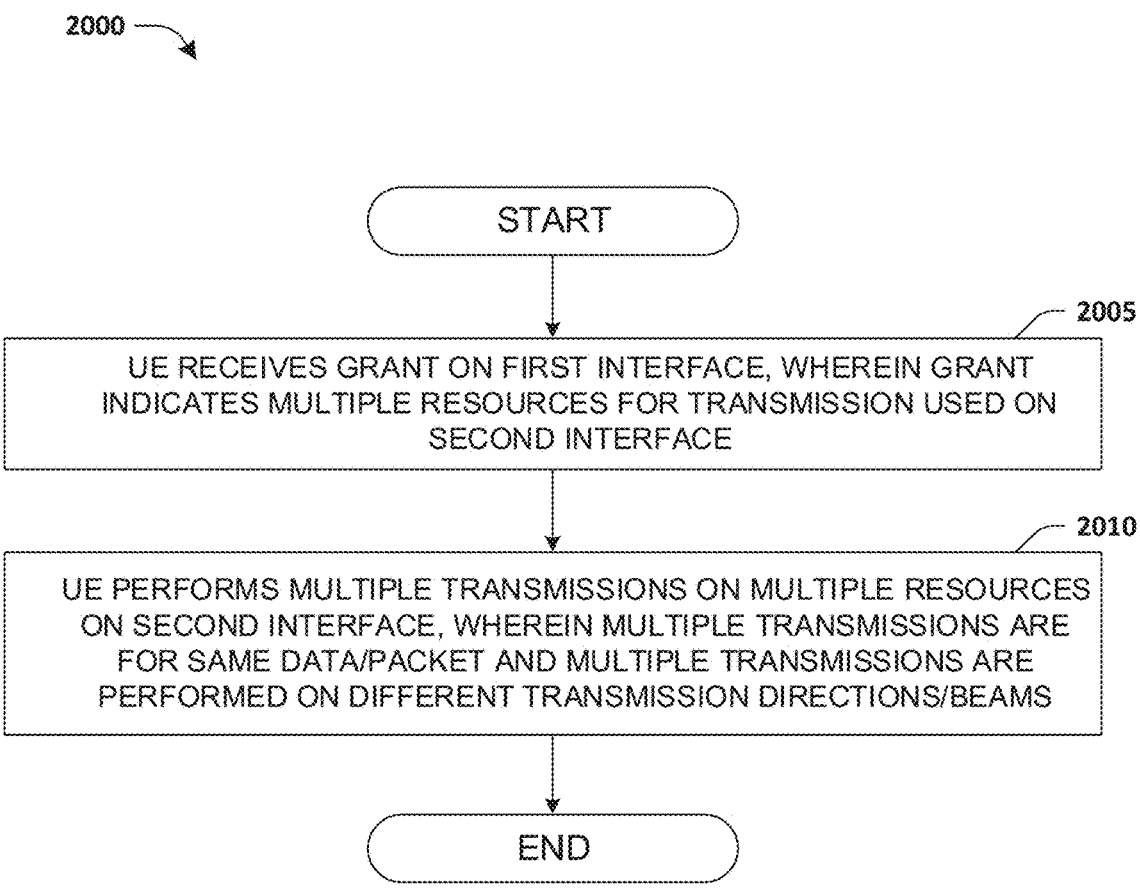
FIG. 20 is a flow chart according to one exemplary embodiment.

FIG. 20 is a flow chart 2000 according to one exemplary embodiment from the perspective of a UE. In step 2005, the UE receives a grant on a first interface, wherein the grant indicates multiple resources for transmission used on a second interface. In step 2010, the UE performs multiple transmissions on the multiple resources on the second interface, wherein the multiple transmissions are for a same data/packet and the multiple transmissions are performed on different transmission directions/beams.

In one embodiment, the UE performs transmission direction/beam sweeping for the multiple transmissions on the multiple resources.

In one embodiment, some of the multiple transmissions are performed on different transmission direction/beams.

In one embodiment, some of the transmission directions/beams of the multiple transmissions are different from each other.

In one embodiment, each of the multiple transmissions is performed on different transmission direction/beam.

In one embodiment, the transmission directions/beams of the multiple transmissions are different from each other.

In one embodiment, the multiple transmissions are for broadcast transmission.

In one embodiment, the multiple transmissions are for group transmission.

In one embodiment, the multiple transmissions are for multiple UEs.

In one embodiment, the multiple transmissions are for a group of UEs.

In one embodiment, redundancy version of the multiple transmissions for the same transport block are the same.

Referring back to FIGS. 3 and 4, in one exemplary embodiment of a UE, the device 300 includes a program code 312 stored in the memory 310. The CPU 308 could execute program code 312 to enable the UE (i) to receive a grant on a first interface, wherein the grant indicates multiple resources for transmission used on a second interface, and (ii) to perform multiple transmissions on the multiple resources on the second interface, wherein the multiple transmissions are for a same data/packet and the multiple transmissions are performed on different transmission directions/beams. Furthermore, the CPU 308 can execute the program code 312 to perform some and/or all of the above-described actions and steps or others described herein.

Figure 21:
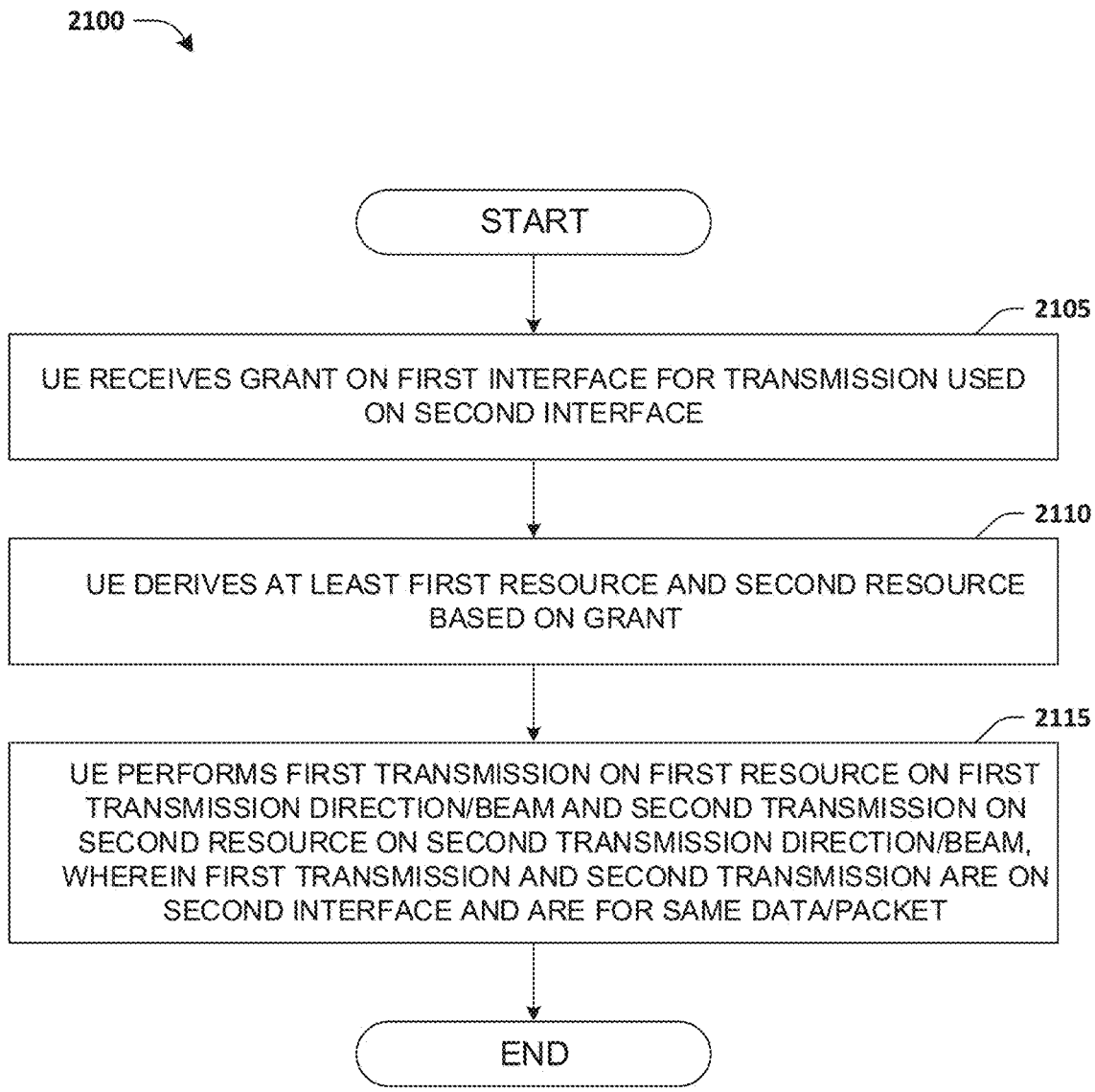
FIG. 21 is a flow chart according to one exemplary embodiment.

FIG. 21 is a flow chart 2100 according to one exemplary embodiment from the perspective of a UE. In step 2105, the UE receives a grant on a first interface for transmission used on a second interface. In step 2110, the UE derives at least a first resource and a second resource based on the grant. In step 2115, the UE performs a first transmission on the first resource on a first transmission direction/beam and a second transmission on the second resource on a second transmission direction/beam, wherein the first transmission and the second transmission are on the second interface and are for a same data/packet.

In one embodiment, the first resource is in a first TTI.

In one embodiment, the second resource is in a second TTI.

In one embodiment, the first transmission direction/beam is different from the second transmission direction/beam.

In one embodiment, the first transmission and the second transmission are for broadcast transmission.

In one embodiment, the first transmission and the second transmission are for group transmission.

In one embodiment, the first transmission and the second transmission are for multiple UEs.

In one embodiment, the first transmission and the second transmission are for a group of UEs.

In one embodiment, redundancy version of the first transmission and the second transmission for the same transport block are the same.

Referring back to FIGS. 3 and 4, in one exemplary embodiment of a UE, the device 300 includes a program code 312 stored in the memory 310. The CPU 308 could execute program code 312 to enable the UE (i) to receive a grant on a first interface for transmission used on a second interface, (ii) to derive at least a first resource and a second resource based on the grant, and (iii) to perform a first transmission on the first resource on a first transmission direction/beam and a second transmission on the second resource on a second transmission direction/beam, wherein the first transmission and the second transmission are on the second interface and are for a same data/packet. Furthermore, the CPU 308 can execute the program code 312 to perform some and/or all of the above-described actions and steps or others described herein.

Figure 22:
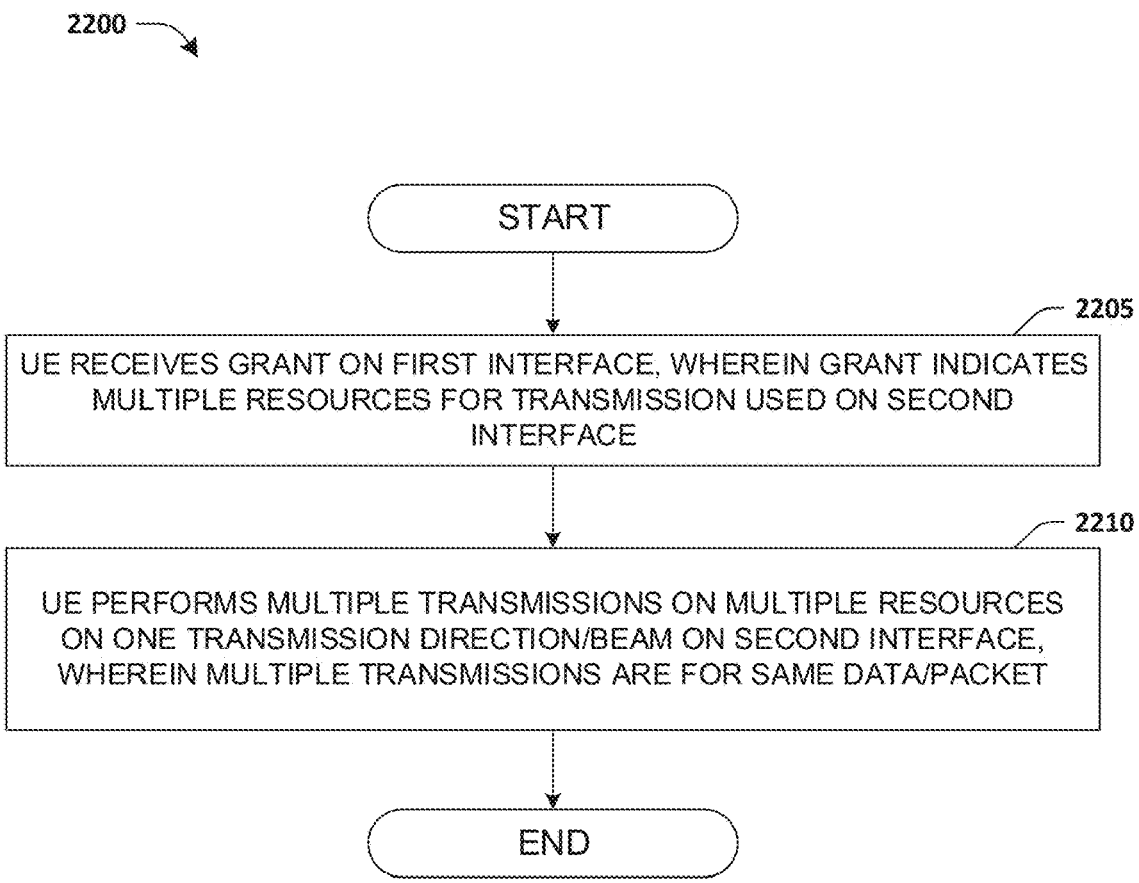
FIG. 22 is a flow chart according to one exemplary embodiment.

FIG. 22 is a flow chart 2200 according to one exemplary embodiment from the perspective of a UE. In step 2205, the UE receives a grant on a first interface, wherein the grant indicates multiple resources for transmission used on a second interface. In step 2210, the UE performs multiple transmissions on the multiple resources on one transmission direction/beam on the second interface, wherein the multiple transmissions are for a same data/packet.

In one embodiment, the UE performs the multiple transmissions on part of the multiple resources on the one transmission direction/beam.

In one embodiment, the UE does not perform transmission on remaining part of the multiple resources.

In one embodiment, the multiple transmissions are for unicast transmission.

In one embodiment, the multiple transmissions are for a UE.

In one embodiment, the multiple transmissions are for group transmission.

In one embodiment, the multiple transmissions are for multiple UEs.

In one embodiment, the multiple transmissions are for a group of UEs.

In one embodiment, redundancy version of the multiple transmissions for the same transport block are the same.

In one embodiment, redundancy version of the multiple transmissions for the same transport block are different.

Referring back to FIGS. 3 and 4, in one exemplary embodiment of a UE, the device 300 includes a program code 312 stored in the memory 310. The CPU 308 could execute program code 312 to enable the UE (i) to receive a grant on a first interface, wherein the grant indicates multiple resources for transmission used on a second interface, and (ii) to perform multiple transmissions on the multiple resources on one transmission direction/beam on the second interface, wherein the multiple transmissions are for a same data/packet. Furthermore, the CPU 308 can execute the program code 312 to perform some and/or all of the above-described actions and steps or others described herein.

Figure 23:
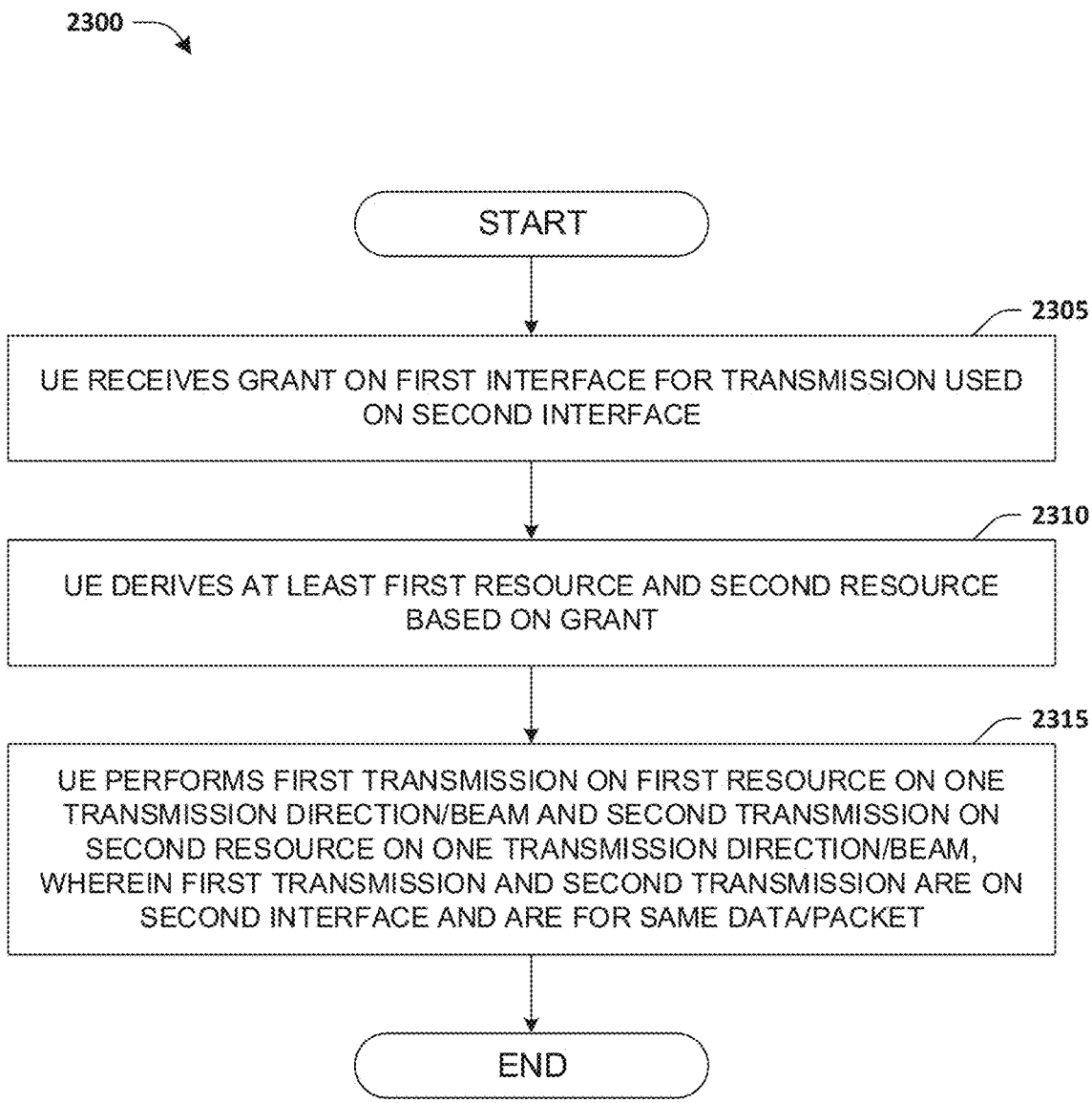
FIG. 23 is a flow chart according to one exemplary embodiment.

FIG. 23 is a flow chart 2300 according to one exemplary embodiment from the perspective of a UE. In step 2305, the UE receives a grant on a first interface for transmission used on a second interface. In step 2310, the UE derives at least a first resource and a second resource based on the grant. In step 2315, the UE performs a first transmission on the first resource on one transmission direction/beam and a second transmission on the second resource on the one transmission direction/beam, wherein the first transmission and the second transmission are on the second interface and are for a same data/packet.

In one embodiment, the first resource is in a first TTI.

In one embodiment, the second resource is in a second TTI.

In one embodiment, the first transmission and the second transmission are for unicast transmission.

In one embodiment, the first transmission and the second transmission are for a UE.

In one embodiment, the first transmission and the second transmission are for group transmission.

In one embodiment, the first transmission and the second transmission are for multiple UEs.

In one embodiment, the first transmission and the second transmission are for a group of UEs.

In one embodiment, redundancy version of the first transmission and the second transmission for the same transport block are the same.

In one embodiment, redundancy version of the first transmission and the second transmission for the same transport block are different.

Referring back to FIGS. 3 and 4, in one exemplary embodiment of a UE, the device 300 includes a program code 312 stored in the memory 310. The CPU 308 could execute program code 312 to enable the UE (i) to receive a grant on a first interface for transmission used on a second interface, (ii) to derive at least a first resource and a second resource based on the grant, and (iii) to perform a first transmission on the first resource on one transmission direction/beam and a second transmission on the second resource on the one transmission direction/beam, wherein the first transmission and the second transmission are on the second interface and are for a same data/packet. Furthermore, the CPU 308 can execute the program code 312 to perform some and/or all of the above-described actions and steps or others described herein.

Figure 24:
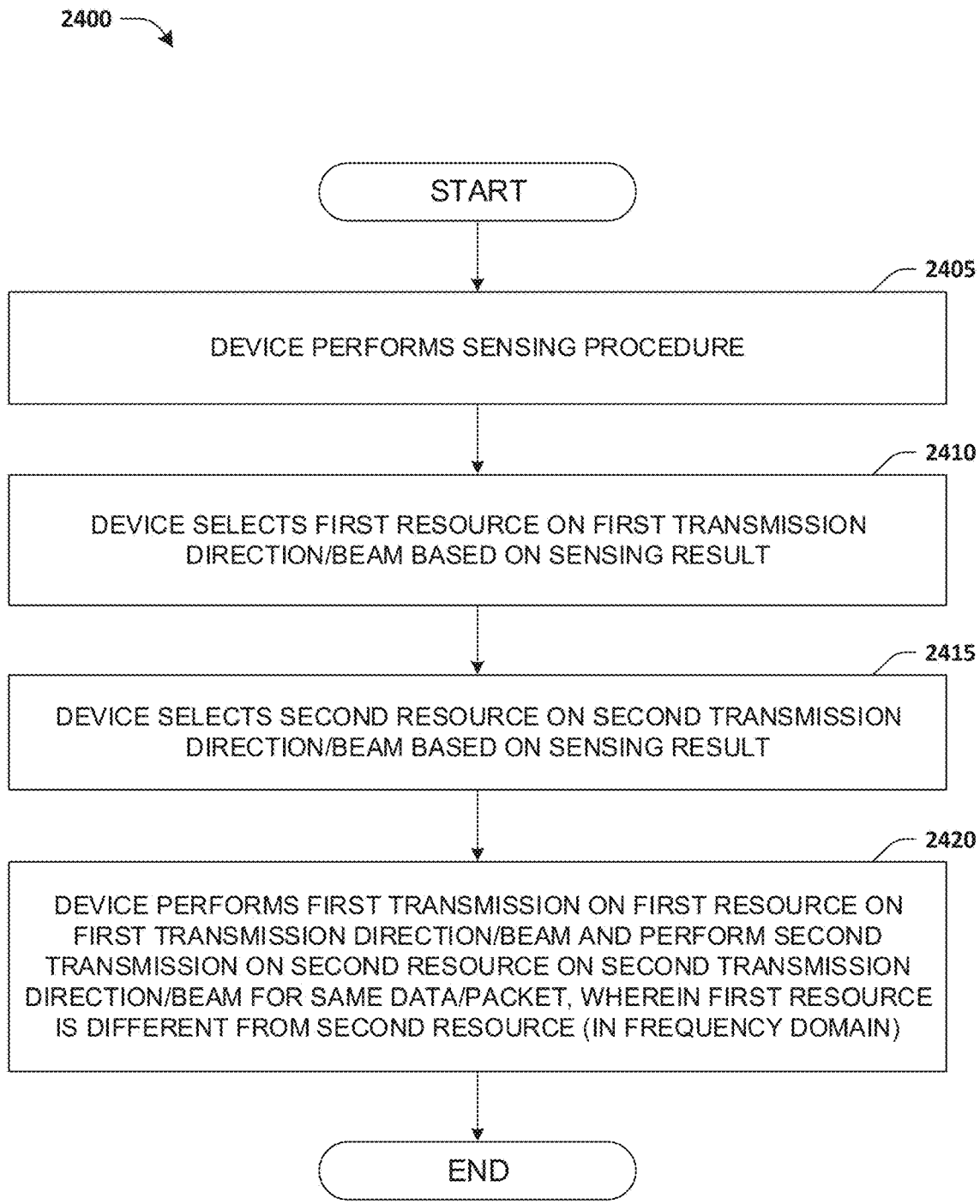
FIG. 24 is a flow chart according to one exemplary embodiment.

FIG. 24 is a flow chart 2400 according to one exemplary embodiment from the perspective of a device. In step 2405, the device performs sensing procedure. In step 2410, the device selects a first resource on a first transmission direction/beam based on the sensing result. In step 2415, the device selects a second resource on a second transmission direction/beam based on the sensing result. In step 2420, the device performs a first transmission on the first resource on the first transmission direction/beam and performs a second transmission on the second resource on the second transmission direction/beam for a same data/packet, wherein the first resource is different from the second resource (in the frequency domain).

In one embodiment, the device performs multiple transmissions for the same data/packet on multiple transmission directions/beams, wherein the resources for the multiple transmissions on separate transmission directions/beams are selected based on respective sensing results of sensing direction(s)/beam(s) associated with separate transmission directions/beams.

In one embodiment, the device performs transmission direction/beam sweeping for multiple transmissions of the same data/packet on multiple transmission directions/beams, wherein the resources for the multiple transmissions on separate transmission directions/beams are selected based on respective sensing results of sensing direction(s)/beam(s) associated with separate transmission directions/beams.

In one embodiment, the separate selected resources of the multiple transmissions for the same data/packet on separate transmission directions/beams are different (in frequency domain).

In one embodiment, the separate selected resources of the multiple transmissions for the same data/packet on separate transmission directions/beams are partly different (in frequency domain).

In one embodiment, the separate selected resources of the multiple transmissions for the same data/packet on separate transmission directions/beams are not limited as the same (in frequency domain).

Referring back to FIGS. 3 and 4, in one exemplary embodiment of a device, the device 300 includes a program code 312 stored in the memory 310. The CPU 308 could execute program code 312 to enable the device (i) to perform sensing procedure, (ii) to select a first resource on a first transmission direction/beam based on the sensing result, (iii) to select a second resource on a second transmission direction/beam based on the sensing result and (iv) to perform a first transmission on the first resource on the first transmission direction/beam and performs a second transmission on the second resource on the second transmission direction/beam for a same data/packet, wherein the first resource is different from the second resource (in the frequency domain). Furthermore, the CPU 308 can execute the program code 312 to perform some and/or all of the above-described actions and steps or others described herein.

Figure 25:
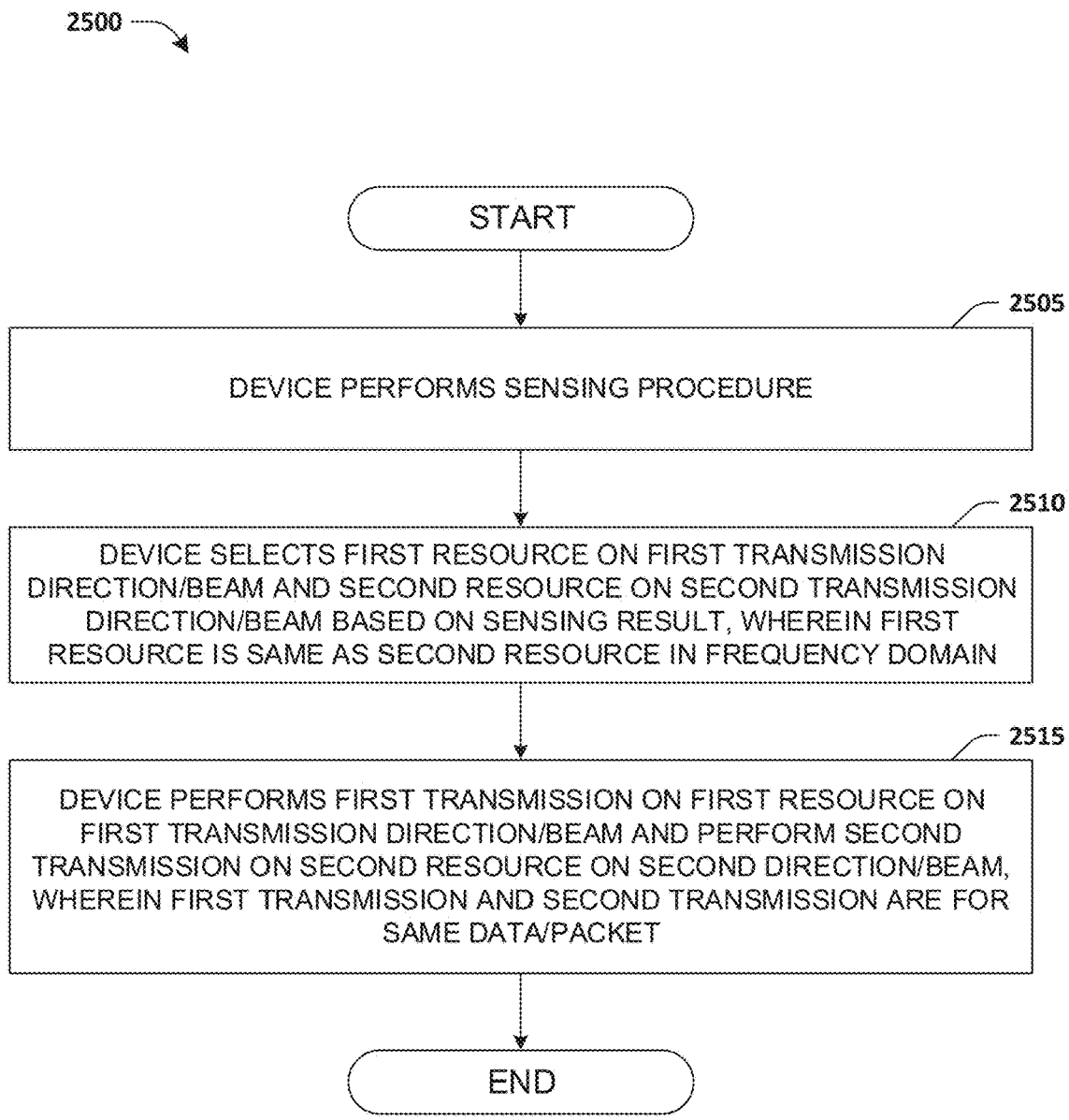
FIG. 25 is a flow chart according to one exemplary embodiment.

FIG. 25 is a flow chart 2500 according to one exemplary embodiment from the perspective of a device. In step 2505, the device performs sensing procedure. In step 2510, the device selects a first resource on a first transmission direction/beam and a second resource on a second transmission direction/beam based on the sensing result, wherein the first resource is the same as the second resource in the frequency domain. In step 2515, the device performs a first transmission on the first resource on the first transmission direction/beam and performs a second transmission on the second resource on the second direction/beam, wherein the first transmission and the second transmission are for a same data/packet.

Referring back to FIGS. 3 and 4, in one exemplary embodiment of a device, the device 300 includes a program code 312 stored in the memory 310. The CPU 308 could execute program code 312 to enable the device (i) to perform sensing procedure, (ii) to select a first resource on a first transmission direction/beam and a second resource on a second transmission direction/beam based on the sensing result, wherein the first resource is the same as the second resource in the frequency domain and (iii) to perform a first transmission on the first resource on the first transmission direction/beam and performs a second transmission on the second resource on the second direction/beam, wherein the first transmission and the second transmission are for a same data/packet. Furthermore, the CPU 308 can execute the program code 312 to perform some and/or all of the above-described actions and steps or others described herein.

Figure 26:
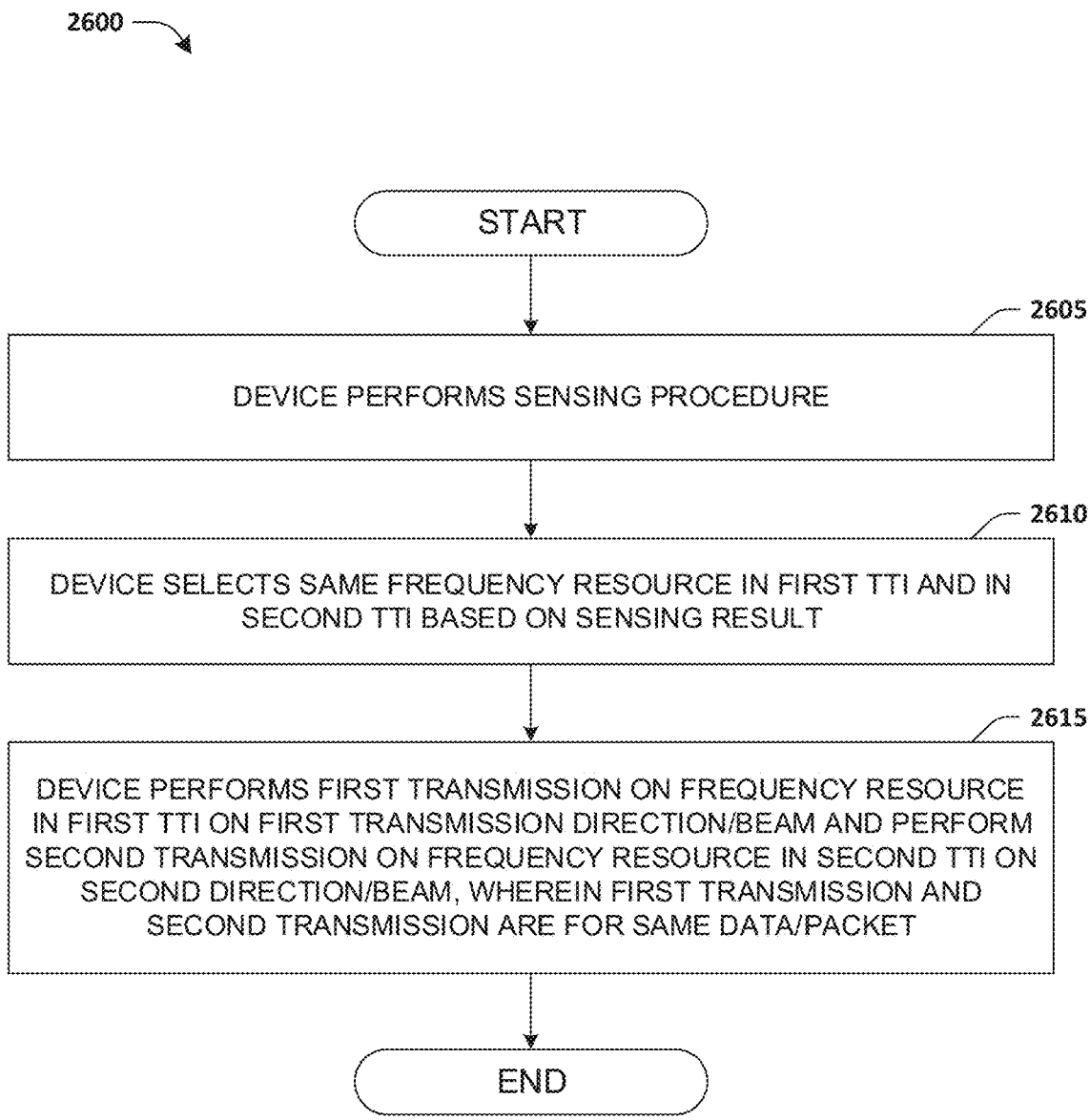
FIG. 26 is a flow chart according to one exemplary embodiment.

FIG. 26 is a flow chart 2600 according to one exemplary embodiment from the perspective of a device. In step 2605, the device performs sensing procedure. In step 2610, the device selects a same frequency resource in a first TTI and in a second TTI based on the sensing result. In step 2615, the device performs a first transmission on the frequency resource in the first TTI on a first transmission direction/beam and performs a second transmission on the frequency resource in the second TTI on the second direction/beam, wherein the first transmission and the second transmission are for a same data/packet.

Referring back to FIGS. 3 and 4, in one exemplary embodiment of a device, the device 300 includes a program code 312 stored in the memory 310. The CPU 308 could execute program code 312 to enable the device (i) to perform sensing procedure, (ii) to select a same frequency resource in a first TTI and in a second TTI based on the sensing result and (iii) to perform a first transmission on the frequency resource in the first TTI on a first transmission direction/beam and performs a second transmission on the frequency resource in the second TTI on the second direction/beam, wherein the first transmission and the second transmission are for a same data/packet. Furthermore, the CPU 308 can execute the program code 312 to perform some and/or all of the above-described actions and steps or others described herein.

Referring back to FIGS. 25-26, in one embodiment, the device performs multiple transmissions for the same data/packet on multiple transmission directions/beams, wherein the resources on separate transmission directions/beams are selected based on some and/or all sensing results of sensing direction(s)/beam(s) associated with separate transmission directions/beams.

In one embodiment, the device performs transmission direction/beam sweeping for multiple transmissions of the same data/packet on multiple transmission directions/beams, wherein the resources on separate transmission directions/beams are selected based on some and/or all sensing results of sensing direction(s)/beam(s) associated with separate transmission directions/beams.

In one embodiment, the device performs multiple transmissions for the same data/packet on multiple transmission directions/beams, wherein the resources on separate transmission directions/beams are selected based on omni-directional sensing result.

In one embodiment, the device performs transmission direction/beam sweeping for multiple transmissions of the same data/packet on multiple transmission directions/beams, wherein the resources on separate transmission directions/beams are selected based on omni-directional sensing result.

In one embodiment, the selected resources of the multiple transmissions for the same data/packet on separate transmission directions/beams are (limited as) the same (in frequency domain).

In one embodiment, if the device is not able to select the same frequency resource as the first resource on a third transmission direction/beam based on sensing result of a third sensing direction/beam, the device does not perform transmission for the same data/packet on the third transmission direction/beam.

Figure 27:
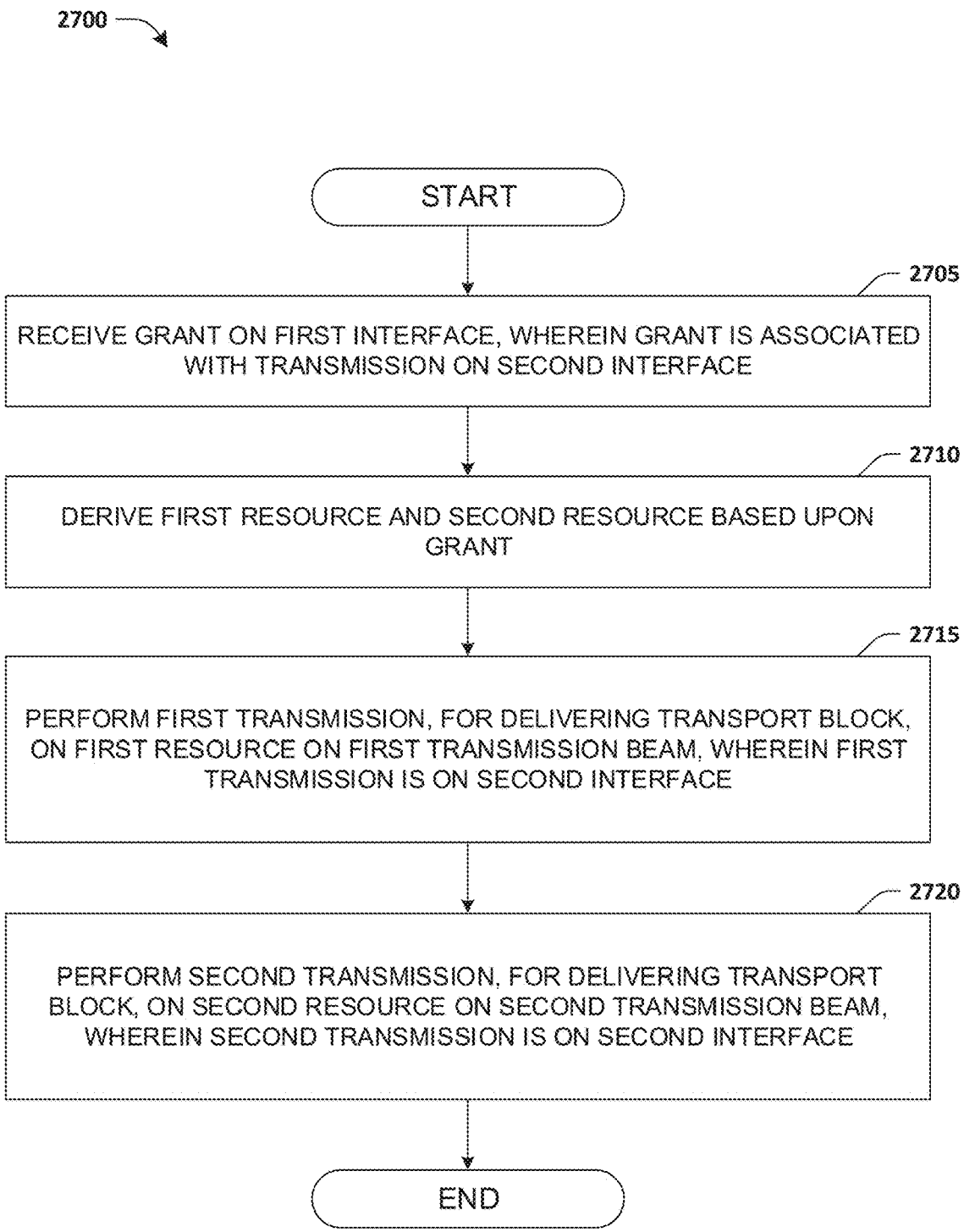
FIG. 27 is a flow chart according to one exemplary embodiment.

FIG. 27 is a flow chart 2700 according to one exemplary embodiment from the perspective of a device. In step 2705, the device receives a grant on a first interface, wherein the grant is associated with transmission on a second interface. In step 2710, the device derives a first resource and a second resource based upon the grant. In step 2715, the device performs a first transmission, for delivering a transport block, on the first resource on a first transmission beam, wherein the first transmission is on the second interface. In step 2720, the device performs a second transmission, for delivering the transport block, on the second resource on a second transmission beam, wherein the second transmission is on the second interface.

In one embodiment, the first transmission beam is different than the second transmission beam. In one embodiment, a first transmission direction corresponding to the first transmission beam is different than a second transmission direction corresponding to the second transmission beam. In one embodiment, the first resource is within one or more first TTIs and/or the second resource is within one or more second TTIs, different than the one or more first TTIs.

In one embodiment, a redundancy version, for the transport block, of the first transmission is the same as a redundancy version, for the transport block, of the second transmission.

In one embodiment, the first transmission and the second transmission correspond to broadcast transmission and/or group transmission.

In one embodiment, the first interface corresponds to a first wireless interface for communication between a network node and the device and/or the second interface corresponds to a second wireless interface for communication between devices.

In one embodiment, the grant corresponds to an SL grant received via PDCCH. In one embodiment, the first transmission corresponds to a first PSSCH transmission and/or the second transmission corresponds to a second PSSCH transmission.

Referring back to FIGS. 3 and 4, in one exemplary embodiment of a device, the device 300 includes a program code 312 stored in the memory 310. The CPU 308 could execute program code 312 to enable the device (i) to receive a grant on a first interface, wherein the grant is associated with transmission on a second interface, (ii) to derive a first resource and a second resource based upon the grant, (iii) to perform a first transmission, for delivering a transport block, on the first resource on a first transmission beam, wherein the first transmission is on the second interface, and (iv) to perform a second transmission, for delivering the transport block, on the second resource on a second transmission beam, wherein the second transmission is on the second interface. Furthermore, the CPU 308 can execute the program code 312 to perform some and/or all of the above-described actions and steps or others described herein.

Figure 28:
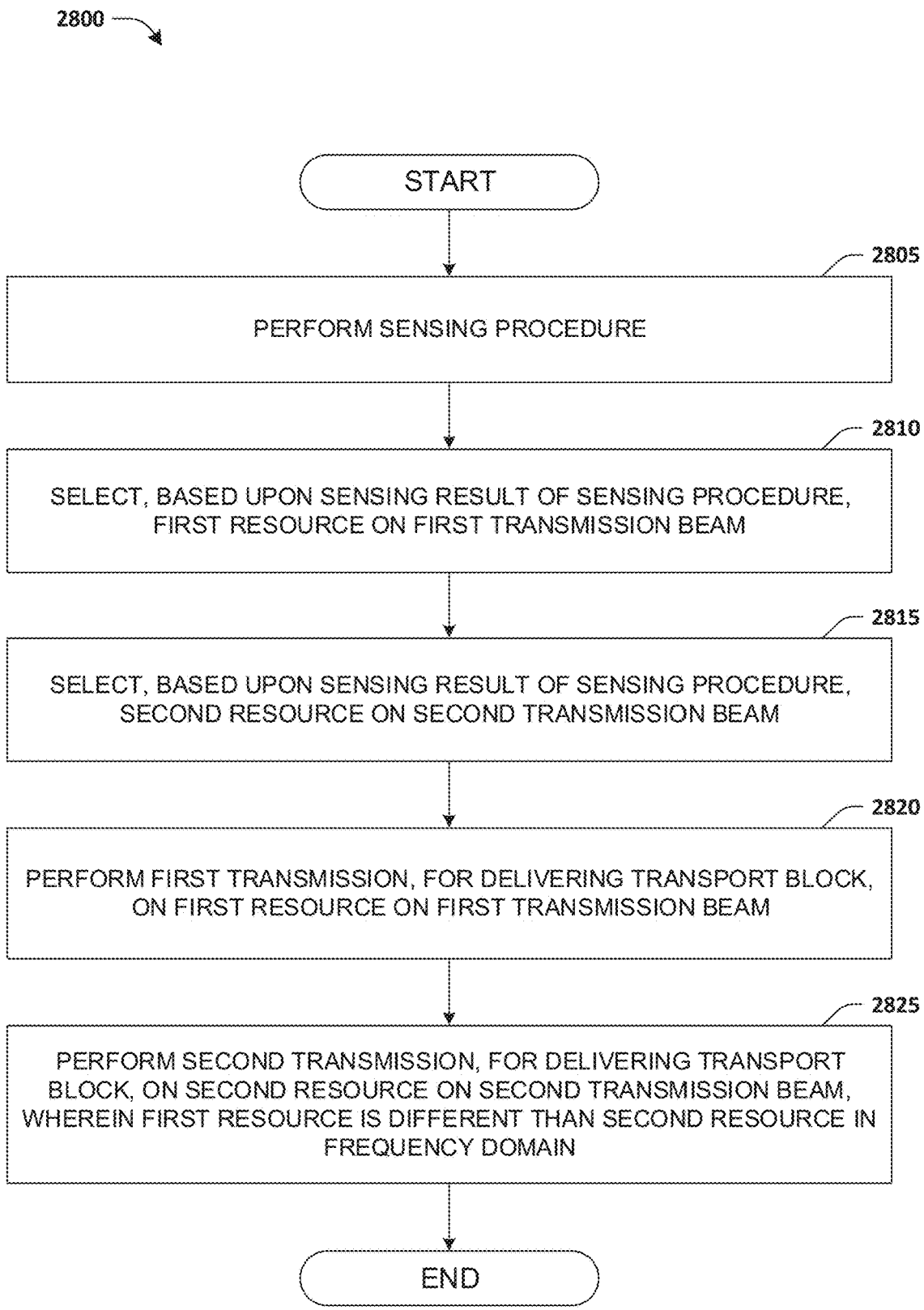
FIG. 28 is a flow chart according to one exemplary embodiment.

FIG. 28 is a flow chart 2800 according to one exemplary embodiment from the perspective of a device. In step 2805, the device performs a sensing procedure. In step 2810, the device selects, based upon a sensing result of the sensing procedure, a first resource on a first transmission beam. In step 2815, the device selects, based upon the sensing result of the sensing procedure, a second resource on a second transmission beam. In step 2820, the device performs a first transmission, for delivering a transport block, on the first resource on the first transmission beam. In step 2825, the device performs a second transmission, for delivering the transport block, on the second resource on the second transmission beam, wherein the first resource is different than the second resource in the frequency domain.

In one embodiment, the first transmission beam is different than the second transmission beam. In one embodiment, a first transmission direction corresponding to the first transmission beam is different than a second transmission direction corresponding to the second transmission beam. In one embodiment, the first resource is within one or more first TTIs and/or the second resource is within one or more second TTIs, different than the one or more first TTIs.

In one embodiment, the first transmission and the second transmission correspond to broadcast transmission and/or group transmission.

In one embodiment, a redundancy version, for the transport block, of the first transmission is the same as a redundancy version, for the transport block, of the second transmission.

In one embodiment, the device performs multiple transmissions for delivering the transport block on multiple transmission beams, wherein resources for the multiple transmissions are selected based upon respective sensing results of sensing beams associated with separate transmission beams.

In one embodiment, the first resource on the first transmission beam is selected based upon a first sensing result associated with a first sensing beam, wherein the first sensing beam comprises a direction opposite a first transmission direction corresponding to the first transmission beam, wherein the first sensing result is comprised within the sensing result of the sensing procedure. Alternatively and/or additionally, the second resource on the second transmission beam is selected based upon a second sensing result associated with a second sensing beam, wherein the second sensing beam comprises a direction opposite a second transmission direction corresponding to the second transmission beam, wherein the second sensing result is comprised within the sensing result of the sensing procedure.

In one embodiment, the sensing procedure is performed by receiving a transmission and excluding one or more first candidate resources associated with the transmission. Alternatively and/or additionally, the sensing procedure is performed by performing energy sensing to determine metrics for candidate resources and selecting one or more second candidate resources with smaller metrics, of the candidate resources, as one or more valid candidate resources.

Referring back to FIGS. 3 and 4, in one exemplary embodiment of a device, the device 300 includes a program code 312 stored in the memory 310. The CPU 308 could execute program code 312 to enable the device (i) to perform a sensing procedure, (ii) to select, based upon a sensing result of the sensing procedure, a first resource on a first transmission beam, (iii) to select, based upon the sensing result of the sensing procedure, a second resource on a second transmission beam, (iv) to perform a first transmission, for delivering a transport block, on the first resource on the first transmission beam, and (v) to perform a second transmission, for delivering the transport block, on the second resource on the second transmission beam, wherein the first resource is different than the second resource in the frequency domain. Furthermore, the CPU 308 can execute the program code 312 to perform some and/or all of the above-described actions and steps or others described herein.

Figure 29:
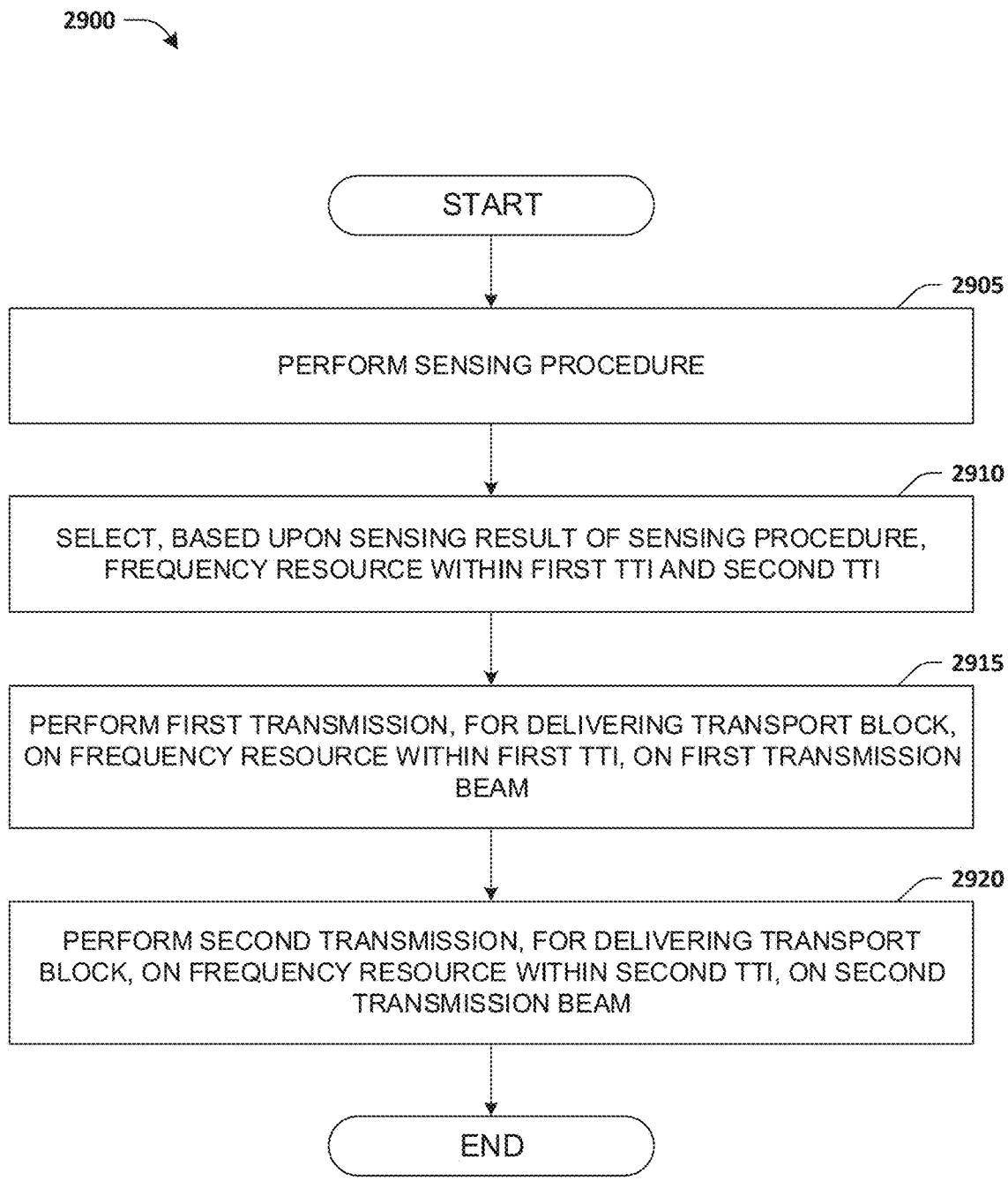
FIG. 29 is a flow chart according to one exemplary embodiment.

FIG. 29 is a flow chart 2900 according to one exemplary embodiment from the perspective of a device. In step 2905, the device performs a sensing procedure. In step 2910, the device selects, based upon a sensing result of the sensing procedure, a frequency resource within a first TTI and a second TTI. In step 2915, the device performs a first transmission, for delivering a transport block, on the frequency resource within the first TTI, on a first transmission beam. In step 2920, the device performs a second transmission, for delivering the transport block, on the frequency resource within the second TTI, on a second transmission beam.

In one embodiment, the first transmission beam is different than the second transmission beam. In one embodiment, a first transmission direction corresponding to the first transmission beam is different than a second transmission direction corresponding to the second transmission beam.

In one embodiment, the first transmission and the second transmission correspond to broadcast transmission and/or group transmission.

In one embodiment, a redundancy version, for the transport block, of the first transmission is the same as a redundancy version, for the transport block, of the second transmission.

In one embodiment, the device performs multiple transmissions for delivering the transport block on multiple transmission beams, wherein resources for separate transmission beams are selected based upon sensing results of sensing beams associated with the separate transmission beams.

In one embodiment, the device performs multiple transmissions for delivering the transport block on multiple transmission beams, wherein resources for separate transmission beams are selected based upon an omni-directional sensing result.

In one embodiment, the sensing procedure is performed by receiving a transmission and excluding one or more first candidate resources associated with the transmission. Alternatively and/or additionally, the sensing procedure is performed by performing energy sensing to determine metrics for candidate resources and selecting one or more second candidate resources with smaller metrics, of the candidate resources, as one or more valid candidate resources.

Referring back to FIGS. 3 and 4, in one exemplary embodiment of a device, the device 300 includes a program code 312 stored in the memory 310. The CPU 308 could execute program code 312 to enable the device (i) to perform a sensing procedure, (ii) to select, based upon a sensing result of the sensing procedure, a frequency resource within a first TTI and a second TTI, (iii) to perform a first transmission, for delivering a transport block, on the frequency resource within the first TTI, on a first transmission beam, and (iv) to perform a second transmission, for delivering the transport block, on the frequency resource within the second TTI, on a second transmission beam. Furthermore, the CPU 308 can execute the program code 312 to perform some and/or all of the above-described actions and steps or others described herein.

It may be appreciated that applying one or more of the techniques presented herein may result in one or more benefits including, but not limited to, improving a performance of a communication device (e.g., a UE, a base station, a network node, etc.) as a result of enabling the communication device to perform scheduling mode and/or sensing based resource selection for broadcast transmission and/or for group communication.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in one or more of FIGS. 20-29. Furthermore, the processor may execute the program code to perform some and/or all of the above-described actions and steps and/or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a first device, comprising:
receiving a grant, from a network node, on a first interface, wherein the grant is associated with transmission on a second interface;
deriving a first resource and a second resource based upon the grant;
performing a first transmission on a first transmission beam, for transmitting a transport block, on the first resource derived based upon the grant, wherein the first transmission is on the second interface; and
performing a second transmission on a second transmission beam different than the first transmission beam, for transmitting the transport block, on the second resource derived based upon the grant, wherein the second transmission on the second transmission beam is on the same second interface as the first transmission on the first transmission beam, wherein the first device performs the first transmission for transmitting the transport block to a second device and performs the second transmission for transmitting the transport block to a third device.

2. The method of claim 1, wherein:
the first resource is within one or more first Transmission Time Intervals (TTIs) and the second resource is within one or more second TTIs, different than the one or more first TTIs.

3. The method of claim 1, wherein:
a redundancy version, for the transport block, of the first transmission is the same as a redundancy version, for the transport block, of the second transmission.

4. The method of claim 1, wherein at least one of:
the first transmission and the second transmission correspond to at least one of broadcast transmission or group transmission;
the second device and the third device are within a group; or
the second device and the third device are neighboring devices of the first device.

5. The method of claim 1, wherein:
the first interface corresponds to a first wireless interface for communication between the network node and the first device; and
the second interface corresponds to a second wireless interface for communication between devices.

6. The method of claim 1, wherein:
at least one of:
the grant corresponds to a sidelink grant (SL grant) received via Physical Downlink Control Channel (PDCCH); or
the first transmission corresponds to a first Physical Sidelink Shared Channel (PSSCH) transmission and the second transmission corresponds to a second PSSCH transmission.

7. A method of a first device, comprising:
performing a sensing procedure;
selecting, based upon a sensing result of the sensing procedure, a first resource on a first transmission beam;
selecting, based upon the sensing result of the sensing procedure, a second resource on a second transmission beam different than the first transmission beam;
performing a first transmission on the first transmission beam, for transmitting a transport block, on the first resource selected based upon the sensing result of the sensing procedure; and
performing a second transmission on the second transmission beam, for transmitting the transport block, on the second resource selected based upon the sensing result of the sensing procedure, wherein the first resource is different than the second resource in the frequency domain, wherein the first device performs the first transmission for transmitting the transport block to a second device and performs the second transmission for transmitting the transport block to a third device.

8. The method of claim 7, wherein:
at least one of:
the first transmission beam is different than the second transmission beam; or
the first resource is within one or more first Transmission Time Intervals (TTIs) and the second resource is within one or more second TTIs, different than the one or more first TTIs.

9. The method of claim 7, wherein at least one of:
the first transmission and the second transmission correspond to at least one of broadcast transmission or group transmission;
the second device and the third device are within a group; or
the second device and the third device are neighboring devices of the first device.

10. The method of claim 7, wherein:
a redundancy version, for the transport block, of the first transmission is the same as a redundancy version, for the transport block, of the second transmission.

11. The method of claim 7, comprising:
performing multiple transmissions for transmitting the transport block on multiple transmission beams, wherein resources for the multiple transmissions are selected based upon respective sensing results of sensing beams associated with separate transmission beams.

12. The method of claim 7, wherein at least one of:
the first resource on the first transmission beam is selected based upon a first sensing result associated with a first sensing beam, wherein the first sensing beam comprises a direction opposite a first transmission direction corresponding to the first transmission beam, wherein the first sensing result is comprised within the sensing result of the sensing procedure; or
the second resource on the second transmission beam is selected based upon a second sensing result associated with a second sensing beam, wherein the second sensing beam comprises a direction opposite a second transmission direction corresponding to the second transmission beam, wherein the second sensing result is comprised within the sensing result of the sensing procedure.

13. The method of claim 7, wherein the performing the sensing procedure comprises at least one of:
receiving a transmission and excluding one or more first candidate resources associated with the transmission; or
performing energy sensing to determine metrics for candidate resources and selecting one or more second candidate resources with smaller metrics, of the candidate resources, as one or more valid candidate resources.

14. A method of a first device, comprising:
performing a sensing procedure;
selecting, based upon a sensing result of the sensing procedure, a frequency resource within a first Transmission Time Interval (TTI) and a second TTI;
performing a first transmission, for transmitting a transport block, on the frequency resource within the first TTI selected based upon the sensing result of the sensing procedure, on a first transmission beam; and
performing a second transmission, for transmitting the transport block, on the frequency resource within the second TTI selected based upon the sensing result of the sensing procedure, on a second transmission beam different than the first transmission beam, wherein the first device performs the first transmission for transmitting the transport block to a second device and performs the second transmission for transmitting the transport block to a third device.

15. The method of claim 14, wherein:
the first transmission beam is different than the second transmission beam.

16. The method of claim 14, wherein at least one of:
the first transmission and the second transmission correspond to at least one of broadcast transmission or group transmission;
the second device and the third device are within a group; or
the second device and the third device are neighboring devices of the first device.

17. The method of claim 14, wherein:
a redundancy version, for the transport block, of the first transmission is the same as a redundancy version, for the transport block, of the second transmission.

18. The method of claim 14, comprising:
performing multiple transmissions for transmitting the transport block on multiple transmission beams, wherein resources for separate transmission beams are selected based upon sensing results of sensing beams associated with the separate transmission beams.

19. The method of claim 14, comprising:
performing multiple transmissions for transmitting the transport block on multiple transmission beams, wherein resources for separate transmission beams are selected based upon an omni-directional sensing result.

20. The method of claim 14, wherein the performing the sensing procedure comprises at least one of:
receiving a transmission and excluding one or more first candidate resources associated with the transmission; or
performing energy sensing to determine metrics for candidate resources and selecting one or more second candidate resources with smaller metric, of the candidate resources, as one or more valid candidate resources.

* * * * *